US012701471B2

(12) United States Patent
Teyeb et al.

(10) Patent No.: US 12,701,471 B2
(45) Date of Patent: Aug. 4, 2026

(54) METHODS, APPARATUS AND MACHINE-READABLE MEDIA RELATING TO MIGRATION IN A WIRELESS COMMUNICATION NETWORK

(71) Applicant: Telefonaktiebolaget LM Ericsson (publ), Stockholm (SE)

(72) Inventors: Oumer Teyeb, Montréal (CA); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 694 days.

(21) Appl. No.: 18/019,406

(22) PCT Filed: Jul. 2, 2021

(86) PCT No.: PCT/SE2021/050672
§ 371 (c)(1),
(2) Date: Feb. 2, 2023

(87) PCT Pub. No.: WO2022/031201
PCT Pub. Date: Feb. 10, 2022

(65) Prior Publication Data

US 2023/0284106 A1 Sep. 7, 2023

Related U.S. Application Data

(60) Provisional application No. 63/062,112, filed on Aug. 6, 2020.

(51) Int. Cl.
*H04W 36/00* (2009.01)
*H04W 36/08* (2009.01)

(52) U.S. Cl.
CPC ........ *H04W 36/0069* (2018.08); *H04W 36/08* (2013.01)

(58) Field of Classification Search
CPC .......... H04W 36/0069; H04W 36/0009; H04W 36/08; H04W 36/0033
See application file for complete search history.

(56) References Cited

U.S. PATENT DOCUMENTS 10,582,432 B2 3/2020 Park et al.
12,317,133 B2 * 5/2025 Fujishiro ........... H04W 36/0064
(Continued)

FOREIGN PATENT DOCUMENTS

WO 2020032844 A1 2/2020

OTHER PUBLICATIONS

"3GPP TS 38.401 V16.2.0", 3rd Generation Partnership Project; Technical Specification Group Radio Access Network; NG-RAN; Architecture description (Release 16), Jul. 2020, 1-77.
(Continued)

*Primary Examiner* — Allahyar Kasraian
(74) *Attorney, Agent, or Firm* — Murphy, Bilak & Homiller, PLLC

(57) ABSTRACT

A method is performed by a first base station, the first base station being configured as one of a plurality of base stations providing services to a plurality of devices in a wireless communication network according to a multi-connectivity configuration for the plurality of devices. The method comprises: transmitting a request message to a second base station of the plurality of base stations, the request message requesting an alteration to the multi-connectivity configuration for the plurality of devices.

20 Claims, 36 Drawing Sheets

(56) References Cited

U.S. PATENT DOCUMENTS

| | | | | |
|---|---|---|---|---|
| 2018/0192471 | A1* | 7/2018 | Li | H04W 80/10 |
| 2020/0220684 | A1 | 7/2020 | Park et al. | |
| 2020/0229058 | A1 | 7/2020 | Park et al. | |
| 2022/0263797 | A1* | 8/2022 | Liu | H04W 36/0009 |
| 2022/0286929 | A1* | 9/2022 | Park | H04W 36/0055 |

OTHER PUBLICATIONS

"3rd Generation Partnership Project; Technical Specification Group Radio Access Network; NG-RAN; E1 Application Protocol (E1AP) (Release 16)", 3GPP TS 38.463 V16.2.0, Jul. 2020, 230 pages.

"3rd Generation Partnership Project; Technical Specification Group Radio Access Network; NR; Radio Link Control (RLC) protocol specification (Release 16)", 3GPP TS 38.322 V16.1.0, Jul. 2020, (33 pages).

"3rd Generation Partnership Project; Technical Specification Group Radio Access Network; NR; Study on Integrated Access and Backhaul; (Release 16)", 3GPP TR 38.874 V16.0.0, Dec. 2018, 111 pages.

3GPP , "3GPP TS 33.210 V16.2.0", 3rd Generation Partnership Project; Technical Specification Group Services and System Aspects; 3G security; Network Domain Security (NDS); IP network layer security (Release 16), Jun. 2019, 1-28.

3GPP , "3GPP TS 33.501 V16.1.0", 3rd Generation Partnership Project; Technical Specification Group Services and System Aspects; Security architecture and procedures for 5G system (Release 16), Dec. 2019, 1-202.

3GPP , "3GPP TS 38.300 V16.2.0", 3rd Generation Partnership Project; Technical Specification Group Radio Access Network; NR; NR and NG-RAN Overall Description; Stage 2 (Release 16), Jul. 2020, 1-148.

3GPP, "3rd Generation Partnership Project; Technical Specification Group Radio Access Network; NG-RAN; F1 application protocol (F1AP) (Release 16)", 3GPP TS 38.473 V16.2.0, Jul. 2020, 1-363.

3GPP, "3rd Generation Partnership Project; Technical Specification Group Radio Access Network; NG-RAN; Xn application protocol (XnAP) (Release 16)", 3GPP TS 38.423 V16.2.0, Jul. 2020, 1-447.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

QUALCOMM , "New WID on Enhancements to Integrated Access and Backhaul", 3GPP TSG RAN Meeting #86, RP-193251, (revision of RP-193145), Sitges, Spain, Dec. 9-12, 2019, 1-5.

* cited by examiner

METHODS, APPARATUS AND MACHINE-READABLE MEDIA RELATING TO MIGRATION IN A WIRELESS COMMUNICATION NETWORK

TECHNICAL FIELD

Embodiments of the present disclosure relate to communication networks, and particularly to methods, apparatus and machine-readable media for migration in a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

NG-RAN Architecture

FIG. 1 shows the network architecture of a wireless communication network 100 complying with 5G standards, and particularly shows the next generation radio access network (NG-RAN) 102. The NG-RAN 102 consists of a set of gNBs 104 connected to the 5GC 106 through the NG interface. As specified in 3GPP TS 38.300 v16.2.0, NG-RAN may also consist of a set of ng-eNBs, an ng-eNB may consist of an ng-eNB-CU 108 and one or more ng-eNB-DU(s) 110. An ng-eNB-CU 108 and an ng-eNB-DU 110 are connected via W1 interface. The general principle described in this section also applies to ng-eNB and W1 interface, if not explicitly specified otherwise.

An gNB can support FDD mode, TDD mode or dual mode operation. gNBs can be interconnected through the Xn interface.

A gNB may consist of a gNB-CU (central unit) and one or more gNB-DU(s) (distributed units). A gNB-CU and a gNB-DU are connected via F1 interface. One gNB-DU is connected to only one gNB-CU.

In case of network sharing with multiple cell ID broadcast, each Cell Identity associated with a subset of PLMNs corresponds to a gNB-DU and the gNB-CU it is connected to, i.e. the corresponding gNB-DUs share the same physical layer cell resources.

For resiliency, a gNB-DU may be connected to multiple gNB-CUs by appropriate implementation.

NG, Xn and F1 are logical interfaces.

For NG-RAN, the NG and Xn-C interfaces for a gNB consisting of a gNB-CU and gNB-DUs terminate in the gNB-CU. For EN-DC, the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The node hosting the user-plane part of NR PDCP (e.g. gNB-CU, gNB-CU-UP, and for EN-DC, MeNB or SgNB depending on the bearer split) shall perform user inactivity monitoring and further informs its inactivity or (re) activation to the node having the control-plane connection towards the core network (e.g. over E1, X2). The node hosting NR RLC (e.g. gNB-DU) may perform user inactivity monitoring and further inform its inactivity or (re) activation to the node hosting control plane, e.g. gNB-CU or gNB-CU-CP.

UL PDCP configuration (i.e. how the UE uses the UL at the assisting or secondary node) is indicated via X2-C (for EN-DC), Xn-C (for NG-RAN) and F1-C. Radio Link Outage/Resume for DL and/or UL is indicated via X2-U (for EN-DC), Xn-U (for NG-RAN) and F1-U.

The NG-RAN is layered into a Radio Network Layer (RNL) and a Transport Network Layer (TNL).

The NG-RAN architecture, i.e. the NG-RAN logical nodes and interfaces between them, is defined as part of the RNL.

For each NG-RAN interface (NG, Xn, F1) the related TNL protocol and the functionality are specified. The TNL provides services for user plane transport, signalling transport.

In NG-Flex configuration, each NG-RAN node is connected to all AMFs of AMF Sets within an AMF Region supporting at least one slice also supported by the NG-RAN node. The AMF Set and the AMF Region are defined in 3GPP TS 23.501 v. 16.1.0.

If security protection for control plane and user plane data on TNL of NG-RAN interfaces has to be supported, NDS/IP 3GPP TS 33.501 v. 16.1.0 shall be applied.

Overall Architecture for Separation of gNB-CU-CP and gNB-CU-UP

The overall architecture for separation of gNB-CU-CP and gNB-CU-UP is depicted in FIG. 2.

A gNB may consist of a gNB-CU-CP, one or more gNB-CU-UPs and one or more gNB-DUs;

The gNB-CU-CP is connected to the gNB-DU through the F1-C interface;

The gNB-CU-UP is connected to the gNB-DU through the F1-U interface;

The gNB-CU-UP is connected to the gNB-CU-CP through the E1 interface;

One gNB-DU is connected to only one gNB-CU-CP;

One gNB-CU-UP is connected to only one gNB-CU-CP;

NOTE 1: For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP;

One gNB-CU-UP can be connected to multiple DUs under the control of the same gNB-CU-CP;

NOTE 2: The connectivity between a gNB-CU-UP and a gNB-DU is established by the gNB-CU-CP using Bearer Context Management functions.

NOTE 3: The gNB-CU-CP selects the appropriate gNB-CU-UP(s) for the requested services for the UE. In case of multiple CU-UPs they belong to same security domain as defined in 3GPP TS 33.210 v16.2.0.

NOTE 4: Data forwarding between gNB-CU-UPs during intra-gNB-CU-CP handover within a gNB may be supported by Xn-U.

F1-AP is specified in 3GPP TS 38.473 v16.2.0.

E1 is specified in 3GPP TS 38.463 v16.2.0.

Dual Connectivity

Dual connectivity is generally used in NR (5G) and LTE systems to improve UE transmit and receive data rate. With dual connectivity (DC), the UE typically operates initially a serving cell group called a master cell group (MCG). The UE is then configured by the network with an additional cell group called a secondary cell group (SCG). Each cell group (CG) can have one or more serving cells. MCG and SCG can be operated from geographically non-collocated gNBs. MCG and SCG can be operated with corresponding serving cells belonging to different frequency ranges and/or corresponding serving cells in the same and different frequency ranges. In an example, a MCG can have serving cells in FR1, and SCG can also have serving cells in FR1.

3GPP Architecture Options

There are different ways to deploy a 5G network with or without interworking with LTE (also referred to as E-UTRA) and evolved packet core (EPC), as depicted in FIG. 3. In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in the figure). On the other hand, the first supported version of NR is the so-called EN-DC (E-UTRAN-NR Dual Connectivity), illustrated by Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by MR-DC (Multi-Radio Dual Connectivity). Under the MR-DC umbrella, we have:

- EN-DC (Option 3): LTE is the master node and NR is the secondary (EPC CN employed)
- NE-DC (Option 4): NR is the master node and LTE is the secondary (5GCN employed)
- NGEN-DC (Option 7): LTE is the master node and NR is the secondary (5GCN employed)
- NR-DC (variant of Option 2): Dual connectivity where both the master and secondary are NR (5GCN employed).

As migration for these options may differ between different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group (i.e. MCG and SCG) and dual connectivity between nodes on the same RAT (e.g. NR-NR DC). For the LTE cells, a consequence of these different deployments is the co-existence of LTE cells associated with eNBs connected to EPC, 5GC or both EPC and 5GC.

MR-DC User Plane Architecture

From a UE point of view, there are three Data Radio Bearer (DRB) types in MR-DC: MCG, SCG and split DRB, characterized by which cell group is used for transmission. See FIG. 4. MCG DRB uses only the MCG, SCG DRB uses only the SCG, whereas split DRB can use both MCG and SCG for data transmission. For RLC/MAC, the protocol version (E-UTRA or NR) is selected based on the RAT used by the cell group. NR PDCP is used for all DRB types, except in EN-DC it is also possible for the network to configure E-UTRA PDCP for MCG DRB.

From a network point of view, each DRB may be terminated either by the MN or the SN. This applies to all three bearer types, so that from a network point of view, six different bearer configurations are possible, see FIG. 5 and FIG. 6. For bearer types requiring data transmission over X2/Xn interface, a flow control protocol is used between MN and SN to avoid excessive buffering of data on RLC bearer level, which may lead to excessive reordering at the receiving PDCP entity. The RLC bearer contains the RLC/MAC configuration for each logical channel towards the UE.

For DL transmission on split DRBs, the network decides per PDCP PDU whether to transmit via MCG or SCG. For UL transmission on split DRBs, the UE is configured with a buffer threshold. When data in buffer for the corresponding DRB is below the threshold, Buffer Status Reports (BSR) are sent only on the preferred path. The preferred path can be either MCG or SCG, and is configured by the network per DRB. When data in the buffer is above the buffer threshold, the UE reports the total BSR to both MCG and SCG. It is then up to the network scheduler using scheduling grants in MCG and SCG to control the uplink data flow.

FIG. 5 shows the network side radio protocol termination options for MCG, SCG and split bearers in the MN and SN for MR-DC with EPC (EN-DC).

FIG. 6 shows the network side radio protocol termination options for MCG, SCG and split bearers in the MN and SN for MR-DC with 5GC.

MR-DC Control Plane Architecture

A UE in MR-DC has a single control plane connection to the core network and a single RRC state, controlled by the MN. Both MN and SN have their own RRC entity for creating RRC messages or Information Elements (IE) for configuring the UE. See FIG. 7. Since the SN is responsible for its own resources, it provides the UE with the Secondary Cell Group (SCG) configuration in an RRC message and also the radio bearer configuration in an IE, for all bearers that are terminated in the SN. The MN in turn creates the Master Cell Group (MCG) configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

The MN sends the initial SN RRC configuration via MCG SRB (SRB1), but subsequent RRC configurations created by the SN can be sent to the UE either via the MN using SRB1 or directly to the UE using SRB3 (if configured). See FIG. 8 for the different SRB types. For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the UE in the same RRC message.

Split SRB1 is used to create diversity. From RRC point of view, it operates like normal SRB1. However, on PDCP level, the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg", "path" and "RLC bearer" are used interchangeably throughout this document.

For the SRB3 case, the SN creates the RRC message including the SCG configuration and radio bearer configuration for radio bearers terminated in the SN. SN may only use SRB3 for reconfigurations not requiring coordination with MN.

3GPP is currently standardizing integrated access and wireless access backhaul (IAB) in New Radio (NR) in Rel-16 (3GPP Work Item Description, Enhancements to Integrated Access and Backhaul for NR, RP-193251).

The usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides an opportunity for self-backhauling, without limiting the spectrum to be used for the access links. On top of that, the inherent multi-beam and MIMO support in NR reduces cross-link interference between backhaul and access links, allowing higher densification.

During the study item phase of the IAB work (a summary of the study item can be found in the technical report 3GPP TR 38.874 v16.0.0), it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that is used to communicate with their parent nodes.

The specifications for IAB strive to reuse existing functions and interfaces defined in NR. In particular, MT, gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 9 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

FIG. 9 shows a high-level architectural view of an IAB network, including a number of possible network architectures for an IAB network. Each architecture comprises an IAB-donor and one or more IAB-nodes, which may comprise a base station, such as a 5G NodeB (gNB), evolved NodeB (eNB), etc. Each IAB-node has wireless backhaul capabilities, to transmit wirelessly to an IAB-donor or another IAB-node via the MT function, and can also serve UEs via the DU function. The IAB-donor has a wired (e.g. fibre) connection to a core network (CN) of the communication network, whereas the IAB-nodes typically do not have a wired connection to the core network. A connection from the core network to the user equipment thus passes through the IAB-donor and one or more IAB-nodes. Each IAB-donor has one or more DU functions, and each DU function is capable of communicating with one or more IAB-nodes. An IAB-node is also capable of acting as an intermediate IAB-node between the IAB-donor and another IAB-node, or between two IAB-nodes.

The baseline user plane and control plane protocol stacks for IAB are shown in FIGS. 10 and 11.

As shown in FIGS. 10 and 11, the chosen protocol stacks reuse the current CU-DU split specification in rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and DTLS in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul RLC channel (and also between ingress and egress backhaul RLC channels in intermediate IAB nodes) to satisfy the end to end QoS requirements of bearers.

BAP Entities

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 12 shows one example of the functional view of the BAP sublayer. This functional view should not restrict implementation. The figure is based on the radio interface protocol architecture defined in 3GPP TS 38.300 v16.2.0. In the example of FIG. 12, the receiving part on the BAP entity delivers BAP PDUs to the transmitting part on the collocated BAP entity. Alternatively, the receiving part may deliver BAP SDUs to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

Services Provided to Upper Layers

The following services are provided by the BAP sublayer to upper layers:

data transfer;

Services Expected from Lower Layers

A BAP sublayer expects the following services from lower layers per RLC entity (for a detailed description see 3GPP TS 38.322 v16.1.0):

acknowledged data transfer service;

unacknowledged data transfer service.

Functions

The BAP sublayer supports the following functions:

Data transfer;

Determination of BAP destination and path for packets from upper layers;

Determination of egress backhaul (BH) RLC channels for packets routed to next hop;

Routing of packets to next hop;

Differentiating traffic to be delivered to upper layers from traffic to be delivered to egress link;

Flow control feedback and polling signalling;

Topology Adaptation Scenarios for Baseline Architecture

FIG. 13 shows an example of some possible IAB-node migration cases listed in the order of complexity.

Intra-CU Case (A): In this case the IAB-node (e) along with its serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, since the new IAB-donor DU (i.e. DU2) is connected to the same L2 network, the IAB-node (e) can use the same IP address under the new donor DU. However, the new donor DU (i.e. DU2) will need to inform the network using IAB-node (e) L2 address in order to get/keep the same IP address for IAB-node (e) by employing some mechanism such as Address Resolution Protocol (ARP).

Intra-CU Case (C): This case is more complex than Case (A) as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and SeGW, and new IP address for the IPsec tunnel between SeGW and IAB-node (e) DU.

Inter-CU Case (D): This is the most complicated case in terms of procedural requirements and may needs new specification procedures that are beyond the scope of 3GPP Rel-16.

Note that 3GPP Rel-16 has standardized procedure only for intra-CU migration, which is described below.

SUMMARY

There currently exist certain challenge(s).

3GPP Rel-16 has standardized only IAB intra-CU migration procedure (i.e. when the IAB node changes parent node to another parent node served by the same CU). However, certain enhancements to existing UE handover and IAB intra-CU migration procedure are desired to reduce service interruption (due to IAB-node migration) and signaling load.

In order to perform the handover in an optimized way, a group handover procedure has been proposed. For example, the Xn/X2 handover request/Handover request ACK messages can be modified (or new messages introduced) for performing the group handover of an IAB node and all the UEs/IAB nodes that the IAB node that it is directly/indirectly serving.

In some scenarios, a migrating IAB node may be part of a secondary node for the UEs (or for children IAB nodes), as illustrated in FIG. 14. UE1 and IAB4 have IAB3 as an SN, and IAB3 performs an inter-CU migration with IAB6 as the new parent. In this case the group handover functionality currently discussed will support handover for the UEs and IAB nodes that are only connected to IAB3 (e.g. IAB5). The group handover cannot be used for UE1 and IAB3 where only the SCG cell is migrated to CU2.

Another example is shown in FIG. 15, where the UE is actually connected in EN-DC mode with IAB3 as the SN.

Though it is not shown in FIGS. 14 and 15, there can be several UEs and IAB nodes that are in a similar situation as UE1 and IAB4 above where the migration of the IAB3 to another CU is actually an SN change and not a handover. It is also possible that UEs and IAB nodes being served by a descendant of the migrating IAB node (e.g. IAB5) may be using that IAB node as a SN (e.g. there can be a UE that has IAB4 as the MN and IAB5 as the SN). Thus, also such UEs or IAB nodes will be involved in an SN change, and not in a handover when IAB3 performs an inter-CU migration.

Currently there is no support in the 3GPP specifications for group SN change, meaning that the source CU would need to initiate separate SN change procedures for all UEs and IAB nodes connected to a migrating IAB nodes used as a SN. Given that there could be a large number of UEs operating in Non-Standalone NR mode where the IAB node act as a SN, it is important to optimize this scenario.

Certain aspects of the present disclosure and their embodiments may provide solutions to these or other challenges.

Embodiments of the present disclosure propose X2/Xn signaling enhancements for performing group SN change and SN additions (e.g. adding the contexts of a plurality of UEs and IAB-MTs at a target secondary node). The main scenario is inter-CU IAB node migration, where the migrating IAB node, or the descendants of the migrating IAB node, are serving other UEs or IAB nodes as a SN.

However, the proposed solutions are also applicable for non-IAB scenarios when there is a need to relocate a plurality of UEs that are using a certain SN to another SN (this could be a change of S-eNB or S-gNB, or in the case of CU-DU split, a change from one DU to another DU connected to a CU different from the source CU), for example, for load balancing purposes.

There are, proposed herein, various embodiments which address one or more of the issues disclosed herein. One embodiment provides a method performed by a first base station. The first base station is configured as one of a plurality of base stations providing services to a plurality of devices in a wireless communication network according to a multi-connectivity configuration for the plurality of devices. The method comprises: transmitting a request message to a second base station of the plurality of base stations, the request message requesting an alteration to the multi-connectivity configuration for the plurality of devices.

Another embodiment provides a method performed by a second base station. The second base station is configured as one of a plurality of base stations providing services to a plurality of devices in a wireless communication network according to a multi-connectivity configuration for the plurality of devices. The method comprises: receiving one or more request messages from a first base station of the plurality of base stations, the one or more request messages requesting an alteration to the multi-connectivity configuration for the plurality of devices; and transmitting a response message to the first base station, the response message comprising an indication of whether the alteration to the multi-connectivity configuration for the plurality of devices was successful or unsuccessful.

Certain embodiments may provide one or more of the following technical advantage(s). Without the signaling enhancements proposed in this disclosure, individual signaling is required to perform the SN changes for each and every affected UE or IAB node. Besides adding more signaling overhead, individual signaling could also delay the overall IAB node migration, due to the need to wait until SN change is performed for all connected UEs and IAB nodes until the IAB node could be moved. This problem could be particular bad in case of cascaded IAB nodes (A, B, C, . . . ), where the mobility of IAB node A, needs to wait for the SN change preparation to be completed of IAB node B, which in turn needs to wait for IAB node C, etc.

Having a single procedure to perform multiple SN change for connected IAB nodes and UEs also has the advantage of reducing the risk of SN change failure. Example: assume that the probability that a given SN change will fail is 10%, it is most likely still 10% for a group SN change including 10 UEs. However, the probability of failure would be over 65% ($1-0.9^{10}$) that at least one SN change would fail if the SN change would be performed individually. This could delay the whole IAB node migration e.g. due to the need for the source CU to wait for time out for a sub-procedure which may have failed until it completes the IAB node migration.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Aspects of the present disclosure thus provide methods for the alteration of a dual- or, more generally, multi-connectivity configuration for a plurality of devices (such as UEs or IAB nodes). In one aspect, a network node or base station (such as a master base station) transmits a request message to another network node or base station (such as a secondary base station), requesting alteration to the multi-connectivity configuration of a plurality of devices. That is, one message may be used to request alterations to the multi-connectivity configuration of a plurality of devices, and particularly the addition, change, or release of one or more secondary base stations for that multi-connectivity configuration. In another aspect, a network node or base station (such as a secondary base station) transmits a response message to another network node or base station (such as a master base station), comprising an indication of whether a requested alteration to the multi-connectivity configuration of a plurality of devices was successful or unsuccessful. That is, one message may be used to report that the multi-connectivity configuration of multiple devices was successful or unsuccessful.

Of course, these aspects may be utilized together, such that a single request message and a single response message are sent in respect of an alteration to the multi-connectivity configurations of a plurality of devices. However, they may also be used separately, such that a single response message may be transmitted in response to receipt of multiple request messages, or a single request message may be responded to by a plurality of response messages. These and additional aspects are discussed below.

Figure 1:
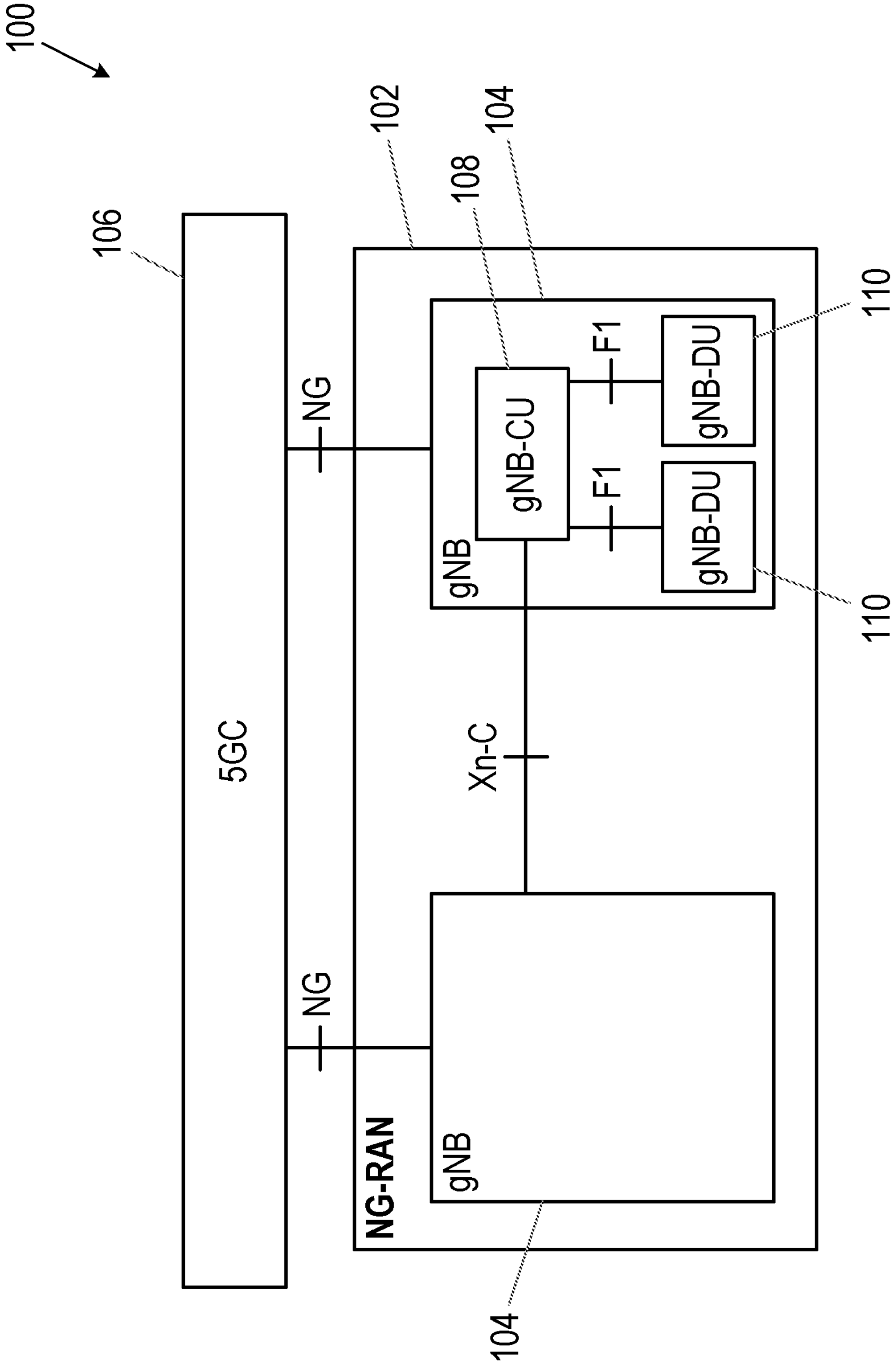
FIG. 1 is a schematic diagram showing the network architecture of a wireless communication network complying with 5G standards, and in particular, the next generation radio access network (NG-RAN)
Figure 2:
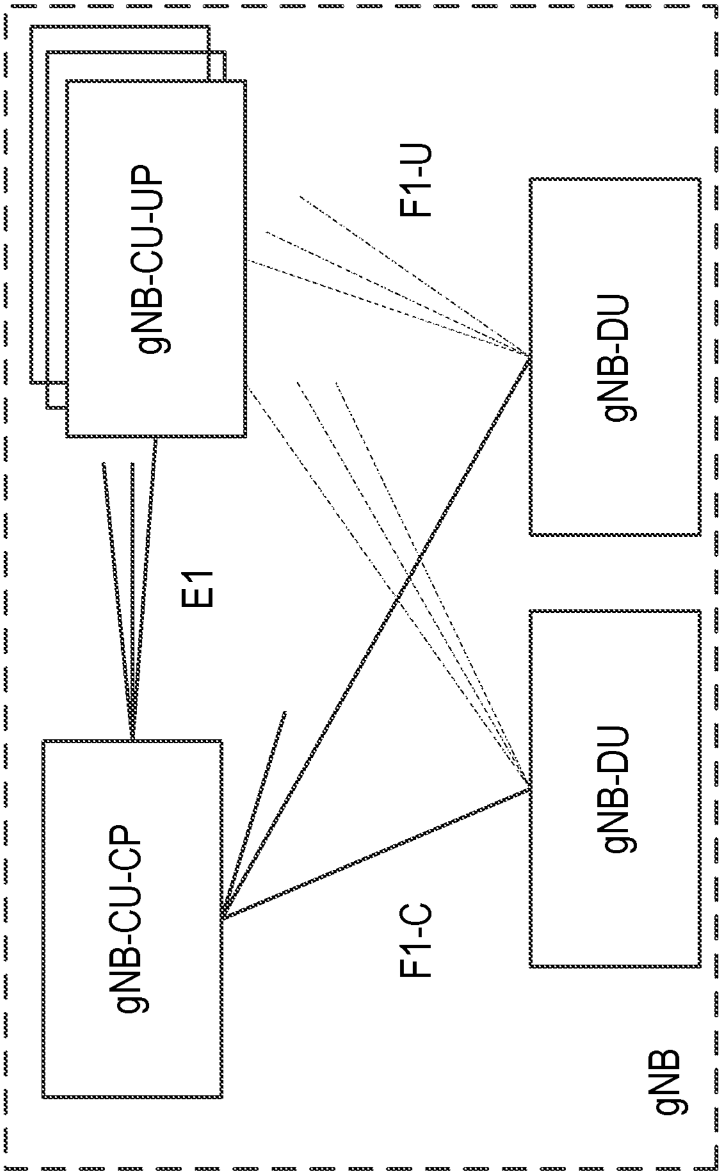
FIG. 2 is a schematic diagram showing the overall architecture for separation of gNB-CU-CP and gNB-CU-UP.
Figure 3:
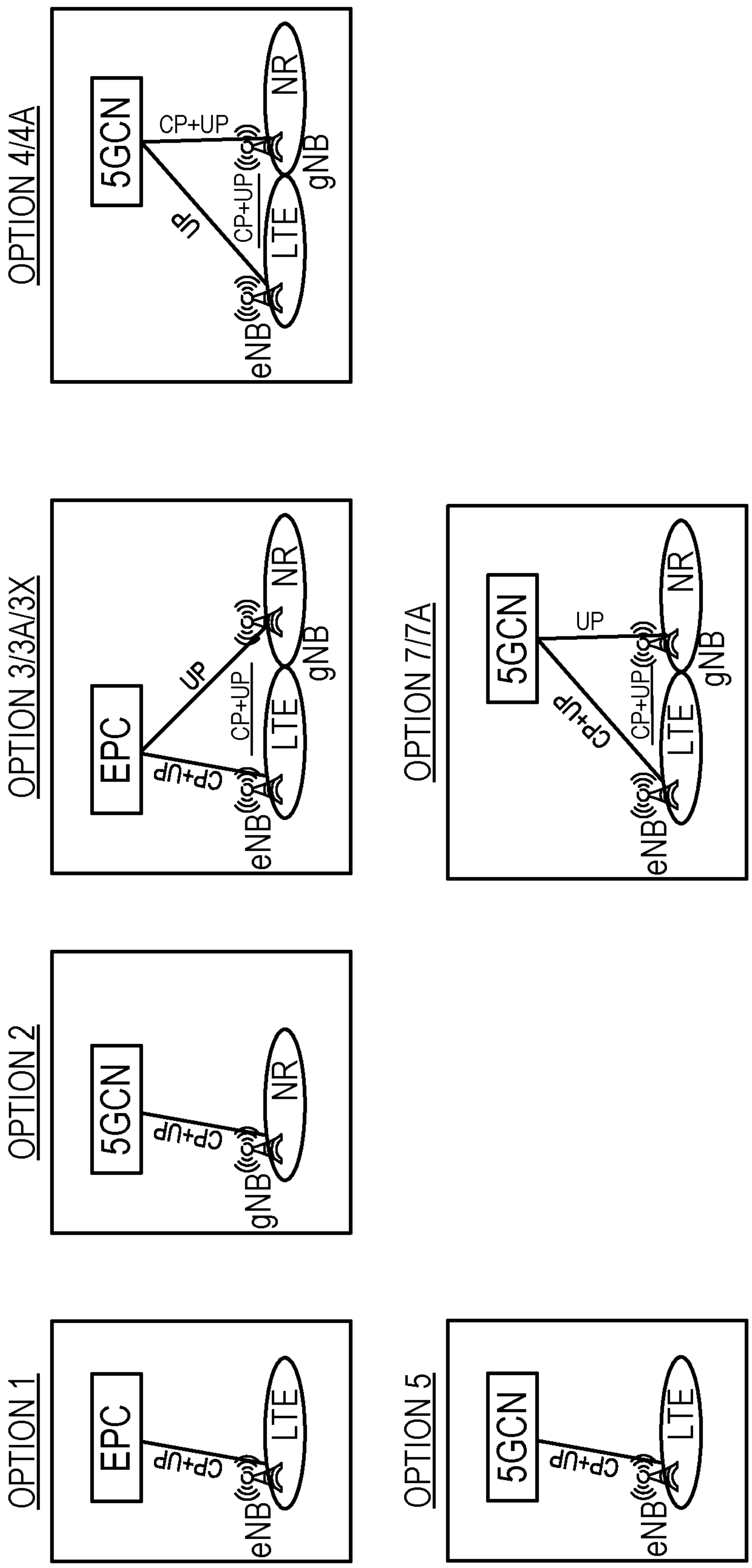
FIG. 3 is a schematic diagram showing LTE and NR interworking options.
Figure 4:
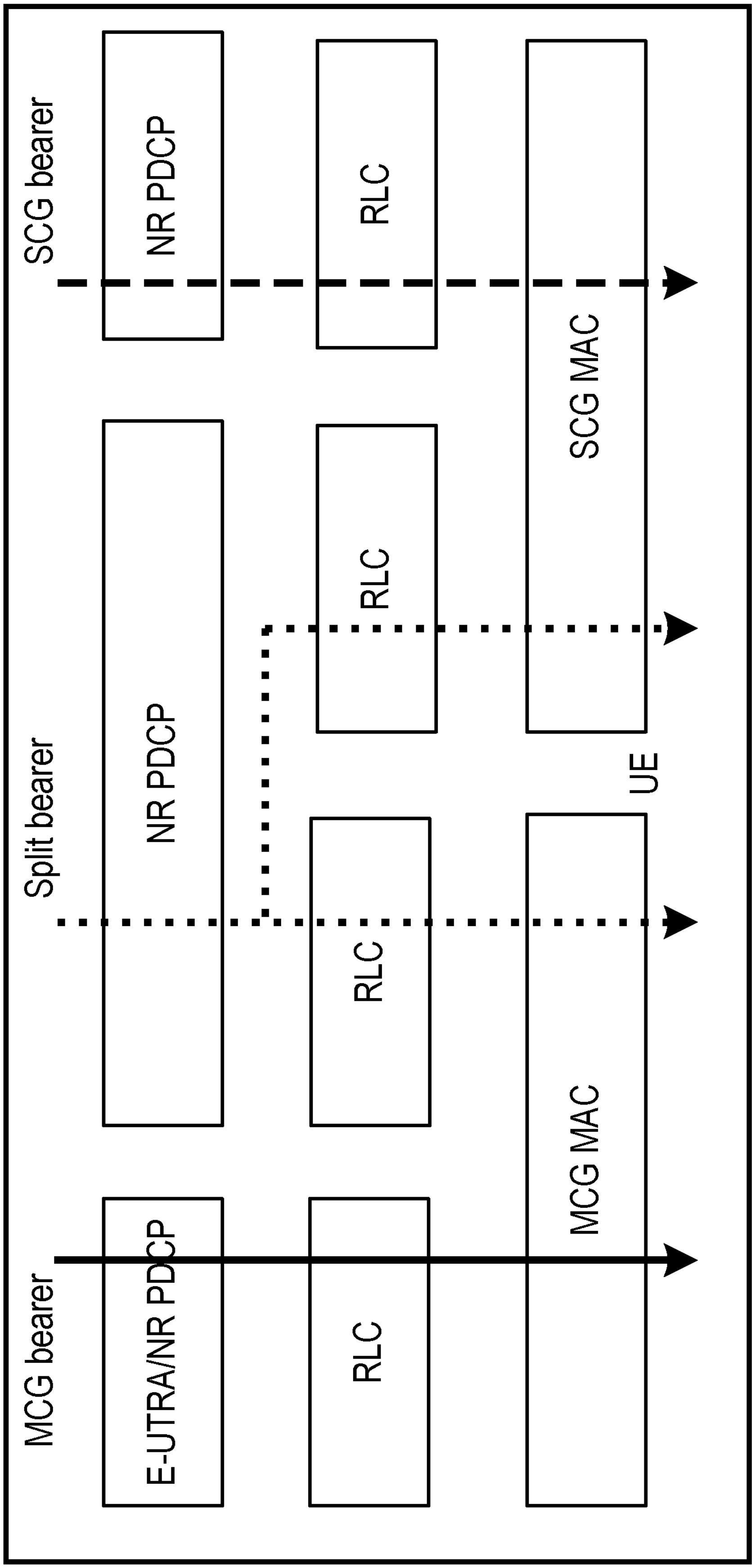
FIG. 4 is a schematic diagram showing radio bearer types in MR-DC.
Figure 5:
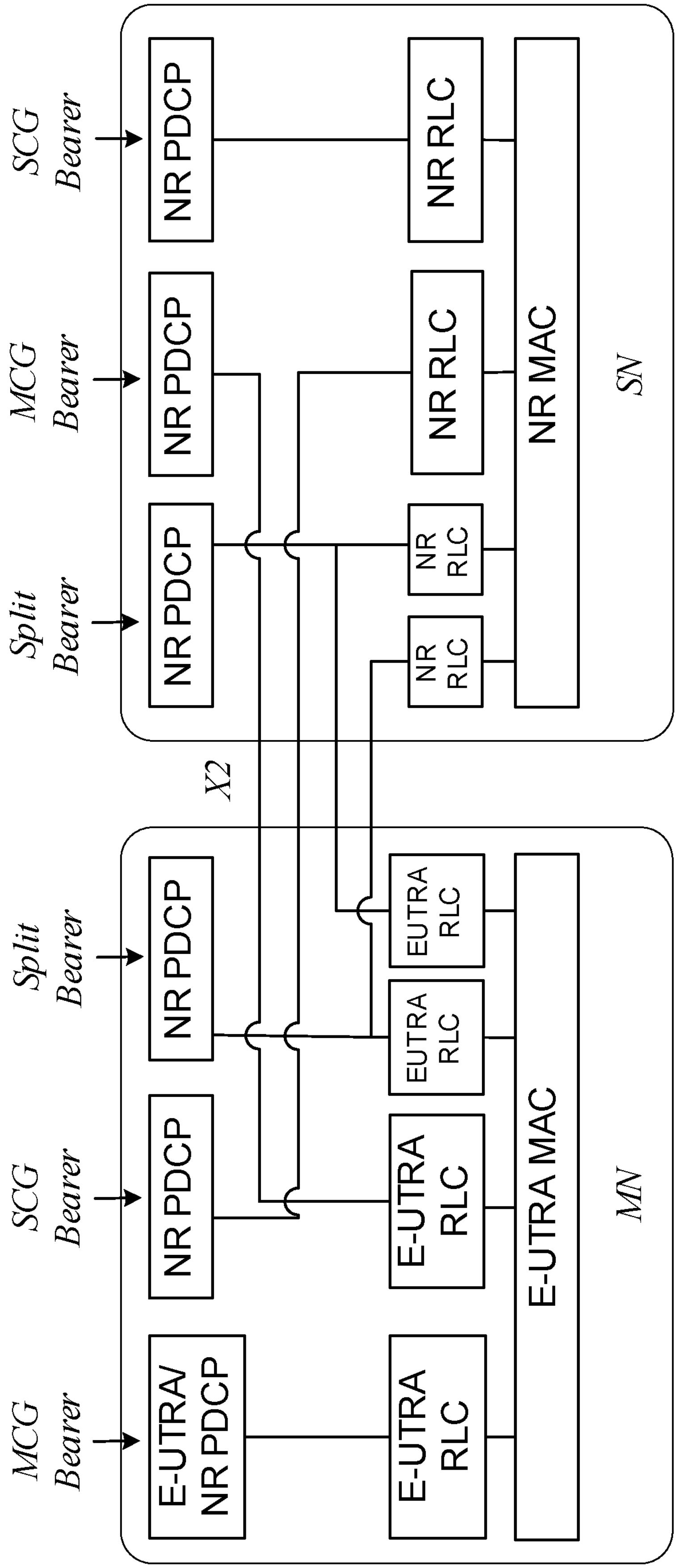
FIG. 5 is a schematic diagram showing the network side radio protocol termination options for MCG, SCG and split bearers in the MN and SN for MR-DC with EPC (EN-DC)
Figure 6:
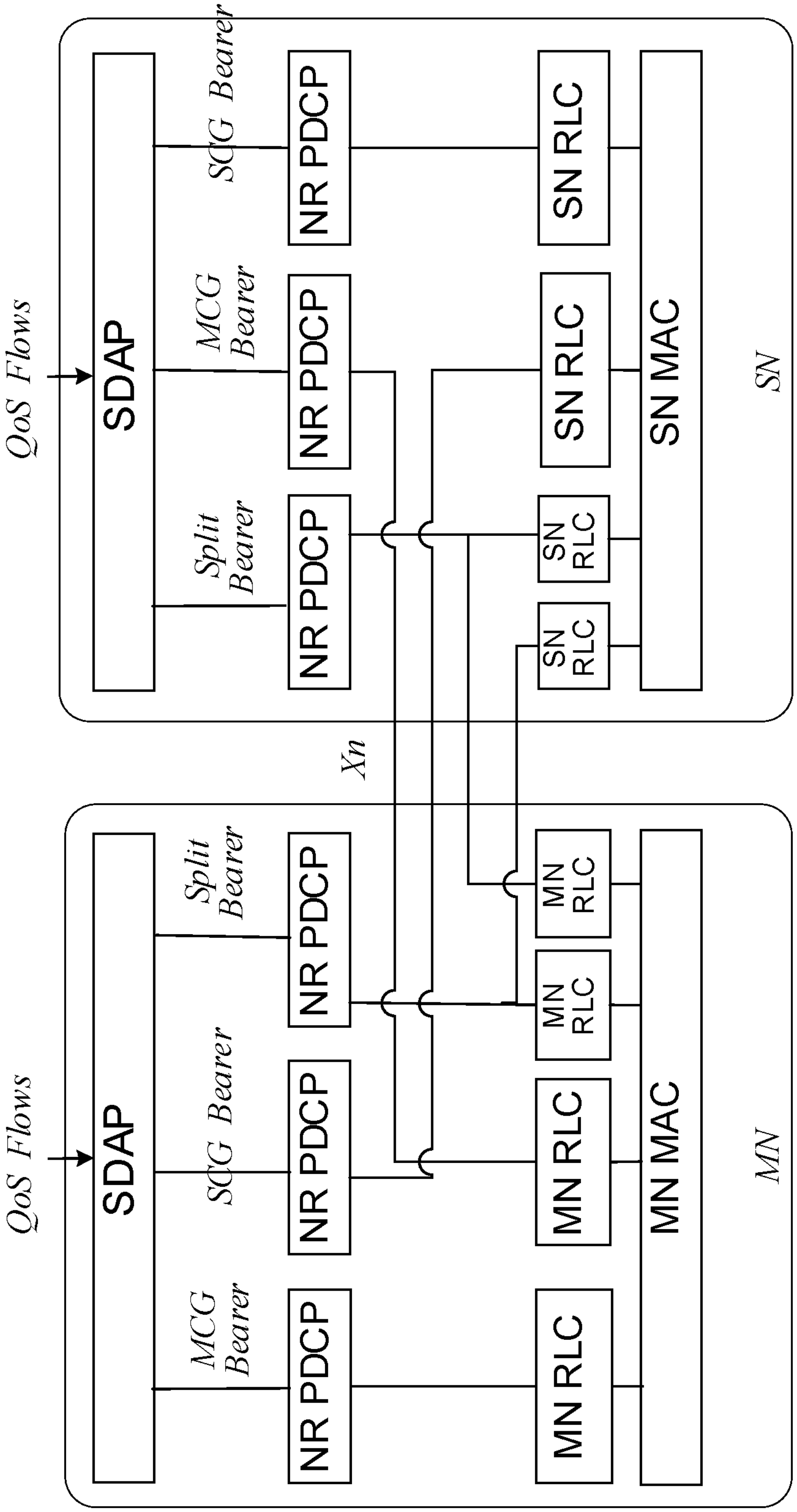
FIG. 6 is a schematic diagram showing the network side radio protocol termination options for MCG, SCG and split bearers in the MN and SN for MR-DC with 5GC.
Figure 7:
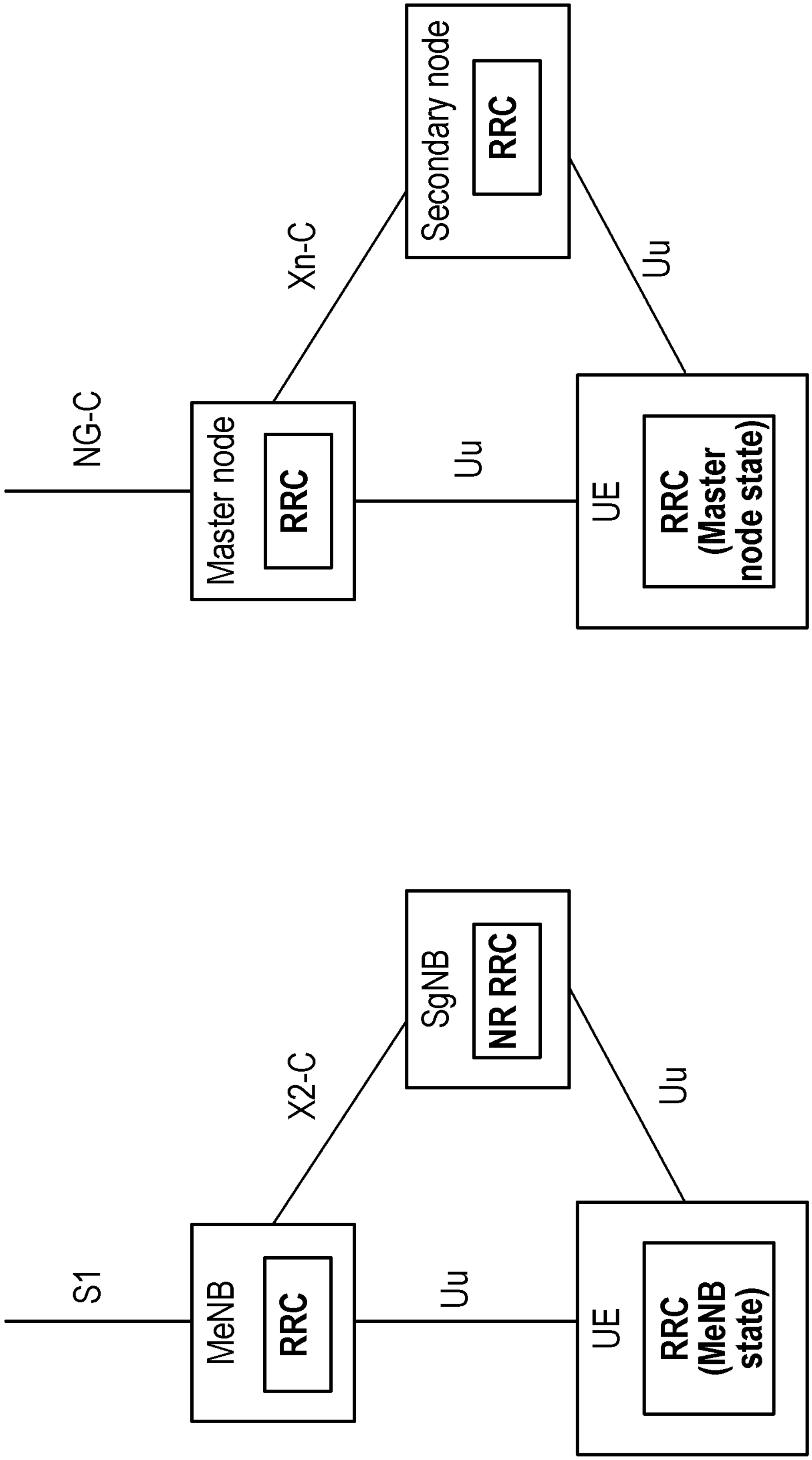
FIG. 7 is a schematic diagram showing control plane architecture for EN-DC (left) and MR-DC with 5GC (right)
Figure 8:
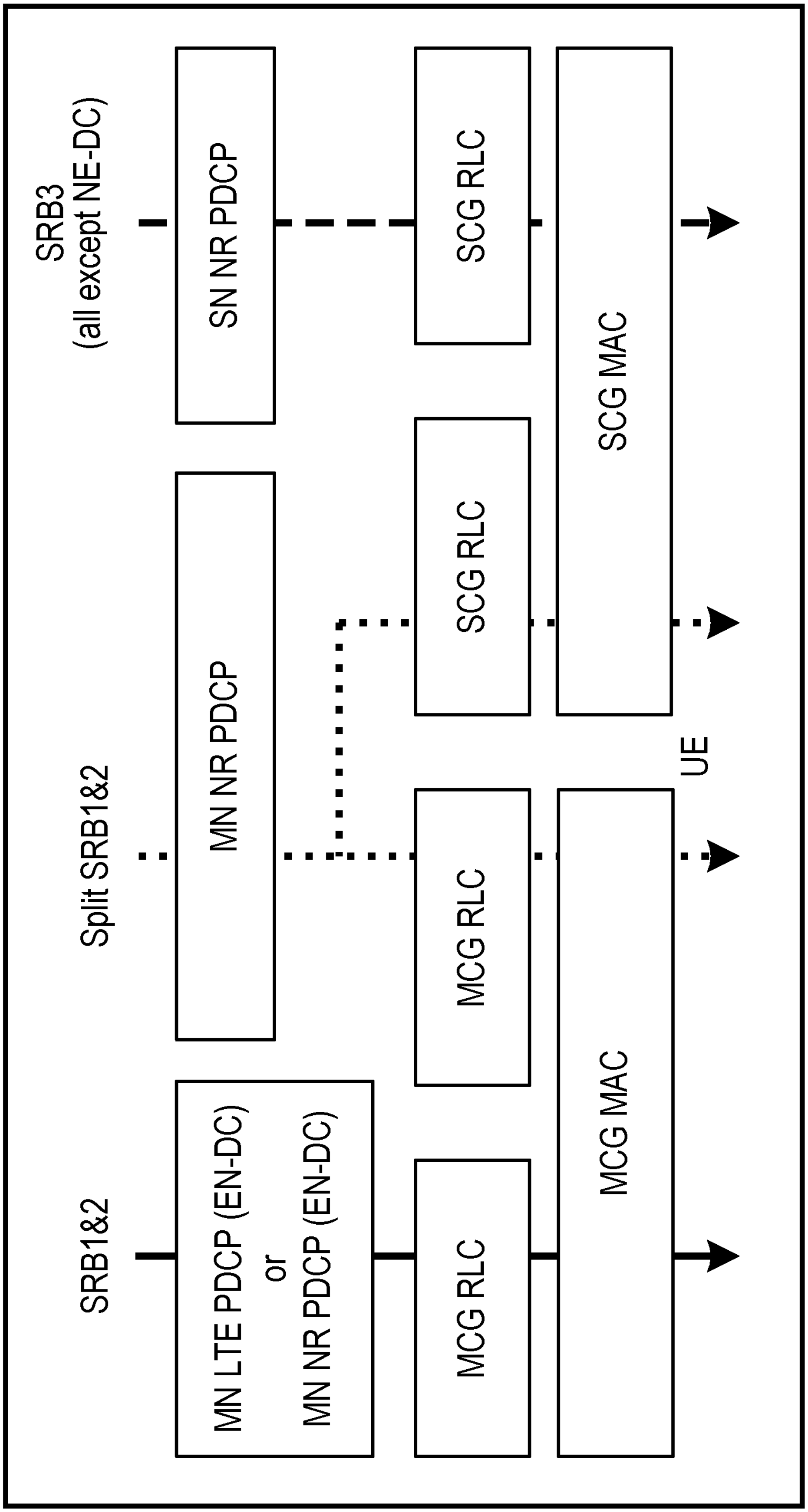
FIG. 8 is a schematic diagram showing network side protocol termination options for SRBs in MR-DC.
Figure 9:
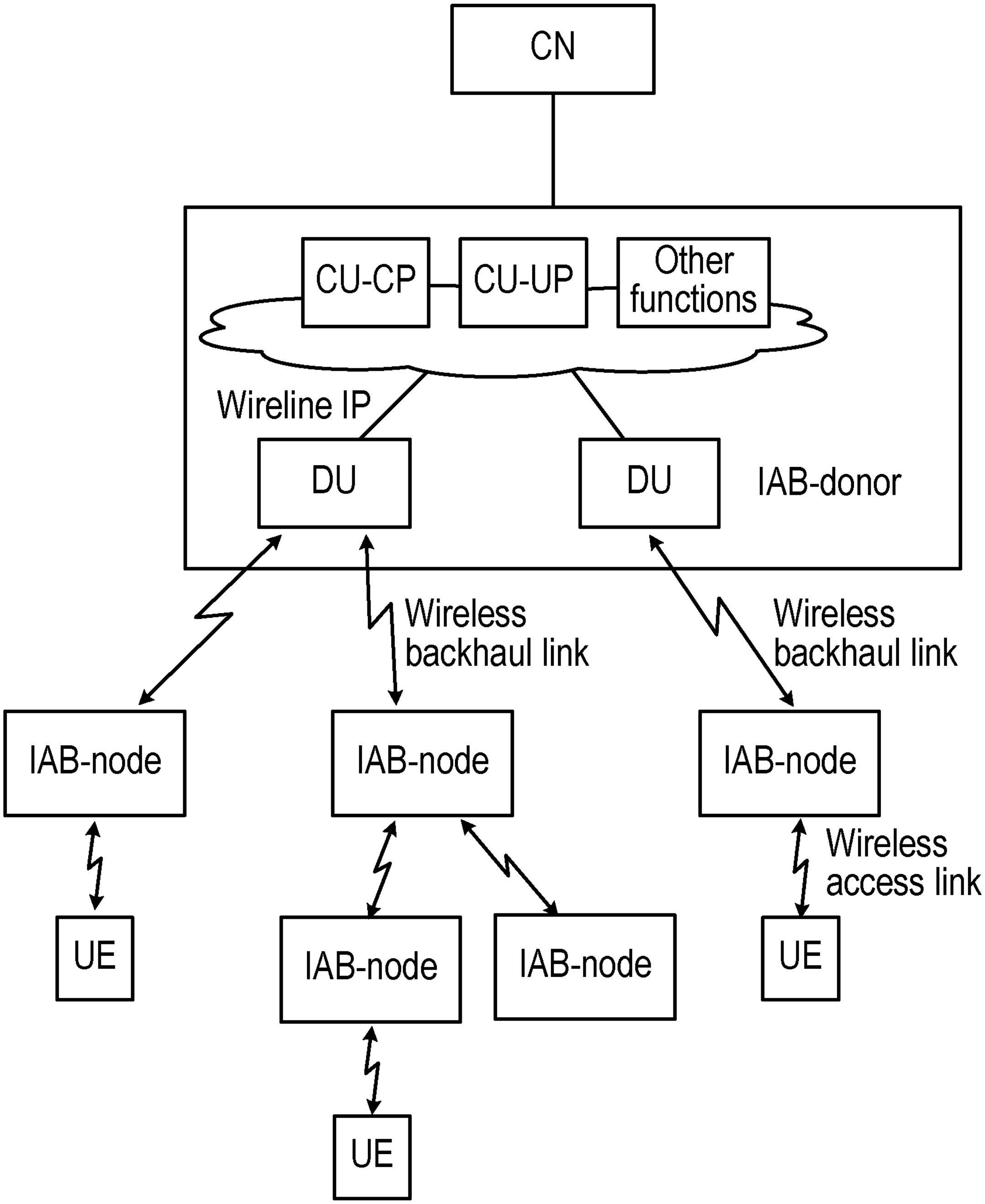
FIG. 9 is a schematic diagram showing a high-level architectural view of an IAB network.
Figure 10:
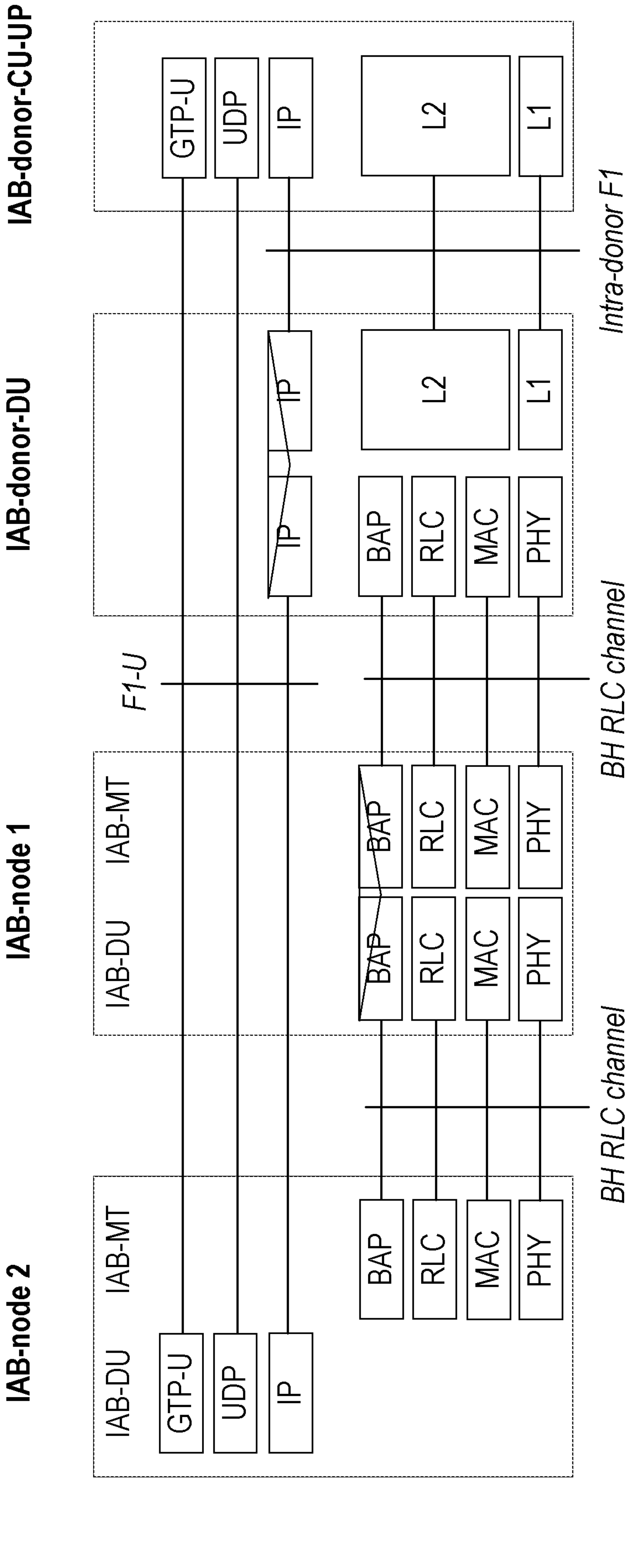
FIG. 10 is a schematic diagram showing a baseline User Plane (UP) protocol stack for IAB in rel-16.
Figure 11:
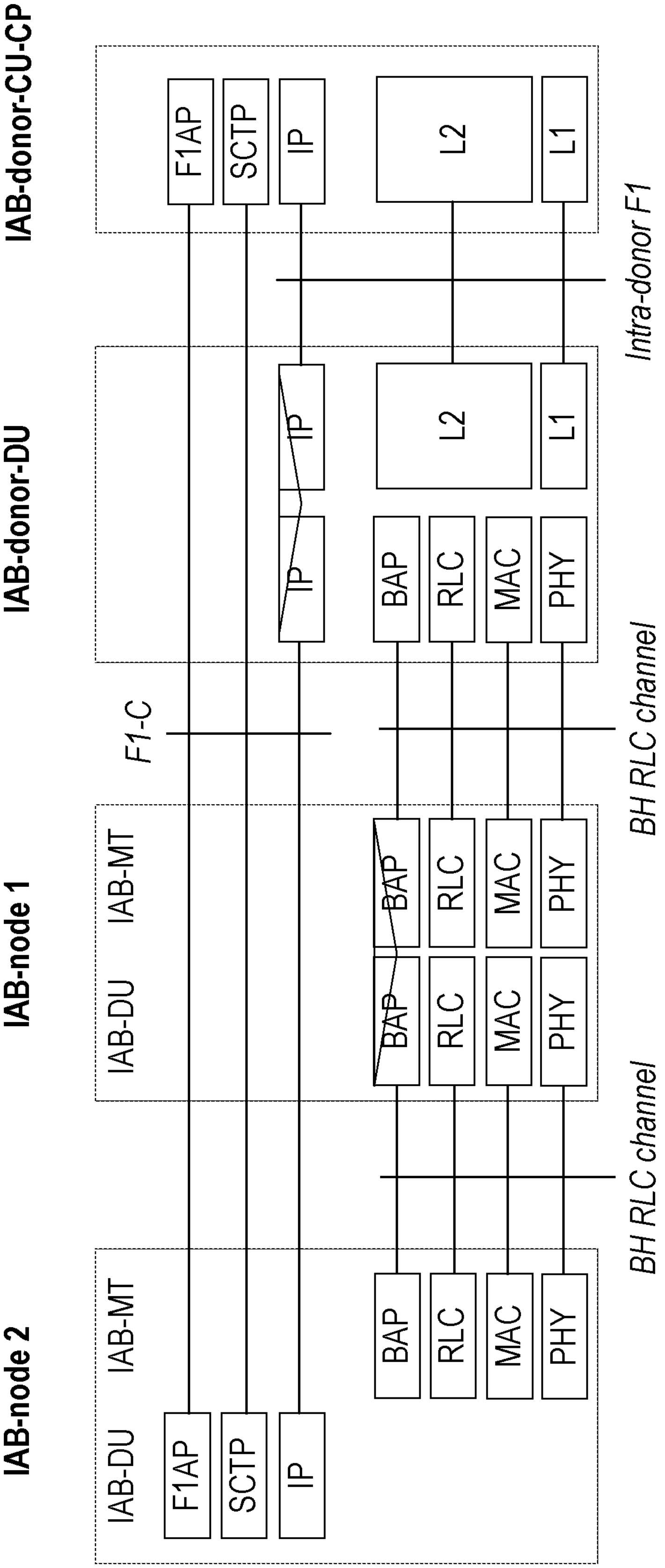
FIG. 11 is a schematic diagram showing baseline control plane (CP) protocol stack for IAB in rel-16.
Figure 12:
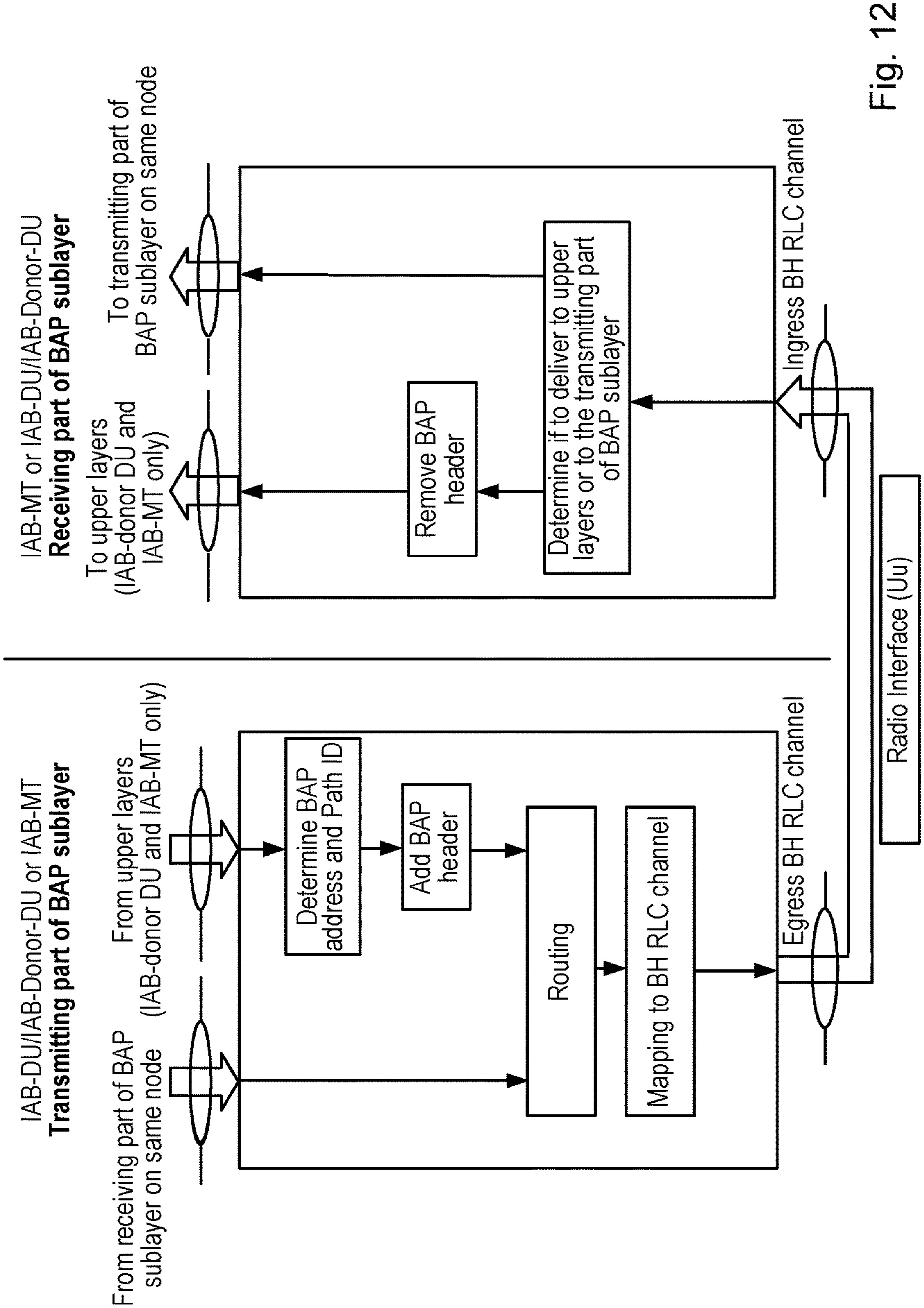
FIG. 12 is a schematic diagram showing one example of a functional view of the BAP sublayer.
Figure 13:
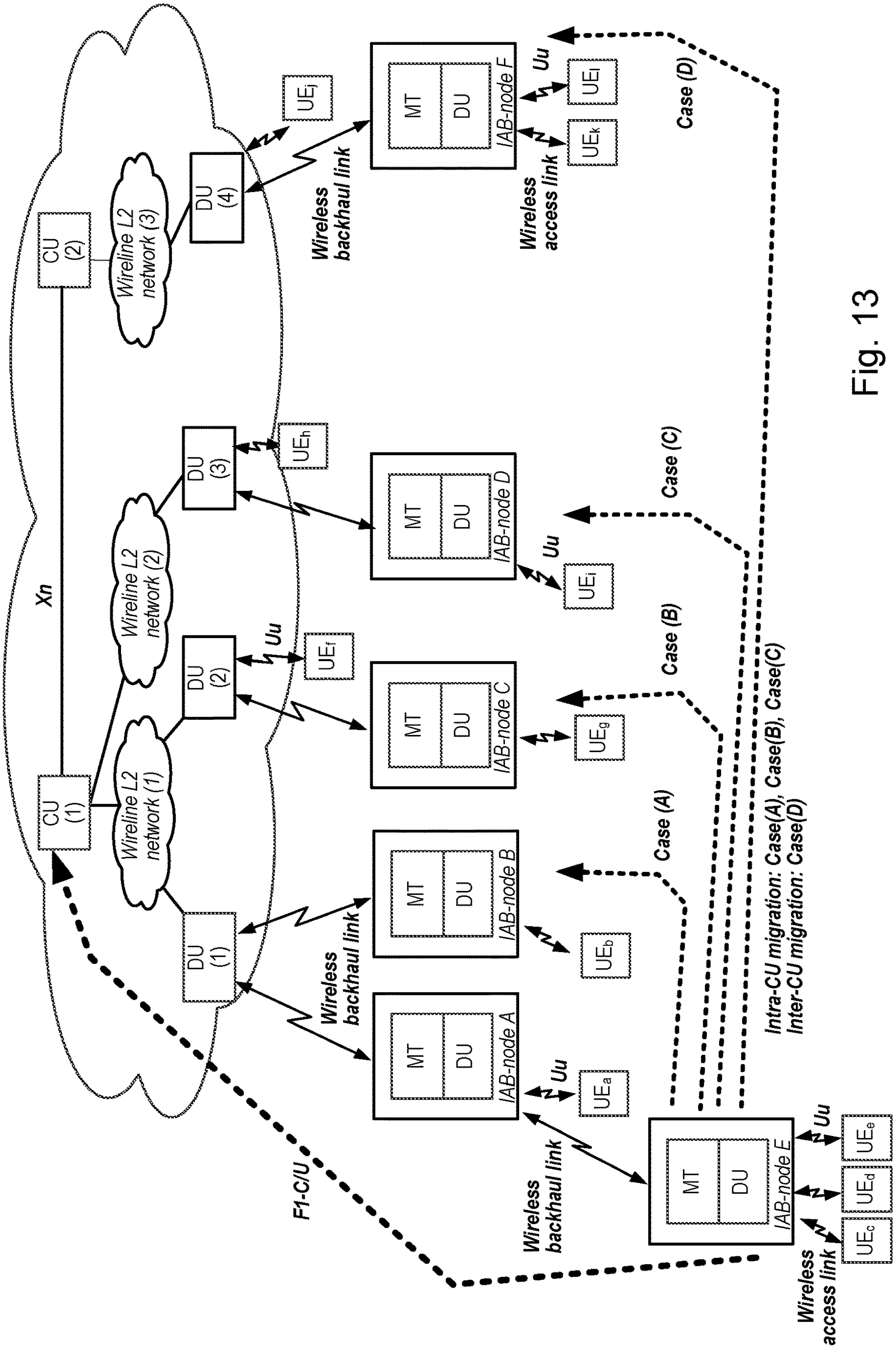
FIG. 13 is a schematic diagram showing possible IAB-node migration cases listed in the order of complexity.
Figure 14:
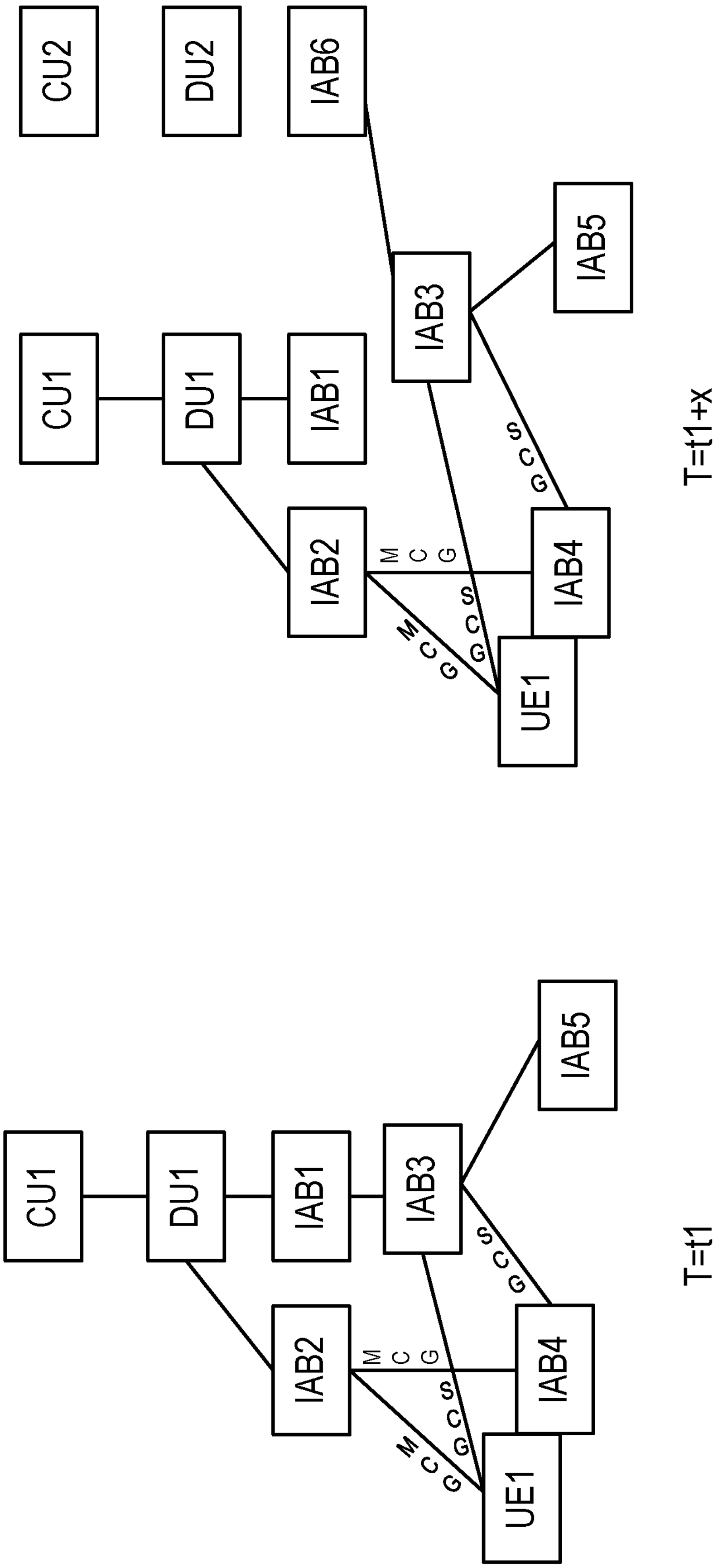
FIGS. 14 and 15 are schematic diagrams showing examples of inter-CU node migration.
Figure 15:
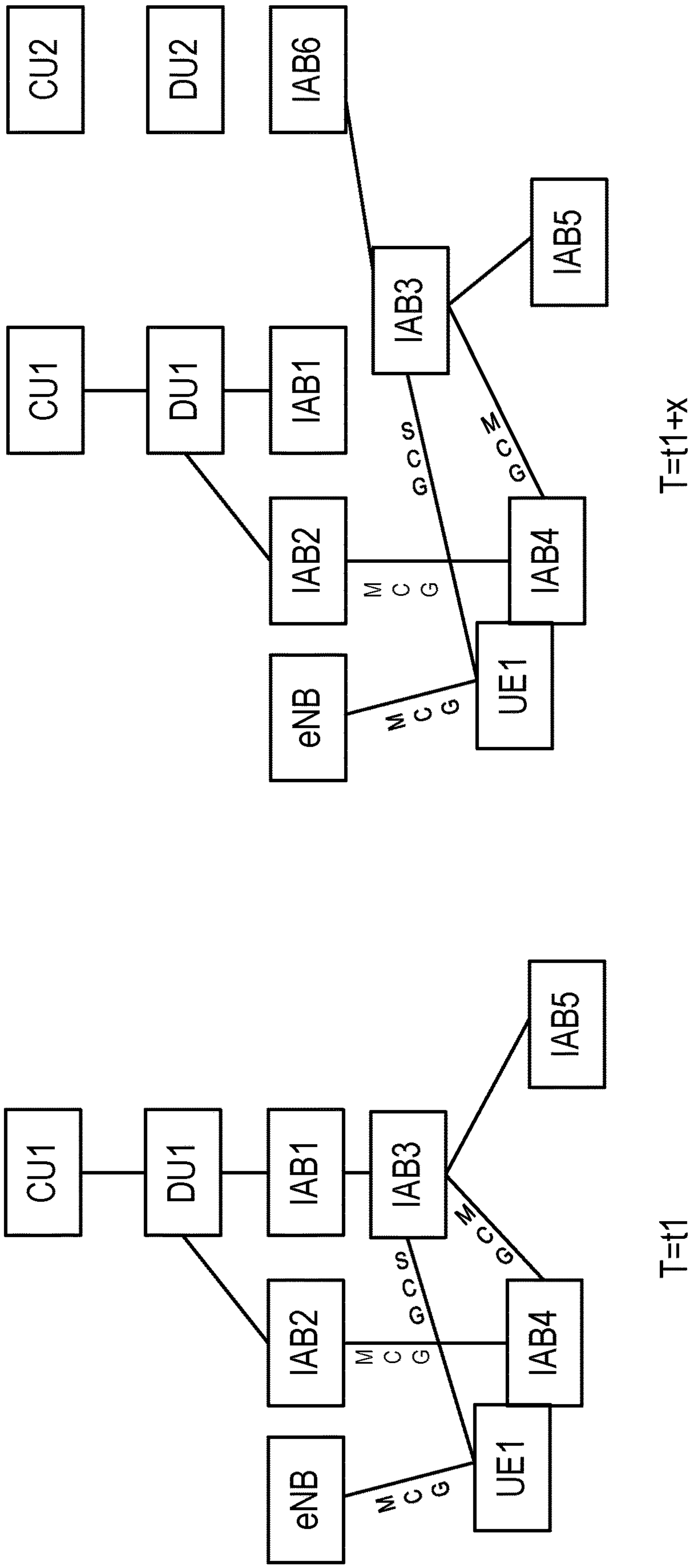
Figure 16:
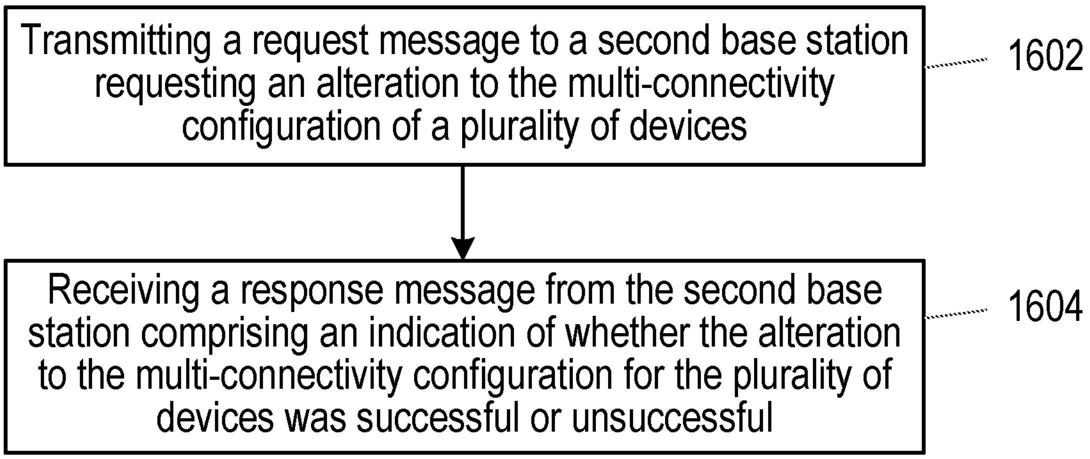
FIG. 16 is a flowchart of a method performed by a first base station or network node in accordance with some embodiments.

FIG. 16 depicts a method in accordance with particular embodiments. The method may be performed by a first base station or network node (e.g., eNB, gNB, CU-CP, etc), configured as a master base station or a secondary base station of a plurality of base stations providing multi-connectivity for a plurality of devices. Here, the term "devices" is intended to cover wireless devices (e.g., UEs) and/or IAB nodes (and particularly the MT functions or entities within those nodes). Further detail regarding the structure of the first base station may be found below with respect to the network node 2860.

The method begins at step 1602, in which the first base station transmits a request message to a second base station (e.g., eNB, gNB, CU-CP, etc) of the plurality of base stations, comprising a request for an alteration to the multi-connectivity configuration of a plurality of devices (e.g., UEs and/or IAB-MTs). For example, the requested alteration may relate to a change in the secondary node configuration, such as the addition of resources at the second base station for the plurality of devices (e.g., and the subsequent establishment of a secondary connection for the plurality of devices to the second base station), the release of resources from the second base station for the plurality of devices, or a change in the secondary node for the plurality of devices.

For example, the first base station may be a master node for the plurality of devices, and request the addition of resources to or the release of resources from the second base station for the plurality of devices. In this case, the second base station may be configured as a secondary node for the plurality of devices. In another example, the first base station may be a secondary node for the plurality of devices, and request the second base station to grant release of resources from the first base station or the change of secondary node for the plurality of devices. In this case, the second base station may be configured as a master node for the plurality of devices.

The request message may correspond to a newly defined message, dedicated for the purposes of requesting alterations to the multi-connectivity configurations of a plurality of devices, or may correspond to an existing message which is adapted to relate to a plurality of devices. In the former case, the request message may comprise any of: Group SgNB Addition Request; Group SgNB Release Request; Group SgNB Release Required; Group SgNB Change Required; or any of the LTE equivalents to these messages. In the latter case, the request message may comprise any of SgNB Addition Request; SgNB Release Request; SgNB Release Required; SgNB Change Required; or any of the LTE equivalents to these messages.

The request message may comprise the identities of the plurality of devices. Optionally, the first base station may assign a group identifier (e.g., a random number) to the plurality of devices, and include an indication of the group identifier in the request message.

For example, a group identifier may be assigned in an S-NODE addition message as follows:

Message Type

M-NG-RAN node UE Group XnAP ID

UE Context Info List

>UE Context Info List Item

>> . . .

In this way, the second base station is enabled to identify the plurality of devices using the group identifier in any response message. Further, the group identifier may be utilized later by the first base station or the second base station when requesting release of the resources for the group of devices. In that case, a request message requesting release of the resources for the plurality of devices need only include the group identifier and not the identities of each device in the group. For example, a group S-NODE release message may be structured as follows:

TABLE A

| | | | | |
|---|---|---|---|---|
| Message Type | M | 9.2.3.1 | YES | reject |
| M-NG-RAN Node UE Group XnAP ID | M | 9.2.3.x | YES | reject |
| Cause | M | 9.2.3.2 | YES | ignore |
| Criticality Diagnostics | O | 9.2.3.3 | YES | ignore |

The NG RAN node UE Group XnAP ID uniquely identifies the UE context group that a UE/IAB-MT belongs to.

TABLE B

| IE/Group Name | Presence | Range | IE type and reference | Semantics description |
|---|---|---|---|---|
| NG-RAN node UE Group XnAP ID | M | | INTEGER ($0 \ldots 2^{32}$-1) | |

The request message may identify multiple groups of devices in the plurality of devices. For example, a group S-NODE addition message may be structured as follows:

Message Type

UE Context Group Info List

>UE Context Group Info List Item

>>M-NG-RAN node UE Group XnAP ID>

>>UE Context Info List

>>>UE Context Info List Item

>>>> . . .

A group S-NODE release message could be structured as follows:

TABLE C

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1..<maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | ignore |
| Criticality Diagnostics | O | | 9.2.3.3 | | YES | ignore |

The request message may be transmitted over an interface between the first and second base stations, such as an Xn or X2 interface.

The request message may additionally comprise indications of contexts for the wireless connections between the plurality of devices and the network (e.g., UE capabilities, radio connection parameters such as transmit powers, sequence numbers, etc). That is, the request message may comprise an indication of a context for each of the plurality of devices.

Where the method is performed in a wireless communication network comprising an IAB network, the MT of the IAB node serving the device (e.g., UE or IAB-MT) could be indicated in the request messages (e.g., S-NODE ADDITION or SGNB addition request messages). For example, in the S-NODE ADDITION REQUEST message, a new IE could be included, e.g. parent IAB-MT XnAP ID, that indicates the IAB node serving the concerned device. The reception of the legacy UE associated S-NODE Release Request or SGNB Release Request message that includes the XnAP ID of the IAB-MT thus can be interpreted by the SN to mean that the contexts of all the UEs and IAB-MTs that are associated with the indicated IAB-MT have to be released as well.

In step 1604, the first base station receives a response message from the second base station comprising an indication of whether or not the alterations to the multi-connectivity configurations of the plurality of devices was successful.

The response message may correspond to a newly defined message, dedicated for the purposes of responding to a request for alteration to the multi-connectivity configurations of a plurality of devices, or may correspond to an existing message which is adapted to relate to a plurality of devices. In the former case, the request message may comprise any of: Group SgNB Addition Request Acknowledge; Group SgNB Addition Request Reject; Group SgNB Release Request Acknowledge; Group SgNB Release Request Reject; Group SgNB Release Confirm; Group SgNB Change Confirm; Group SgNB Change Refuse; or any of the LTE equivalents to these messages. In the latter case, the request message may comprise any of SgNB Addition Request Acknowledge; SgNB Addition Request Reject; SgNB Release Request Acknowledge; SgNB Release Request Reject; SgNB Release Confirm; SgNB Change Confirm; SgNB Change Refuse; or any of the LTE equivalents to these messages.

The response message may only be transmitted by the second base station if the requested alteration to the multi-connectivity configuration is successful for all of the devices. Alternatively, if the requested alteration is successful for only a subset of the plurality of devices (e.g., one or more, but not all of the devices), the request message may comprise an indication of the identities of the devices for which the requested alteration was successful or unsuccessful. For example, if the response message corresponds to a positive confirmation message (e.g., those messages listed above ending with "Acknowledge" or "Confirm"), the response message may comprise an indication of the identities for which the alteration was unsuccessful. Devices for which the alteration was successful may or may not be identified in the response message. In another example, if the response message corresponds to a negative confirmation message (e.g., those messages listed above ending with "Refuse" or "Reject"), the response message may comprise an indication of the identities for which the alteration was successful. Devices for which the alteration was unsuccessful may or may not be identified in the response message. In any of these embodiments, the response message or messages may comprise an indication of the group identifier in the request message if it contained one.

For example, in response to a group S-Node Addition Request, the response message may correspond to a group S-Node Addition Response message that combines both ACKs and Rejections, as shown below:

Admitted UE Context Info List
>Admitted UE Context Info List Item
>>M-NG-RAN node UE XnAP ID
. . .
Rejected UE context Info
>Cause
>Criticality Diagnostics >Rejected UE Context Info List
>>>Rejected UE Context Info List Item
>>>>M-NG-RAN node UE XnAP ID>
>>>S-NG-RAN node UE XnAP ID In alternative embodiments, step 1604 may comprise the reception of multiple response messages. For example, a first, positive, response message may be received comprising an indication of the identities of devices for which the requested alteration was successful; and a second, negative response message may be received comprising an indication of the identities for which the requested alteration was unsuccessful.

Some of the information elements (IEs) in the request or response messages (such as those for the contexts of the devices) may be the same for some or all devices (e.g., UEs/IAB-MTs). That is, the information elements may comprise the same values for multiple devices. For example, in the GROUP S-NODE ADDITION REQUEST message, the PCellID can be the same for all devices (e.g. if the same serving cell at the MN is the PCell for all of them). In this case, the request message or response message may contain single instances of information elements which are the same for all devices (e.g., the PCellID, Expected UE behavior, Location Information at S-NODE reporting, Desired Activity Notification Level, MR-DC Resource Coordination Information, SN Addition Trigger Indication, Trace Activation, etc), and respective instances of information elements for the devices which differ as between the devices. In this way, the request message or response message can be reduced in size.

Thus, a message structure may be implemented where instead of listing all the IEs for all devices, a certain number of them are applicable to all of the UEs. For example, the request or response message may take the following structure:

common IE for all UEs #1
common IE for all UEs #2
. . .
common IE for all UEs #n
UE Context Info List
>UE Context Info List Item
>>UE specific IE #1
>>UE specific IE #2
. . .

In a further embodiment, one or more IEs in the group messages may be the same for only a subset of the devices. In this case, the message structure may be adapted to include single instances of IEs which are the same for a subset of the devices as amongst the subset of devices (i.e., one instance per subset), and respective instances of IEs which are different as between the devices (i.e., one instances per device). In this case, the message structure for the request messages or response messages may be as follows:

UE Context Group Info List
>UE Context Group Info List Item
>>common IE for all UEs in this group #1
>>common IE for all UEs in this group #2
. . .
>>common IE for all UEs in this group #m
>>>UE context Info List
>>>>UE context Info List Item
>>>>>UE Specific IE #1
>>>>>UE Specific IE #2
. . .

In further embodiments, one or more first IEs may be applicable to all of the devices, one or more second IEs may be applicable only to subsets of the devices, and one or more third IEs may be appliable to only single devices. Thus the two message structures set out above may be combined for request or response messages, as follows:

common IE for all UEs #1
common IE for all UEs #2
. . .
common IE for all UEs #n
UE Context Group Info List
>UE Context Group Info List Item
>>common IE for all UEs in this group #1
>>common IE for all UEs in this group #2
. . .
>>common IE for all UEs in this group #m
>>>UE context Info List
>>>>UE context Info List Item
>>>>>UE Specific IE #1
>>>>>UE Specific IE #2
. . .

The Cause and/or Criticality Diagnostics IEs (in response messages, such as GROUP S-NODE ADDITION REQUEST ACKNOWLEDGE, GROUP S-NODE ADDITION REQUEST REJECT, etc) may be on a per-device level, meaning that each item on the list would have its own instance of these two IEs.

Figure 17:
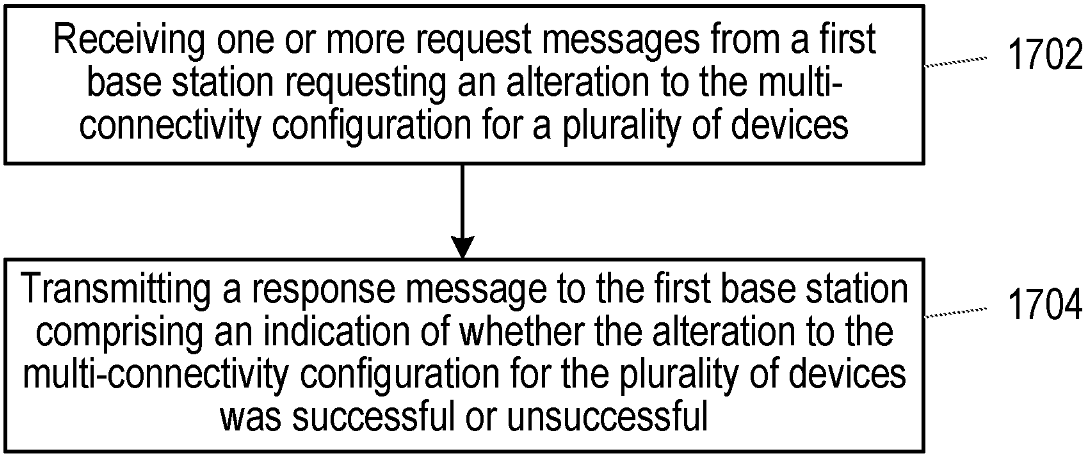
FIG. 17 is a flowchart of a method performed by a second base station or network node in accordance with some embodiments.

FIG. 17 depicts a method in accordance with particular embodiments. The method may be performed by a second base station or network node, configured as a master base station or a secondary base station of a plurality of base stations providing multi-connectivity for a plurality of devices. Here, the term "devices" is intended to cover wireless devices (e.g., UEs) and/or IAB nodes (and particularly the MT functions or entities within those nodes). Further detail regarding the structure of the second base station may be found below with respect to the network node 2860.

The method begins at step 1702, in which the second base station receives one or more request messages from a first base station (e.g., eNB, gNB, CU-CP, etc) of the plurality of base stations, comprising a request for an alteration to the multi-connectivity configuration of a plurality of devices (e.g., UEs and/or IAB-MTs). For example, the requested alteration may relate to a change in the secondary node configuration, such as the addition of resources at the second base station for the plurality of devices (e.g., and the subsequent establishment of a secondary connection for the plurality of devices to the second base station), the release of resources from the second base station for the plurality of devices, or a change in the secondary node for the plurality of devices.

For example, the first base station may be a master node for the plurality of devices, and request the addition of resources to or the release of resources from the second base station for the plurality of devices. In this case, the second base station may be configured as a secondary node for the plurality of devices. In another example, the first base station may be a secondary node for the plurality of devices, and request the second base station to grant release of resources from the first base station or the change of secondary node for the plurality of devices. In this case, the second base station may be configured as a master node for the plurality of devices.

The request message may correspond to a newly defined message, dedicated for the purposes of requesting alterations to the multi-connectivity configurations of a plurality of devices, or may correspond to an existing message which is adapted to relate to a plurality of devices. In the former case, the request message may comprise any of: Group SgNB Addition Request; Group SgNB Release Request; Group SgNB Release Required; Group SgNB Change Required; or any of the LTE equivalents to these messages. In the latter case, the request message may comprise any of SgNB Addition Request; SgNB Release Request; SgNB Release Required; SgNB Change Required; or any of the LTE equivalents to these messages.

The request message may comprise the identities of the plurality of devices. Optionally, the first base station may assign a group identifier (e.g., a random number) to the plurality of devices, and include an indication of the group identifier in the request message.

For example, a group identifier may be assigned in an S-NODE addition message as follows:

Message Type
M-NG-RAN node UE Group XnAP ID
UE Context Info List
>UE Context Info List Item
>> . . .

In this way, the second base station is enabled to identify the plurality of devices using the group identifier in any response message. Further, the group identifier may be utilized later by the first base station or the second base station when requesting release of the resources for the group of devices. In that case, a request message requesting release of the resources for the plurality of devices need only include the group identifier and not the identities of each device in the group. For example, a group S-NODE release message may be structured as follows:

TABLE D

| | | | | |
|---|---|---|---|---|
| Message Type | M | 9.2.3.1 | YES | reject |
| M-NG-RAN Node UE Group XnAP ID | M | 9.2.3.x | YES | reject |
| Cause | M | 9.2.3.2 | YES | ignore |
| Criticality Diagnostics | O | 9.2.3.3 | YES | ignore |

The NG RAN node UE Group XnAP ID uniquely identifies the UE context group that a UE/IAB-MT belongs to.

TABLE E

| IE/Group Name | Presence | Range | IE type and reference | Semantics description |
|---|---|---|---|---|
| NG-RAN node UE Group XnAP ID | M | | INTEGER (0 . . . $2^{32}$-1) | |

The request message may identify multiple groups of devices in the plurality of devices. For example, a group S-NODE addition message may be structured as follows:

Message Type
UE Context Group Info List
>UE Context Group Info List Item
>>M-NG-RAN node UE Group XnAP ID>
>>UE Context Info List
>>>UE Context Info List Item
>>>> . . .

A group S-NODE release message could be structured as follows:

TABLE F

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1..<maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | ignore |
| Criticality Diagnostics | O | | 9.2.3.3 | | YES | ignore |

The request message may be transmitted over an interface between the first and second base stations, such as an Xn or X2 interface.

The request message may additionally comprise indications of contexts for the wireless connections between the plurality of devices and the network (e.g., UE capabilities, radio connection parameters such as transmit powers, sequence numbers, etc). That is, the request message may comprise an indication of a context for each of the plurality of devices.

Where the method is performed in a wireless communication network comprising an IAB network, the MT of the IAB node serving the device (e.g., UE or IAB-MT) could be indicated in the request messages (e.g., S-NODE ADDITION or SGNB addition request messages). For example, in the S-NODE ADDITION REQUEST message, a new IE could be included, e.g. parent IAB-MT XnAP ID, that indicates the IAB node serving the concerned device. The reception of the legacy UE associated S-NODE Release Request or SGNB Release Request message that includes the XnAP ID of the IAB-MT thus can be interpreted by the SN to mean that the contexts of all the UEs and IAB-MTs that are associated with the indicated IAB-MT have to be released as well.

In step 1704, the second base station transmits a response message to the first base station comprising an indication of whether or not the alterations to the multi-connectivity configurations of the plurality of devices were successful.

The response message may correspond to a newly defined message, dedicated for the purposes of responding to a request for alteration to the multi-connectivity configurations of a plurality of devices, or may correspond to an existing message which is adapted to relate to a plurality of devices. In the former case, the request message may comprise any of: Group SgNB Addition Request Acknowledge; Group SgNB Addition Request Reject; Group SgNB Release Request Acknowledge; Group SgNB Release Request Reject; Group SgNB Release Confirm; Group SgNB Change Confirm; Group SgNB Change Refuse; or any of the LTE equivalents to these messages. In the latter case, the request message may comprise any of SgNB Addition Request Acknowledge; SgNB Addition Request Reject; SgNB Release Request Acknowledge; SgNB Release Request Reject; SgNB Release Confirm; SgNB Change Confirm; SgNB Change Refuse; or any of the LTE equivalents to these messages.

The response message may only be transmitted by the second base station if the requested alteration to the multi-connectivity configuration is successful for all of the devices. Alternatively, if the requested alteration is successful for only a subset of the plurality of devices (e.g., one or more, but not all of the devices), the request message may comprise an indication of the identities of the devices for which the requested alteration was successful or unsuccessful. For example, if the response message corresponds to a positive confirmation message (e.g., those messages listed above ending with "Acknowledge" or "Confirm"), the response message may comprise an indication of the identities for which the alteration was unsuccessful. Devices for which the alteration was successful may or may not be identified in the response message. In another example, if the response message corresponds to a negative confirmation message (e.g., those messages listed above ending with "Refuse" or "Reject"), the response message may comprise an indication of the identities for which the alteration was successful. Devices for which the alteration was unsuccessful may or may not be identified in the response message. In any of these embodiments, the response message or messages may comprise an indication of the group identifier in the request message if it contained one.

For example, in response to a group S-Node Addition Request, the response message may correspond to a group S-Node Addition Response message that combines both ACKs and Rejections, as shown below:

Admitted UE Context Info List
>Admitted UE Context Info List Item
>>M-NG-RAN node UE XnAP ID
. . .
Rejected UE context Info
>Cause
>Criticality Diagnostics
>Rejected UE Context Info List
>>>Rejected UE Context Info List Item
>>>>M-NG-RAN node UE XnAP ID>
>>>S-NG-RAN node UE XnAP ID In alternative embodiments, step 1704 may comprise the transmission of multiple response messages. For example, a first, positive, response message may be transmitted comprising an indication of the identities of devices for which the requested alteration was successful; and a second, negative response message may be transmitted comprising an indication of the identities for which the requested alteration was unsuccessful.

Some of the information elements (IEs) in the request or response messages (such as those for the contexts of the devices) may be the same for some or all devices (e.g., UEs/IAB-MTs). That is, the information elements may comprise the same values for multiple devices. For example, in the GROUP S-NODE ADDITION REQUEST message, the PCellID can be the same for all devices (e.g. if the same serving cell at the MN is the PCell for all of them). In this case, the request message or response message may contain single instances of information elements which are the same for all devices (e.g., the PCellID, Expected UE behavior, Location Information at S-NODE reporting, Desired Activity Notification Level, MR-DC Resource Coordination Information, SN Addition Trigger Indication, Trace Activation, etc), and respective instances of information elements for the devices which differ as between the devices. In this way, the request message or response message can be reduced in size.

Thus, a message structure may be implemented where instead of listing all the IEs for all devices, a certain number of them are applicable to all of the UEs. For example, the request or response message may take the following structure:

common IE for all UEs #1
common IE for all UEs #2
. . .
common IE for all UEs #n
UE Context Info List
>UE Context Info List Item
>>UE specific IE #1
>>UE specific IE #2
. . .

In a further embodiment, one or more IEs in the group messages may be the same for only a subset of the devices. In this case, the message structure may be adapted to include single instances of IEs which are the same for a subset of the devices as amongst the subset of devices (i.e., one instance per subset), and respective instances of IEs which are different as between the devices (i.e., one instances per device). In this case, the message structure for the request messages or response messages may be as follows:

UE Context Group Info List
>UE Context Group Info List Item
>>common IE for all UEs in this group #1
>>common IE for all UEs in this group #2
. . .
>>common IE for all UEs in this group #m
>>>UE context Info List
>>>>UE context Info List Item
>>>>>UE Specific IE #1
>>>>>UE Specific IE #2
. . .

In further embodiments, one or more first IEs may be applicable to all of the devices, one or more second IEs may be applicable only to subsets of the devices, and one or more third IEs may be appliable to only single devices. Thus the two message structures set out above may be combined for request or response messages, as follows:

common IE for all UEs #1
common IE for all UEs #2
. . .
common IE for all UEs #n
UE Context Group Info List
>UE Context Group Info List Item
>>common IE for all UEs in this group #1
>>common IE for all UEs in this group #2
. . .

>>common IE for all UEs in this group #m

>>>UE context Info List

>>>>UE context Info List Item

>>>>>UE Specific IE #1

>>>>>UE Specific IE #2

. . .

The Cause and/or Criticality Diagnostics IEs (in response messages, such as GROUP S-NODE ADDITION REQUEST ACKNOWLEDGE, GROUP S-NODE ADDITION REQUEST REJECT, etc) may be on a per-device level, meaning that each item on the list would have its own instance of these two IEs.

The following description sets out a number of signalling diagrams illustrating the procedures for adding a secondary node for a plurality of devices, releasing resources in a secondary node for a plurality of resources, and changing the secondary node for a plurality of devices, and particularly describes the transmission and reception of request and response messages related to a plurality of devices, as described above with respect to FIGS. 16 and 17.

Secondary Node Addition

EN-DC

Figure 18:
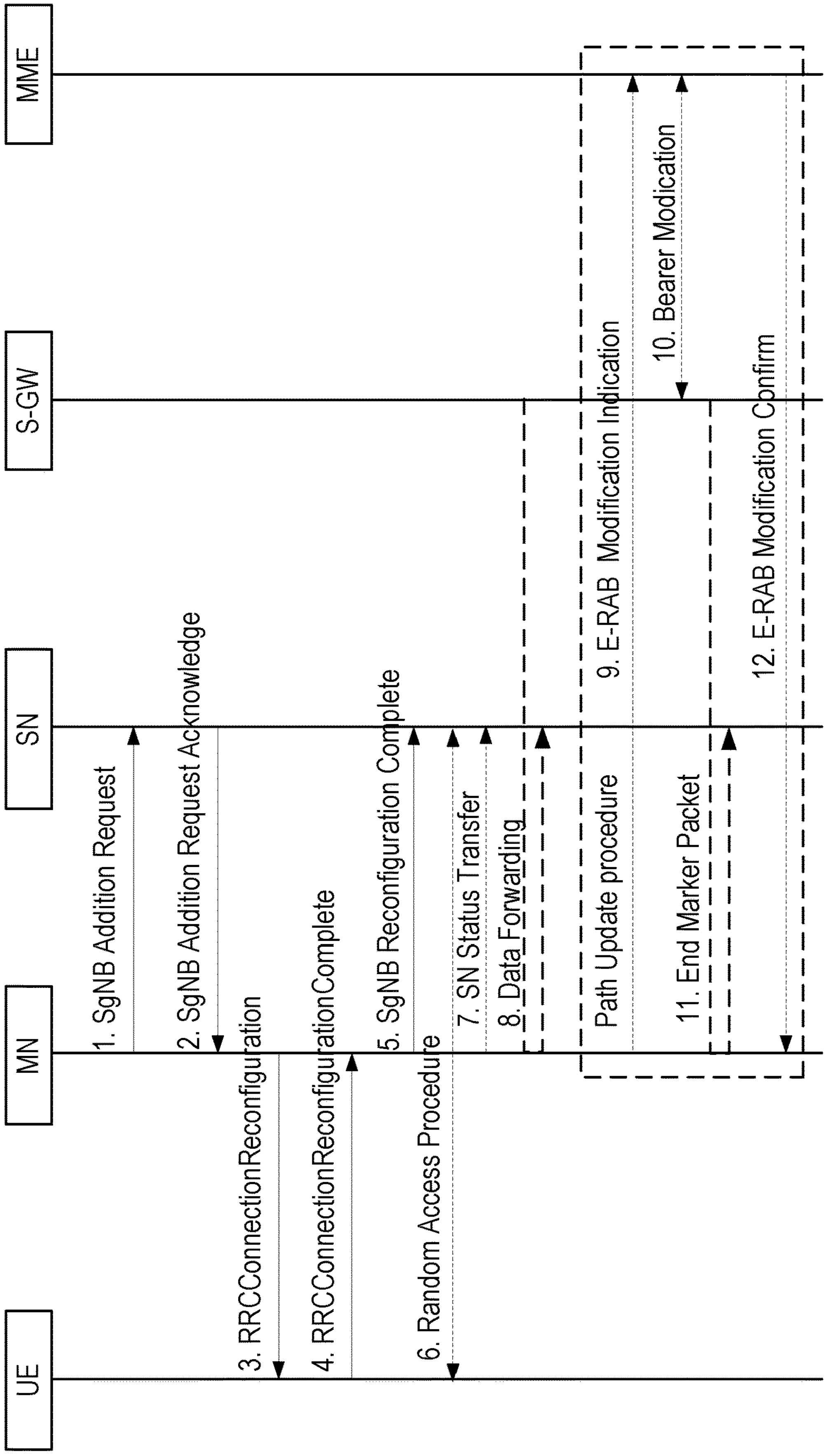
FIGS. 18 and 19 are signalling diagrams illustrating Secondary Node Addition procedures in accordance with some embodiments.

The Secondary Node Addition procedure is initiated by the MN and is used to establish a UE context at the SN to provide resources from the SN to the UE. For bearers requiring SCG radio resources, this procedure is used to add at least the first cell of the SCG. This procedure can also be used to configure an SN terminated MCG bearer (where no SCG configuration is needed). FIG. 18 shows the Secondary Node Addition procedure.

1. According to embodiments of the disclosure, this message may be referred to as "Group SgNB Addition Request". See table G below. The MN decides to request the SN to allocate resources for E-RABs for a plurality of devices (e.g., UEs, IAB nodes), indicating E-RAB characteristics (E-RAB parameters, TNL address information corresponding to bearer type). In addition, for bearers requiring SCG radio resources, MN indicates the requested SCG configuration information, including the UE capabilities and the UE capability coordination result. In this case, the MN also provides the latest measurement results for SN to choose and configure the SCG cell(s). The message may comprise the context for each of the plurality of devices. The MN may request the SN to allocate radio resources for split SRB operation. The MN provides all the needed security information to the SN (even if no SN terminated bearers are setup) to enable SRB3 to be setup based on SN decision. In case of bearer options that require X2-U resources between the MN and the SN, the MN provides X2-U TNL address information for the respective E-RAB, X2-U DL TNL address information for SN terminated bearers, X2-U UL TNL address information for MN terminated bearers. In case of SN terminated split bearers the MN provides the maximum QoS level that it can support. The SN may reject the request.

NOTE 1: For split bearers, MCG and SCG resources may be requested of such an amount, that the QoS for the respective E-RAB is guaranteed by the exact sum of resources provided by the MCG and the SCG together, or even more. For MN terminated split bearers, the MNs decision is reflected in step 1 by the E-RAB parameters signalled to the SN, which may differ from E-RAB parameters received over S1.

NOTE 2: For a specific E-RAB, the MN may request the direct establishment of an SCG or a split bearer, i.e., without first having to establish an MCG bearer. It is also allowed that all E-RABs can be configured as SN terminated bearers, i.e. there is no E-RAB established as an MN terminated bearer.

2. If the RRM entity in the SN is able to admit the resource request, it allocates respective radio resources and, dependent on the bearer option, respective transport network resources. For bearers requiring SCG radio resources, the SN triggers Random Access so that synchronisation of the SN radio resource configuration can be performed. The SN decides the PSCell and other SCG SCells and provides the new SCG radio resource configuration to the MN in a NR RRC configuration message contained in the SgNB Addition Request Acknowledge message. According to embodiments of the disclosure, this message may be referred to as "Group SgNB Addition Request Acknowledge", and may comprise indications of whether the requested SN addition was successful for a plurality of devices. See table I below. In case of bearer options that require X2-U resources between the MN and the SN, the SN provides X2-U TNL address information for the respective E-RAB, X2-U UL TNL address information for SN terminated bearers, X2-U DL TNL address information for MN terminated bearers. For SN terminated bearers, the SN provides the S1-U DL TNL address information for the respective E-RAB and security algorithm. If SCG radio resources have been requested, the SCG radio resource configuration is provided.

NOTE 3: For the SN terminated split bearer option, the SN may either decide to request resources from the MN of such an amount, that the QoS for the respective E-RAB is guaranteed by the exact sum of resources provided by the MN and the SN together, or even more. The SNs decision is reflected in step 2 by the E-RAB parameters signalled to the MN, which may differ from E-RAB parameters received in step 1. The QoS level requested from the MN shall not exceed the level that the MN offered when setting up the split bearer in step 1.

NOTE 4: In case of MN terminated bearers, transmission of user plane data may take place after step 2.

NOTE 5: In case of SN terminated bearers, data forwarding and the SN Status Transfer may take place after step 2.

3. The MN sends to the UE the RRCConnectionReconfiguration message including the NR RRC configuration message, without modifying it. Steps 3 and later steps relate to the configuration of a single UE of the plurality of devices specified in the messages transmitted in steps 1 and 2.

4. The UE applies the new configuration and replies to MN with RRCConnectionReconfigurationComplete message, including a NR RRC response message, if needed. In case the UE is unable to comply with (part of) the configuration included in the RRCConnectionReconfiguration message, it performs the reconfiguration failure procedure.

5. The MN informs the SN that the UE has completed the reconfiguration procedure successfully via SgNB ReconfigurationComplete message, including the encoded NR RRC response message, if received from the UE.

6. If configured with bearers requiring SCG radio resources, the UE performs synchronisation towards the PSCell of the SN. The order the UE sends the RRCConnectionReconfigurationComplete message and performs the Random Access procedure towards the SCG is not defined. The successful RA procedure towards the SCG is not required for a successful completion of the RRC Connection Reconfiguration procedure.

7. If PDCP termination point is changed to the SN for bearers using RLC AM, and when RRC full configuration is not used, the MN sends the SN Status Transfer.

8. For SN terminated bearers moved from the MN, dependent on the bearer characteristics of the respective E-RAB, the MN may take actions to minimise service interruption due to activation of EN-DC (Data forwarding).

9-12. If applicable, the update of the UP path towards the EPC is performed.

MR-DC with 5GC

Figure 19:
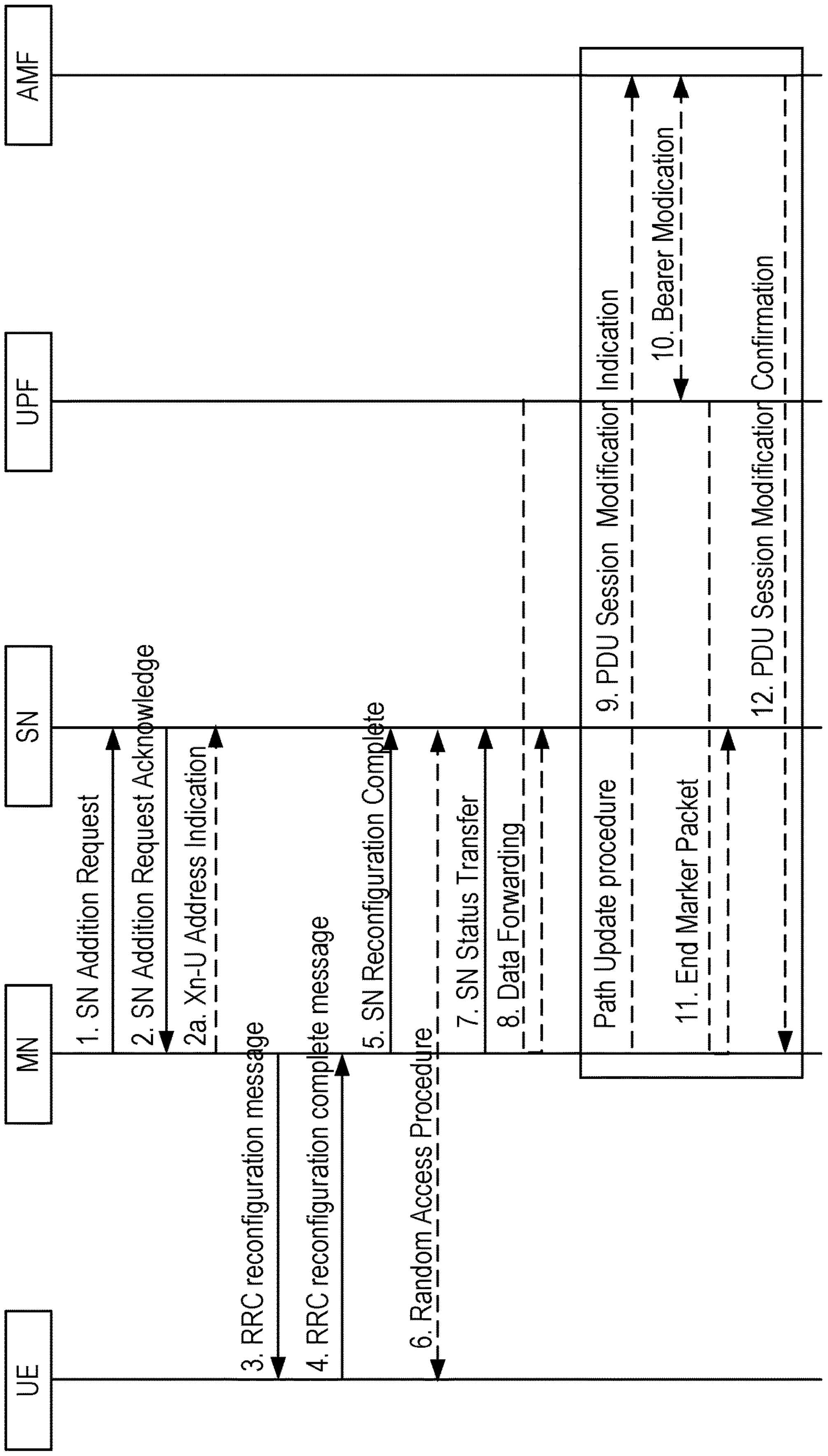

The Secondary Node (SN) Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 19 shows the SN Addition procedure.

1. According to embodiments of the disclosure, this message may be referred to as "Group SgNB Addition Request". See table G below. The MN decides to request the target SN to allocate resources for one or more specific PDU Sessions/QoS Flows for a plurality of devices, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. According to embodiments of the disclosure, this message may be referred to as "Group SgNB Addition Request Acknowledge", and may comprise indications of whether the requested SN addition was successful for a plurality of devices. See table I below. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

2a. For SN terminated bearers using MCG resources, the MN provides Xn-U DL TNL address information in the Xn-U Address Indication message.

3. The MN sends the MN RRC reconfiguration message to the UE including the SN RRC configuration message, without modifying it. Steps 3 and later steps relate to the configuration of a single UE of the plurality of devices specified in the messages transmitted in steps 1 and 2.

4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. If PDCP termination point is changed to the SN for bearers using RLC AM, and when RRC full configuration is not used, the MN sends the SN Status Transfer.

8. For SN terminated bearers or QoS flows moved from the MN, dependent on the characteristics of the respective bearer or QoS flow, the MN may take actions to minimise service interruption due to activation of MR-DC (Data forwarding).

9-12. If applicable, the update of the UP path towards the 5GC is performed via a PDU Session Path Update procedure.

TABLE G

| Group SgNB Addition Request message | | | | | | |
|---|---|---|---|---|---|---|
| IE/Group Name | Presence | Range | IE type and reference | Semantics description | Criticality | Assigned Criticality |
| Message Type | M | | 9.2.13 | | YES | reject |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB | YES | reject |
| >>NR UE Security Capabilities | M | | 9.2.107 | | YES | reject |
| >>SgNB Security Key | M | | 9.2.101 | The S-KgNB which is provided by the MeNB, see TS 33.401 [18]. | YES | reject |
| >>SgNB UE Aggregate Maximum Bit Rate | M | | UE Aggregate Maximum Bit Rate 9.2.12 | The UE Aggregate Maximum Bit Rate is split into MeNB UE Aggregate Maximum Bit Rate and SgNB UE Aggregate Maximum Bit Rate which are enforced by MeNB and en-gNB respectively. | YES | reject |
| >>Selected PLMN | O | | PLMN Identity 9.2.4 | The selected PLMN of the SCG in the en-gNB. | YES | ignore |
| >>Hand over Restriction List | O | | 9.2.3 | | YES | ignore |
| >>E-RABs To Be Added List | | 1 | | | YES | reject |
| >>>E-RABs To Be Added Item | | 1..<maxnoofBearers> | | | EACH | reject |
| >>>>E-RAB ID | M | | 9.2.23 | | — | |
| >>>>DRB ID | M | | 9.2.122 | | — | |
| >>>>EN-DC Resource Configuration | M | | EN-DC Resource Configuration 9.2.108 | Indicates the PDCP and Lower Layer MCG/SCG configuration | — | |
| >>>>CHOICE Resource Configuration | M | | | | | |

TABLE G-continued

| Group SgNB Addition Request message | | | | | | |
|---|---|---|---|---|---|---|
| IE/Group Name | Presence | Range | IE type and reference | Semantics description | Criticality | Assigned Criticality |
| >>>>>PDCP present in SN | | | | This choice tag is used if the PDCP at SgNB IE in the EN-DC Resource Configuration IE is set to the value "present". | | |
| >>>>>> Full E-RAB Level QoS Parameters | M | | E-RAB Level QoS Parameters 9.2.9 | Includes the E-RAB level QoS parameters as received on S1-MME. | | |
| >>>>>>Maximum MCG admittable E-RAB Level QoS Parameters | C-ifMCG and SCGpresent_GBR | | GBR QoS Information 9.2.10 | Includes the GBR QoS Information admittable by the MCG. | | |
| >>>>>>DL Forwarding | O | | 9.2.5 | | — | |
| >>>>>>MeNB DL GTP Tunnel Endpoint at MCG | C-ifMCG present | | GTP Tunnel Endpoint 9.2.1 | MeNB endpoint of the X2-U transport bearer at MCG. For delivery of DL PDCP PDUs. | — | |
| >>>>>>S1 UL GTP Tunnel Endpoint | M | | GTP Tunnel Endpoint 9.2.1 | SGW endpoint of the S1-U transport bearer. For delivery of UL PDUs from the en-gNB. | — | |
| >>>>>> RLC Mode | O | | RLC Mode 9.2.119 | Indicates the RLC mode at the MeNB for PDCP transfer to en-gNB. | YES | ignore |
| >>>>>> Bearer Type | O | | 9.2.92 | | YES | ignore |
| >>>>>PDCP not present in SN | | | | This choice tag is used if the PDCP at SgNB IE in the EN-DC Resource Configuration IE is set to the value "not present". | | |
| >>>>>> Requested SCG E-RAB Level QoS Parameters | M | | E-RAB Level QoS Parameters 9.2.9 | Includes E-RAB level QoS parameters requested to be provided by the SCG. | 1 | |

TABLE G-continued

| Group SgNB Addition Request message | | | | | | |
|---|---|---|---|---|---|---|
| IE/Group Name | Presence | Range | IE type and reference | Semantics description | Criticality | Assigned Criticality |
| >>>>>> MeNB UL GTP Tunnel Endpoint at PDCP | M | | GTP Tunnel Endpoint 9.2.1 | MeNB endpoint of the X2-U transport bearer. For delivery of UL PDCP PDUs. | — | |
| >>>>>> Secondary MeNB UL GTP Tunnel Endpoint at PDCP | | | GTP Tunnel Endpoint 9.2.1 | MeNB endpoint of the X2-U transport bearer. For delivery of UL PDCP PDUs in case of PDCP duplication. | — | |
| >>>>>> RLC Mode | M | | RLC Mode 9.2.119 | Indicates the RLC mode to be used in the assisting node. | — | |
| >>>>>> UL Configuration | C-ifM CG and SC Gpresent | | 9.2.118 | Information about UL usage in the en-gNB. | — | |
| >>>>>> UL PDCP SN Length | O | | PDCP SN Length 9.2.133 | Indicates the PDCP SN length of the bearer for the UL. | YES | ignore |
| >>>>>> DL PDCP SN Length | O | | PDCP SN Length 9.2.133 | Indicates the PDCP SN length of the bearer for the DL. | YES | ignore |
| >>>>>> Duplication activation | O | | 9.2.137 | Indicated the initial staus of PDCP duplication. | YES | ignore |
| >>MeNB to SgNB Container | M | | OCTET STRING | Includes the CG-ConfigInfo message as defined in TS 38.331 [31]. | YES | reject |
| >>SgNB UE X2AP ID | O | | en-gNB UE X2AP ID 9.2.100 | Allocated at the en-gNB. | YES | reject |
| >>Expected UE Behaviour | O | | 9.2.70 | | YES | ignore |
| >>MeNB UE X2AP ID Extension | O | | Extende d eNB UE X2AP ID 9.2.86 | Allocated at the MeNB. | YES | reject |
| >>Requested split SRBs | O | | ENUME RATED (srb1, srb2, srb1&2, . . . ) | Indicates that resources for Split SRB are requested. | YES | reject |
| >>MeNB Resource | O | | 9.2.116 | Information used to | YES | ignore |

TABLE G-continued

| Group SgNB Addition Request message | | | | | | |
|---|---|---|---|---|---|---|
| IE/Group Name | Presence | Range | IE type and reference | Semantics description | Criticality | Assigned Criticality |
| Coordination Information | | | | coordinate resources utilisation between MeNB and en-gNB. | | |
| >>SGNB Addition Trigger Indication | O | | ENUMERATED (SN change, inter-eNB HO, intra-eNB HO, . . . ) | This IE indicates the trigger for SGNB Addition procedure. | YES | reject |
| >>Subscriber Profile ID for RAT/Frequency priority | | | 9.2.25 | | YES | ignore |
| >>MeNB Cell ID | M | | ECGI 9.2.14 | Indicates the cell ID for PCell in MeNB. | YES | reject |
| >>Desired Activity Notification Level | O | | 9.2.141 | | YES | ignore |
| >>Trace Activation | O | | 9.2.2 | | YES | ignore |
| >>Location Information at SgNB reporting | O | | ENUMERATED (pscell, . . .) | Indicates that the user's location information is to be provided. | YES | ignore |
| >>Masked IMEISV | O | | 9.2.69 | | YES | ignore |
| >>Additional RRM Policy Index | O | | 9.2.25a | | YES | ignore |
| >>Requested Fast MCG recovery via SRB3 | O | | ENUMERATED (true, . . . ) | Indicates that the resources for fast MCG recovery via SRB3 are requested. | YES | ignore |
| >>UE Context Reference at Source NG-RAN | O | | RAN UE NGAP ID 9.2.152 | | YES | ignore |

TABLE H

| Range bound | Explanation |
|---|---|
| maxnoofBearers | Maximum no. of E-RABs. Value is 256 |
| maxnoofUEs | Maximum no. of UEs/IAB-MTs that can be involved in a group S-gnB addition. Value is FFS. |

TABLE I

Group SgNB Addition Request Acknowledge message

| IE/Group Name | Presence | Range | IE type and reference | Semantics description | Criticality | Assigned Criticality |
|---|---|---|---|---|---|---|
| Message Type | M | | 9.2.13 | | YES | reject |
| Accepted UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | M | | en-gNB UE X2AP ID 9.2.100 | Allocated at the en-gNB. | YES | reject |
| >>E-RABs Admitted To Be Added List | | 1 | | | YES | ignore |
| >>>E-RABs Admitted To Be Added Item | | 1..<maxnoofBearers> | | | EACH | ignore |
| >>>>E-RAB ID | M | | 9.2.23 | | — | |
| >>>>EN-DC Resource Configuration | M | | EN-DC Resource Configuration 9.2.108 | Indicates the PDCP and Lower Layer MCG/SCG configuration. | — | |
| >>>>CHOICE Resource Configuration | M | | | | | |
| >>>>>PDCP present in SN | | | | This choice tag is used if the PDCP at SgNB IE in the EN-DC Resource Configuration IE is set to the value "present". | — | |
| >>>>>>S1 DL GTP Tunnel Endpoint at the SgNB | M | | GTP Tunnel Endpoint 9.2.1 | en-gNB endpoint of the S1 transport bearer. For delivery of DL PDUs. | — | |
| >>>>>>SgNB UL GTP Tunnel Endpoint at PDCP | C-ifMCGpresent | | GTP Tunnel Endpoint 9.2.1 | en-gNB endpoint of the X2-U transport bearer at PDCP. For delivery of UL PDCP PDUS. | — | |
| >>>>>>RLC Mode | C-ifMCGpresent | | RLC Mode 9.2.119 | Indicates the RLC mode. | — | |
| >>>>>>DL Forwarding GTP Tunnel Endpoint | O | | GTP Tunnel Endpoint 9.2.1 | Identifies the X2 transport bearer used for forwarding of DL PDUs | — | |
| Forwarding GTP Tunnel Endpoint | O | | GTP Tunnel Endpoint 9.2.1 | Identifies the X2 transport bearer used for forwarding of UL PDUs | — | |
| >>>>>>Re-quested MCG E-RAB Level Qos Parameters | C-ifMCGandSCGpre-sent_GBRpresent | | E-RAB Level Qos Parameter s 9.2.9 | Includes E-RAB level Qos parameters requested to be provided by the MCG. | — | |
| >>>>>>UL Configuration | C-ifMCGandSCGpresent | | 9.2.118 | Information about UL usage in the MeNB. | — | |
| >>>>>>UL PDCP SN Length | O | | PDCP SN Length 9.2.133 | Indicates the PDCP SN length of the bearer for the UL. | YES | ignore |

TABLE I-continued

Group SgNB Addition Request Acknowledge message

| IE/Group Name | Presence | Range | IE type and reference | Semantics description | Criticality | Assigned Criticality |
|---|---|---|---|---|---|---|
| >>>>>>DL PDCP SN Length | O | | PDCP SN Length 9.2.133 | Indicates the PDCP SN length of the bearer for the DL. | YES | ignore |
| >>>>>PDCP not present in SN | | | | This choice tag is used if the PDCP at SgNB IE in the EN-DC Resource Configuration IE is set to the value "not present". | — | |
| >>>>>>SgNB DL GTP Tunnel Endpoint at SCG | M | | GTP Tunnel Endpoint 9.2.1 | SgNB endpoint of the X2-U transport bearer at the SCG. For delivery of DL PDCP PDUs. | — | |
| >>>>>>Secondary SgNB DL GTP Tunnel Endpoint at SCG | O | | GTP Tunnel Endpoint 9.2.1 | SgNB endpoint of the X2-U transport bearer at the SCG. For delivery of DL PDCP PDUs in case of PDCP duplication | — | |
| >>>>>>LCID | O | | 9.2.138 | LCID for the primary path in case of PDCP duplication | YES | ignore |
| >>E-RABs Not Admitted List | O | | E-RAB List 9.2.28 | A value for E-RAB ID shall only be present once in E-RABs Admitted List IE and in E-RABs Not Admitted List IE. | YES | ignore |
| >>SgNB to MeNB Container | M | | OCTET STRING | Includes the CG-Config message as defined in TS 38.331[31]. | YES | reject |
| >>MeNB UE X2AP ID Extension | O | | Extended eNB UE X2AP ID 9.2.86 | Allocated at the MeNB | YES | reject |
| >>Admitted split SRBs | O | | ENUMERATED (srb1, srb2, srb1&2, . . . ) | Indicates admitted SRBs | YES | reject |
| >>SgNB Resource Coordination Information | O | | 9.2.117 | Information used to coordinate resources utilisation between en-gNB and MeNB. | YES | ignore |
| >>RRC config indication | O | | 9.2.132 | Indicates the type of RRC configuration used at the en-gNB. | YES | reject |
| >>Location Information at SgNB | O | | 9.2.142 | Contains information to support localisation of the UE | YES | ignore |
| >>Available fast MCG recovery via SRB3 | O | | ENUMERATED (true, . . . ) | Indicates the fast MCG recovery via SRB3 is available. | YES | Ignore |
| Rejected UE context Info List | | 1 | | | YES | reject |

TABLE I-continued

| Group SgNB Addition Request Acknowledge message | | | | | | |
|---|---|---|---|---|---|---|
| IE/Group Name | Presence | Range | IE type and reference | Semantics description | Criticality | Assigned Criticality |
| >UE context Info List Item | | 0..<maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | M | | en-gNB UE X2AP ID 9.2.100 | Allocated at the en-gNB. | YES | reject |
| Criticality Diagnostics | O | | 9.2.7 | | YES | ignore |

If the requested SgNB addition fails, the SN may transmit a Group SgNB Addition Request Reject message to the MN. It can be used in case all UE contexts are rejected by the en-gNB.

TABLE J

| IE/Group Name | Presence | Range | IE type and reference | Semantics description | Criticality | Assigned Criticality |
|---|---|---|---|---|---|---|
| Message Type | M | | 9.2.13 | | YES | reject |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | O | | en-gNB UE X2AP ID 9.2.100 | Allocated at the en-gNB. | YES | reject |
| >>MeNB UE X2AP ID Extension | O | | Extended eNB UE X2AP ID 9.2.86 | Allocated at the MeNB. | YES | reject |
| Cause | M | | 9.2.6 | | YES | ignore |
| Criticality Diagnostics | O | | 9.2.7 | | YES | ignore |

Secondary Node Release (MN/SN Initiated)

EN-DC

The Secondary Node Release procedure may be initiated either by the MN or by the SN and is used to initiate the release of multiple UE contexts at the SN. The recipient node of this request can reject it, e.g., if a SN change procedure is triggered by the SN.

It does not necessarily need to involve signalling towards the UEs, e.g., in case of the RRC connection re-establishment due to Radio Link Failure in MN.

MN Initiated SN Release

Figure 20:
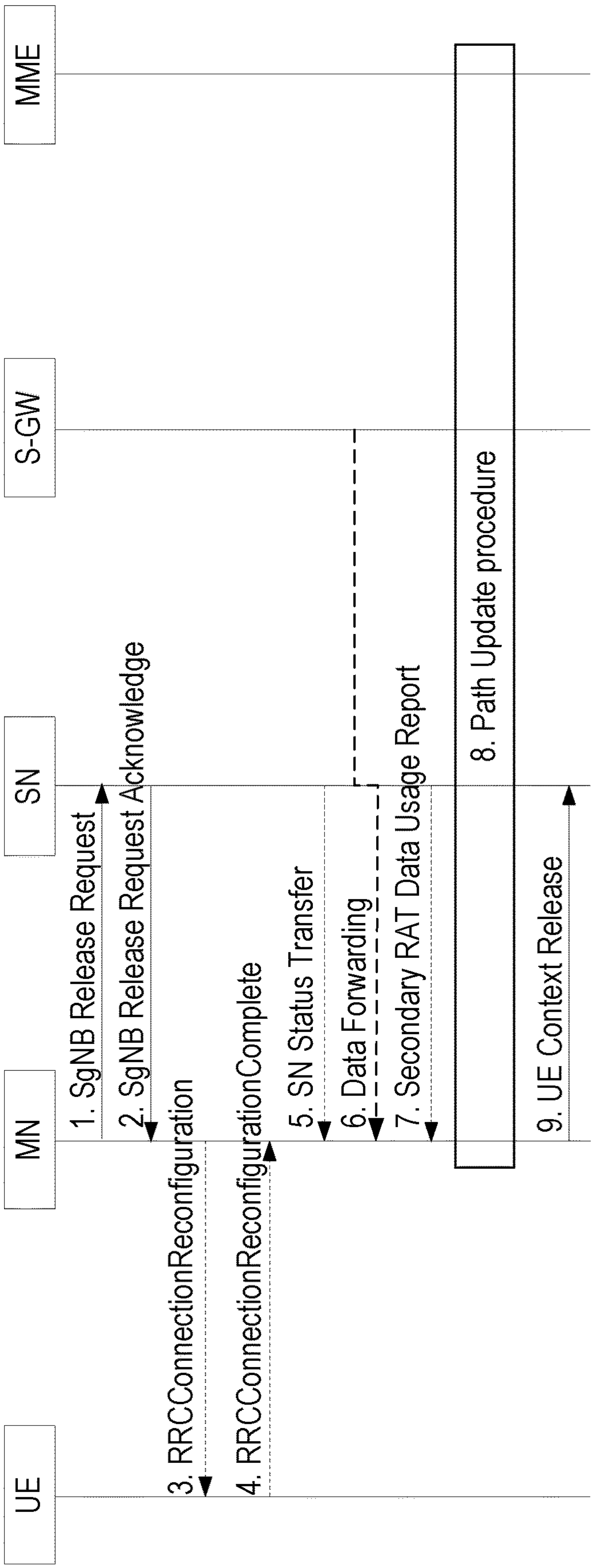
FIGS. 20 through 23 are signalling diagrams illustrating SN Release procedures in accordance with some embodiments.

FIG. 20 shows an example signalling flow for the MN initiated Secondary Node Release procedure when SN Release is confirmed by SN.

1. The MN initiates the procedure by sending the Group SgNB Release Request message. See Table K below. If applicable, the MN provides data forwarding addresses to the SN.

2. The SN confirms SN Release by sending the Group SgNB Release Request Acknowledge message. See Table L below. If appropriate, the SN may reject SN Release, e.g. if the SN change procedure is triggered by the SN. In that case, the SN may send the Group SgNB Release Request Reject message. See Table M below.

3/4. If required, the MN indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure. Steps 3 and later steps relate to the configuration of a single UE of the plurality of devices specified in the messages transmitted in steps 1 and 2.

NOTE 1: If data forwarding is applied, timely coordination between steps 1 and 2 may minimize gaps in service provision, this is however regarded to be an implementation matter.

5. For bearers using RLC AM, the SN sends the SN Status Transfer.

6. Data forwarding from the SN to the MN may start.

7. The SN sends the Secondary RAT Data Usage Report message to the MN and includes the data volumes delivered to and received from the UE over the NR radio for the related E-RABs.

NOTE 2: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the path update procedure is initiated.

9. Upon reception of the UE Context Release message, the SN releases radio and C-plane related resources associated to the UE context. Any ongoing data forwarding may continue.

SN Initiated SN Release

Figure 21:
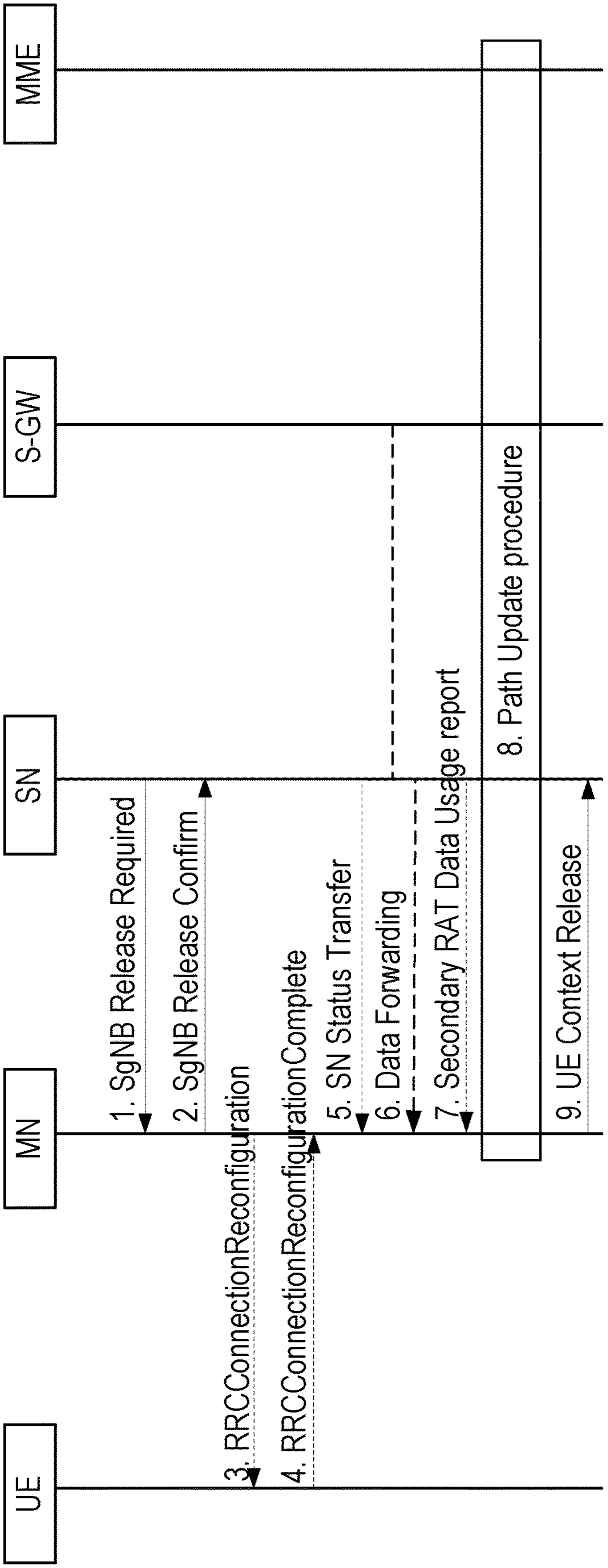

FIG. 21 shows an example signalling flow for the SN initiated Secondary Node Release procedure.

1. The SN initiates the procedure by sending the Group SgNB Release Required message which does not contain inter-node message. See Table N below.

2. If applicable, the MN provides data forwarding addresses to the SN in the Group SgNB Release Confirm message. See O below. The SN may start data forwarding and stop providing user data to the UE as early as it receives the Group SgNB Release Confirm message.

3/4. If required, the MN indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure. Steps 3 and later steps relate to the configuration of a single UE of the plurality of devices specified in the messages transmitted in steps 1 and 2.

NOTE 3: If data forwarding is applied, timely coordination between steps 2 and 3 may minimize gaps in service provision. This is however regarded to be an implementation matter.

5. For bearers using RLC AM, the SN sends the SN Status Transfer.

6. Data forwarding from the SN to the MN may start.

7. The SN sends the Secondary RAT Data Usage Report message to the MN and includes the data volumes delivered to and received from the UE over the NR radio for the related E-RABs.

NOTE 4: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the path update procedure is initiated.

9. Upon reception of the UE Context Release message, the SN releases radio and C-plane related resources associated to the UE context. Any ongoing data forwarding may continue.

10.4.2 MR-DC with 5GC

The SN Release procedure may be initiated either by the MN or by the SN and is used to initiate the release of the UE context and relevant resources at the SN. The recipient node of this request can reject it, e.g., if an SN change procedure is triggered by the SN.

MN Initiated SN Release

Figure 22:
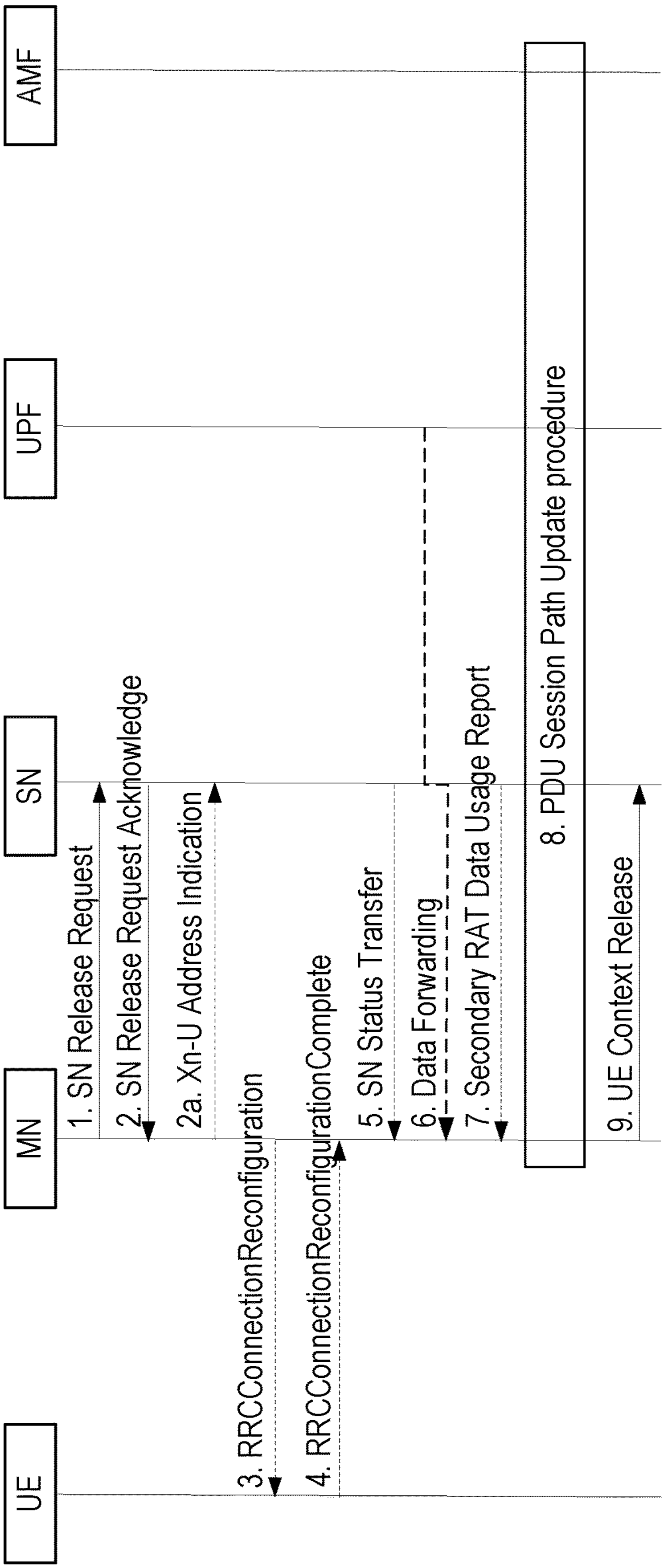

FIG. 22 shows an example signalling flow for the MN initiated SN Release procedure.

1. The MN initiates the procedure by sending the Group SN Release Request message. See, e.g., Table K below, which can be straightforwardly adapted for LTE signalling (see the Appendix).

2. The SN confirms SN Release by sending the Group SN Release Request Acknowledge message. See, e.g., Table L below, which can be straightforwardly adapted for LTE signalling (see the Appendix). If appropriate, the SN may reject SN Release, e.g., if the SN change procedure is triggered by the SN. In that case, the SN may send the Group SgNB Release Request Reject message. See Table M below, which can be straightforwardly adapted for LTE signalling (see the Appendix).

2a. When applicable, the MN provides forwarding address information to the SN.

NOTE 0: The MN may send the Data Forwarding Address Indication message to provide forwarding address information before step 2.

3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure. Steps 3 and later steps relate to the configuration of a single UE of the plurality of devices specified in the messages transmitted in steps 1 and 2.

NOTE 1: If data forwarding is applied, timely coordination between steps 1 and 2 may minimize gaps in service provision, this is however regarded to be an implementation matter.

5. If PDCP termination point is changed to the MN for bearers using RLC AM, the SN sends the SN Status Transfer.

6. Data forwarding from the SN to the MN may start.

7. The SN sends the Secondary RAT Data Usage Report message to the MN and includes the data volumes delivered to and received from the UE as described in clause 10.11.2.

NOTE 1a: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the PDU Session path update procedure is initiated.

9. Upon reception of the UE Context Release message, the SN releases radio and C-plane related resources associated to the UE context. Any ongoing data forwarding may continue.

SN Initiated SN Release

Figure 23:
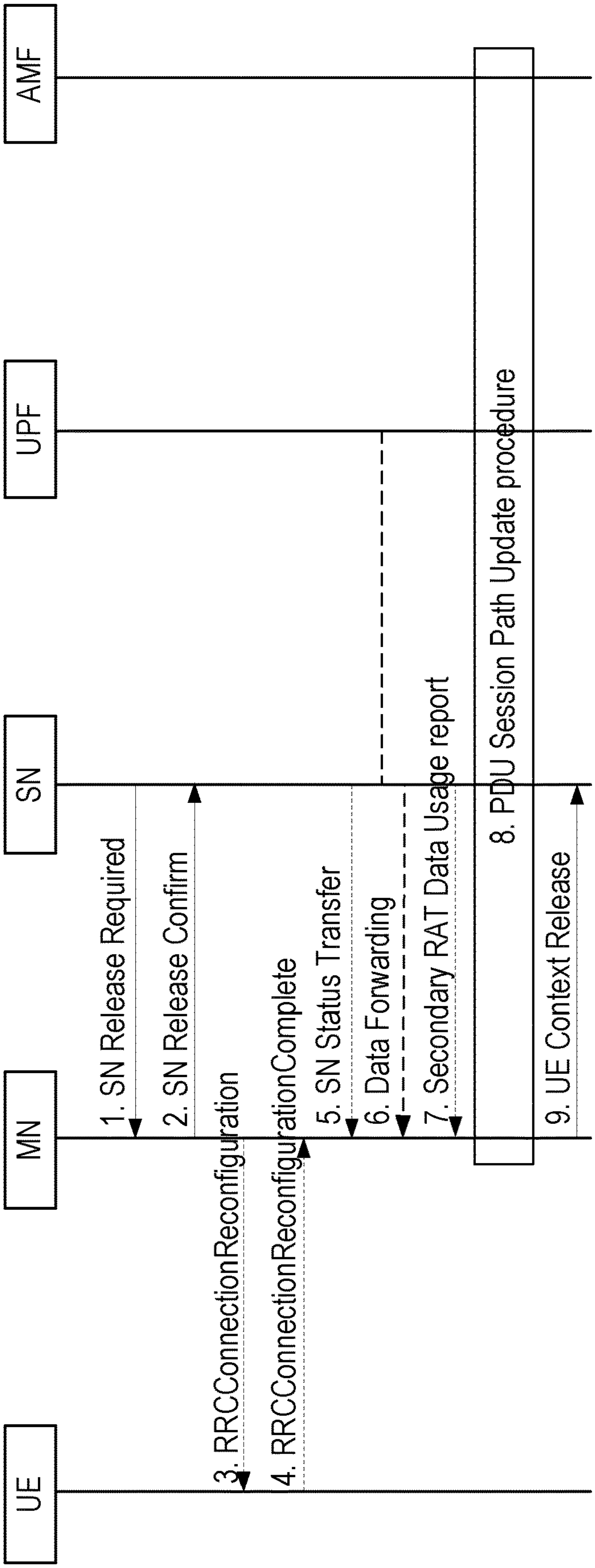

FIG. 23 shows an example signalling flow for the SN initiated SN Release procedure.

1. The SN initiates the procedure by sending the Group SN Release Required message which does not contain any inter-node message. See, e.g., Table N below, which can be straightforwardly adapted for LTE signalling (see the Appendix).

2. If data forwarding is requested, the MN provides data forwarding addresses to the SN in the Group SN Release Confirm message. The SN may start data forwarding and stop providing user data to the UE as early as it receives the Group SN Release Confirm message. See, e.g., Table O below, which can be straightforwardly adapted for LTE signalling (see the Appendix).

3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure. Steps 3 and later steps relate to the configuration of a single UE of the plurality of devices specified in the messages transmitted in steps 1 and 2.

NOTE 2: If data forwarding is applied, timely coordination between steps 2 and 3 may minimize gaps in service provision. This is however regarded to be an implementation matter.

5. If PDCP termination point is changed to the MN for bearers using RLC AM, the SN sends the SN Status Transfer.

6. Data forwarding from the SN to the MN may start.

7. The SN sends the Secondary RAT Data Usage Report message to the MN and includes the data volumes delivered to and received from the UE as described in clause 10.11.2.

NOTE 3: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the PDU Session path update procedure is initiated.

9. Upon reception of the UE Context Release message, the SN releases radio and C-plane related resources associated to the UE context. Any ongoing data forwarding may continue.

The following message is sent by the MeNB to the en-gNB to request the release of resources of a plurality of UEs/IAB-MTs.

TABLE K

Group SgNB Release Request message

| IE/Group Name | Presence | Range | IE type and reference | Semantics description | Criticality | Assigned Criticality |
|---|---|---|---|---|---|---|
| Message Type | M | | 9.2.13 | | YES | ignore |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | O | | en-gNB UE X2AP ID 9.2.100 | Allocated at the en-gNB. | YES | reject |
| >>E-RABs To Be Released List | | 0..1 | | | YES | ignore |
| >>>E-RABs To Be Released Item | | 1..<maxnoofBearers> | | | EACH | ignore |
| >>>>E-RAB ID | M | | 9.2.23 | | — | |
| >>>>EN-DC Resource Configuration | M | | EN-DC Resource Configuration 9.2.108 | Indicates the PDCP and Lower Layer MCG/SCG configuration. | — | |
| >>>>CHOICE Resource Configuration | M | | | | | |
| >>>>>PDCP present in SN | | | | This choice tag is used if the PDCP at SgNB IE in the EN-DC Resource Configuration IE is set to the value "present" | | |
| >>>>>>UL Forwarding GTP Tunnel Endpoint | O | | GTP Tunnel Endpoint 9.2.1 | Identifies the X2 transport bearer used for forwardin g of UL PDUs | — | |

TABLE K-continued

| Group SgNB Release Request message | | | | | | |
|---|---|---|---|---|---|---|
| IE/Group Name | Presence | Range | IE type and reference | Semantics description | Criticality | Assigned Criticality |
| >>>>>>DL Forwarding GTP Tunnel Endpoint | O | | GTP Tunnel Endpoint 9.2.1 | Identifies the X2 transport bearer. used for forwarding of DL PDUs | — | |
| >>>>>PDCP not present in SN | | | | This choice tag is used if the PDCP at SgNB IE in the EN-DC Resource Configuration IE is set to the value "not present". | | |
| >>UE Context Kept Indicator | O | | 9.2.85 | | YES | ignore |
| >>MeNB UE X2AP ID Extension | O | | Extended eNB UE X2AP ID 9.2.86 | Allocated at the MeNB | YES | reject |
| >>MeNB to SgNB Container | O | | OCTET STRING | Includes the CG-ConfigInfo message as defined in TS 38.331 [31]. | YES | reject |
| >>E-RABs transferred to MeNB | O | | E-RAB List 9.2.28 | Indicates the target MeNB reconfigured the listed E-RABs as MN-terminated bearers. | YES | Ignore |
| Cause | M | | 9.2.6 | | YES | ignore |

The following message is sent by the en-gNB to the MeNB to confirm the request to release en-gNB resources for a plurality of UEs/IAB-MTs.

TABLE L

| Group SgNB Release Request Acknowledge message | | | | | | |
|---|---|---|---|---|---|---|
| IE/Group Name | Presence | Range | IE type and reference | Semantics description | Criticality | Assigned Criticality |
| Message Type | M | | 9.2.13 | | YES | ignore |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |

TABLE L-continued

| Group SgNB Release Request Acknowledge message | | | | | | |
|---|---|---|---|---|---|---|
| IE/Group Name | Presence | Range | IE type and reference | Semantics description | Criticality | Assigned Criticality |
| >>MeNB UE X2AP ID Extension | O | | Extended eNB UE X2AP ID 9.2.86 | Allocated at the MeNB. | YES | reject |
| >>E-RABs Admitted To Be Released List | | 0..1 | | | YES | ignore |
| >>>E-RABs Admitted To Be Released Item | | 1..<maxnoofBearers> | | | EACH | ignore |
| >>>>E-RAB ID | M | | 9.2.23 | | — | |
| >>>>RLC Mode | M | | RLC Mode 9.2.119 | Indicates the RLC mode at the en-gNB for PDCP transfer to MeNB. | — | |
| Criticality Diagnostics | O | | 9.2.7 | | YES | ignore |

The following message is sent by the en-gNB to the MeNB to reject the request to release en-gNB resources for a plurality of UEs/IAB-MTs.

TABLE M

| Group SgNB Release Request Reject message | | | | | | |
|---|---|---|---|---|---|---|
| IE/Group Name | Presence | Range | IE type and reference | Semantics description | Criticality | Assigned Criticality |
| Message Type | M | | 9.2.13 | | YES | ignore |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |
| >>MeNB UE X2AP ID Extension | O | | Extende deNB UE X2AP ID 9.2.86 | Allocated at the MeNB. | YES | reject |
| Cause | M | | 9.2.6 | | YES | ignore |
| Criticality Diagnostics | O | | 9.2.7 | | YES | ignore |

The following message is sent by the en-gNB to request the release of all resources for a plurality of UEs/IAB-MTs at the en-gNB.

TABLE N

| Group SgNB Release Required message | | | | | | |
|---|---|---|---|---|---|---|
| IE/Group Name | Presence | Range | IE type and reference | Semantics description | Criticality | Assigned Criticality |
| Message Type | M | | 9.2.13 | | YES | reject |
| UE context Info List | | 1 | | | YES | reject |
| >UE context Info List Item | | 1..<maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | M | | en-gNB UE X2AP ID 9.2.100 | Allocated at the en-gNB. | YES | reject |
| >>MeNB UE X2AP ID Extension | O | | Extended eNB UE X2AP ID 9.2.86 | Allocated at the MeNB. | YES | reject |
| >>E-RABs To Be Released List | | 0..1 | | | YES | ignore |
| >>>E-RABs To Be Released Item | | 1..<maxnoofBearers> | | | EACH | ignore |
| >>>>E-RAB ID | M | | 9.2.23 | | — | |
| >>>>RLC Mode | M | | RLC Mode 9.2.119 | Indicates the RLC mode at the en-gNB for PDCP transfer to MeNB. | — | |
| >>SgNB to MeNB Container | O | | OCTET STRING | Includes the NR CG-Config message as defined in TS 38.331 [31]. | YES | Ignore |
| Cause | M | | 9.2.6 | | YES | ignore |

The following message is sent by the MeNB to confirm the release of all resources for a plurality of UEs/IAB-MTs at the en-gNB. As optional enhancements the MeNB could indicate a list of UEs/IAB-MTs which should not be released although requested.

TABLE O

| Group SgNB Release Confirm message | | | | | | |
|---|---|---|---|---|---|---|
| Message Type | M | | 9.2.13 | | YES | reject |
| Released UE context Info List | | 1 | | | YES | reject |
| >UE context Info List Item | | 1 . . . <maxnoofUEs> | | | EACH | reject |

TABLE O-continued

| Group SgNB Release Confirm message | | | | | | |
|---|---|---|---|---|---|---|
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |
| >>E-RABs to be Released List | | 0 . . . 1 | | | YES | ignore |
| >>>E-RABs To Be Released Item | | 1 . . . <maxnoofBearers> | | | — | |
| >>>>E-RAB ID | M | | 9.2.23 | | — | |
| >>>>EN-DC Resource Configuration | M | | EN-DC Resource Configuration 9.2.108 | Indicates the PDCP and Lower Layer MCG/SCG configuration. | — | |
| >>>>CHOICE Resource Configuration | M | | | | | |
| >>>>>PDCP present in SN | | | | This choice tag is used if the PDCP at SgNB IE in the EN-DC Resource Configuration IE is set to the value "present". | | |
| >>>>>>UL Forwarding GTP Tunnel Endpoint | O | | GTP Tunnel Endpoint 9.2.1 | Identifies the X2 transport bearer used for forwarding of UL PDUs | — | |
| >>>>>>DL Forwarding GTP Tunnel Endpoint | O | | GTP Tunnel Endpoint 9.2.1 | Identifies the X2 transport bearer used for forwarding of DL PDUs | — | |
| >>>>>PDCP not present in SN | | | | This choice tag is used if the PDCP at SgNB IE in the EN-DC Resource Configuration IE is set to the value "not present". | | |
| >>MeNB UE X2AP ID Extension | O | | Extended eNB UE X2AP ID 9.2.86 | Allocated at the MeNB | YES | Ignore |
| Not released UE context Info List | | 1 | | | YES | reject |
| >UE context Info List Item | | 0 . . . <maxnoofUEs> | | | EACH | reject |
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |
| Criticality Diagnostics | O | | 9.2.7 | | YES | ignore |

Secondary Node Change (MN/SN Initiated)

EN-DC

The Secondary Node Change procedure is initiated either by MN or SN and used to transfer a UE context from a source SN to a target SN and to change the SCG configuration in UE from one SN to another. In the context of the present disclosure, the Secondary Node Change procedure is initiated to transfer multiple UE contexts from a source SN to a target SN, and to change the SCG configuration in multiple UEs from one SN to another.

NOTE 1: Inter-RAT SN change procedure with single RRC reconfiguration is not supported in this version of the protocol (i.e. no transition from EN-DC to DC).

The Secondary Node Change procedure involves signalling over MCG SRB towards the UE.

MN Initiated SN Change

Figure 24:
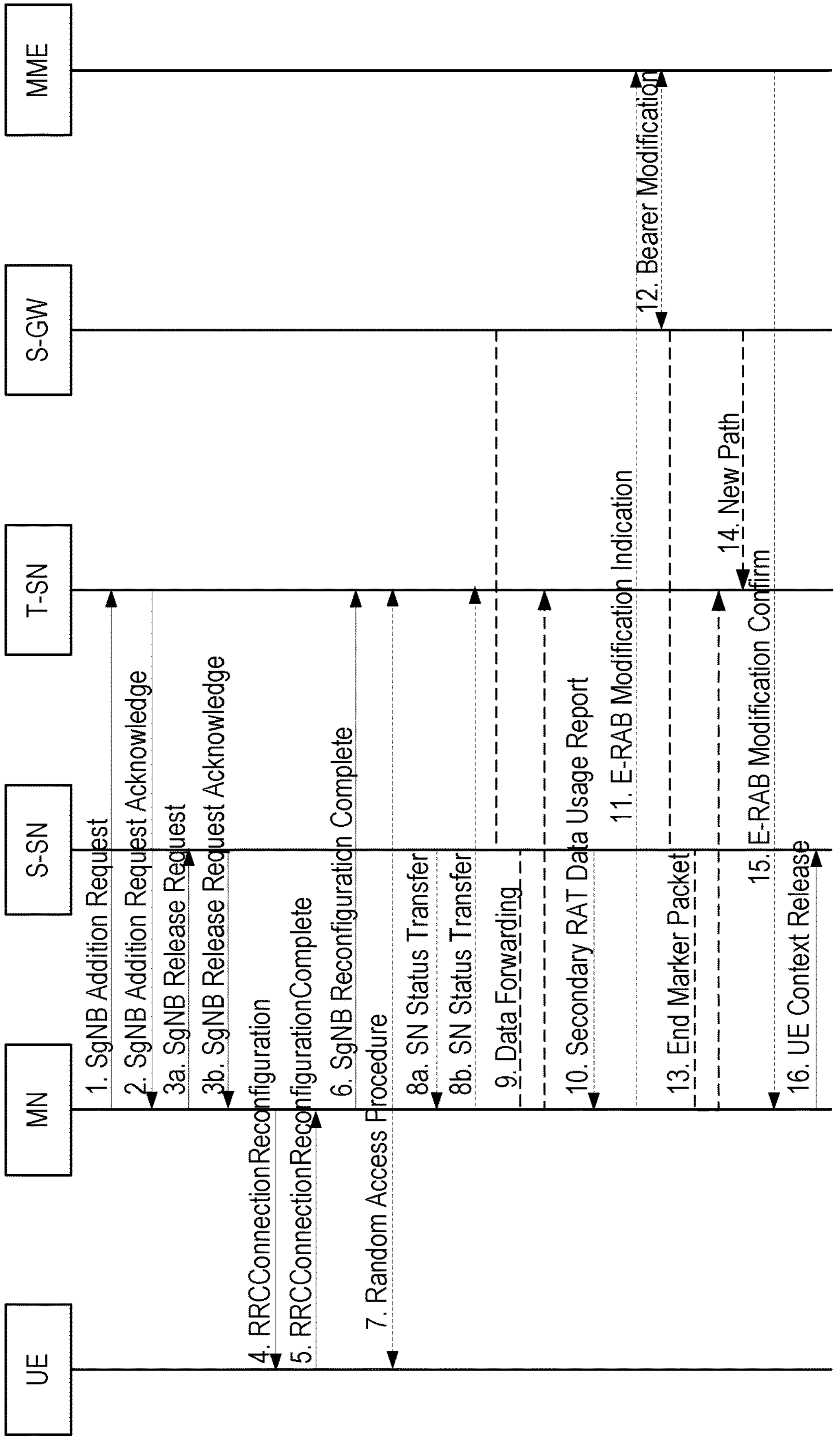
FIGS. 24 through 27 are signalling diagrams illustrating SN Change procedures in accordance with some embodiments.

FIG. 24 shows an example signalling flow for the MN initiated Secondary Node Change:

1/2. The MN initiates the SN change by requesting the target SN to allocate resources for the UE by means of the Group SgNB Addition procedure (see above). The MN may include measurement results related to the target SN. If forwarding is needed, the target SN provides forwarding addresses to the MN. The target SN includes the indication of the full or delta RRC configuration.

NOTE 2: The MN may trigger the MN-initiated SN Modification procedure (to the source SN) to retrieve the current SCG configuration before step 1.

3. If the allocation of target SN resources was successful, the MN initiates the release of the source SN resources for the plurality of devices including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the Group SgNB Release Request message triggers the source SN to stop providing user data to the UE and, if applicable, to start data forwarding.

4/5. The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

6. If the RRC connection reconfiguration procedure was successful, the MN informs the target SN via SgNBReconfigurationComplete message with the encoded NR RRC response message for the target SN, if received from the UE.

7. If configured with bearers requiring SCG radio resources, the UE synchronizes to the target SN.

8. For SN terminated bearers using RLC AM, the source SN sends the SN Status Transfer, which the MN sends then to the target SN, if needed.

9. If applicable, data forwarding from the source SN takes place. It may be initiated as early as the source SN receives the SgNB Release Request message from the MN.

10. The source SN sends the Secondary RAT Data Usage Report message to the MN and includes the data volumes delivered to and received from the UE over the NR radio for the related E-RABs.

NOTE 3: The order the SN sends the Secondary RAT Data Usage Report message and performs data forwarding with MN is not defined. The SN may send the report when the transmission of the related bearer is stopped.

11-15. If applicable, a path update is triggered by the MN.

16. Upon reception of the UE Context Release message, the source SN releases radio and C-plane related resources associated to the UE context. Any ongoing data forwarding may continue.

SN Initiated SN Change

Figure 25:
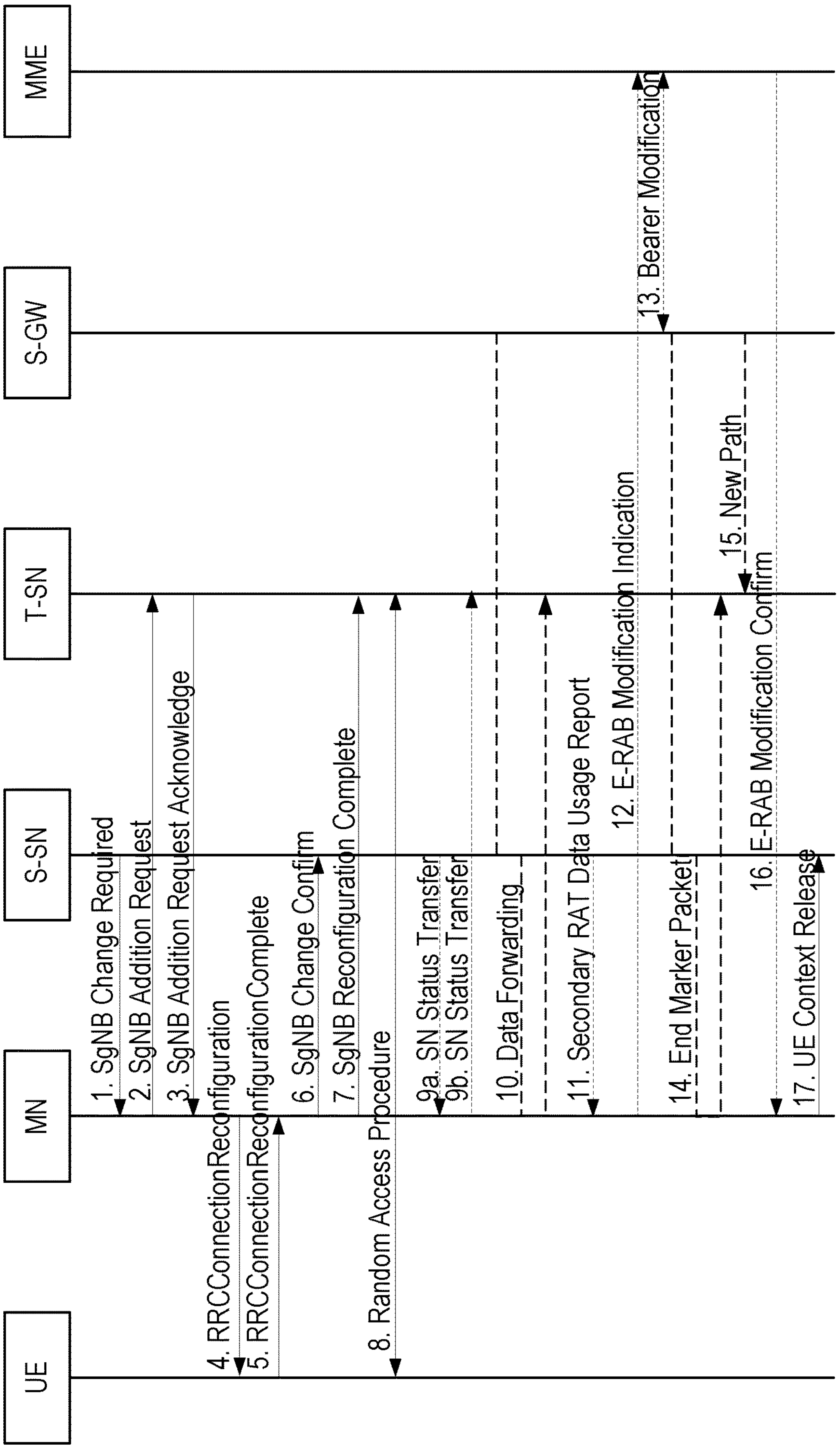

FIG. 25 shows an example signalling flow for the Secondary Node Change initiated by the SN:

1. The source SN initiates the Group SN change procedure by sending Group SgNB Change Required message which contains target SN ID information and may include the SCG configuration (to support delta configuration) and measurement results related to the target SN. See Table P below.

2/3. The MN requests the target SN to allocate resources for the UE by means of the SgNB Addition procedure (see above), including the measurement results related to the target SN received from the source SN. If forwarding is needed, the target SN provides forwarding addresses to the MN. The target SN includes the indication of the full or delta RRC configuration.

4/5. The MN triggers the UEs to apply the new configuration. The MN indicates the new configuration to the UE in the RRCConnectionReconfiguration message including the NR RRC configuration message generated by the target SN. The UEs apply the new configuration and send the RRCConnectionReconfigurationComplete message, including the encoded NR RRC response message for the target SN, if needed. In case a UE is unable to comply with (part of) the configuration included in the RRCConnectionReconfiguration message, it performs the reconfiguration failure procedure.

6. If the allocation of target SN resources was successful, the MN confirms the release of the source SN resources. If data forwarding is needed the MN provides data forwarding addresses to the source SN. If direct data forwarding is used for SN terminated bearers, the MN provides data forwarding addresses as received from the target SN to source SN. Reception of the Group SgNB Change Confirm message triggers the source SN to stop providing user data to the UE and, if applicable, to start data forwarding. See Table Q below. If the allocation of target SN resources was not successful, the MN may send the Group SgNB Change Reject message. See Table S below.

7. If the RRC connection reconfiguration procedure was successful, the MN informs the target SN via SgNB Reconfiguration Complete message with the encoded NR RRC response message for the target SN, if received from the UE.

8. The UEs synchronize to the target SN.

9. For SN terminated bearers using RLC AM, the source SN sends the SN Status Transfer, which the MN sends then to the target SN, if needed.

10. If applicable, data forwarding from the source SN takes place. It may be initiated as early as the source SN receives the SgNB Change Confirm message from the MN.

11. The source SN sends the Secondary RAT Data Usage Report message to the MN and includes the data volumes delivered to and received from the UE over the NR radio for the related E-RABs.

NOTE 4: The order the source SN sends the Secondary RAT Data Usage Report message and performs data forwarding with MN/target SN is not defined. The SgNB may send the report when the transmission of the related bearer is stopped.

12-16. If applicable, a path update is triggered by the MN.

17. Upon reception of the UE Context Release message, the source SN releases radio and C-plane related resources associated to the UE context. Any ongoing data forwarding may continue.

10.5.2 MR-DC with 5GC

MN Initiated SN Change

The MN initiated SN change procedure is used to transfer a UE context from the source SN to a target SN and to change the SCG configuration in UE from one SN to another. In the context of the present disclosure, the MN initiated SN change procedure is used to transfer a plurality of UE contexts from the source SN to a target SN and to change the SCG configuration in a plurality of UEs from one SN to another.

The Secondary Node Change procedure involves signalling over MCG SRB towards the UE.

Figure 26:
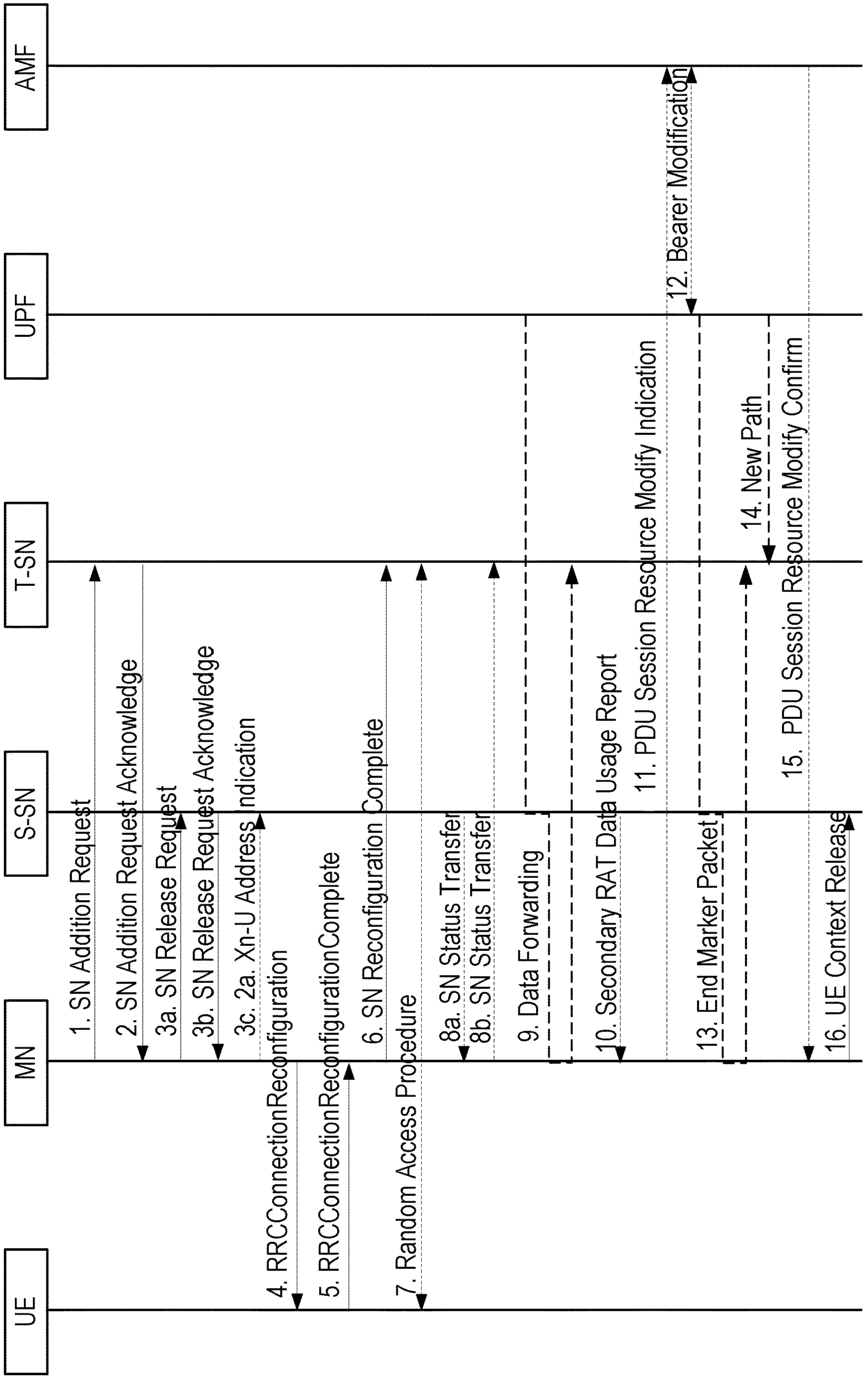

FIG. 26 shows an example signalling flow for the SN Change initiated by the MN:

1/2. The MN initiates the SN change by requesting the target SN to allocate resources for the UE by means of the SN Addition procedure (see above). The MN may include measurement results related to the target SN. If data forwarding is needed, the target SN provides data forwarding addresses to the MN. The target SN includes the indication of the full or delta RRC configuration.

NOTE 1: The MN may trigger the MN-initiated SN Modification procedure (to the source SN) to retrieve the current SCG configuration and to allow provision of data forwarding related information before step 1.

3. If the allocation of target SN resources was successful, the MN initiates the release of the source SN resources including a Cause indicating SCG mobility (see above). The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE.

4/5. The MN triggers the UE to apply the new configuration. The MN indicates the new configuration to the UE in the MN RRC reconfiguration message including the target SN RRC reconfiguration message. The UE applies the new configuration and sends the MN RRC reconfiguration complete message, including the SN RRC response message for the target SN, if needed. In case the UE is unable to comply with (part of) the configuration included in the MN RRC reconfiguration message, it performs the reconfiguration failure procedure.

6. If the RRC connection reconfiguration procedure was successful, the MN informs the target SN via SN Reconfiguration Complete message with the included SN RRC response message for the target SN, if received from the UE.

7. If configured with bearers requiring SCG radio resources the UE synchronizes to the target SN.

8. If PDCP termination point is changed for bearers using RLC AM, the source SN sends the SN Status Transfer, which the MN sends then to the target SN, if needed.

9. If applicable, data forwarding from the source SN takes place. It may be initiated as early as the source SN receives the SN Release Request message from the MN.

10. The source SN sends the Secondary RAT Data Usage Report message to the MN and includes the data volumes delivered to and received from the UE as described in clause 10.11.2.

NOTE 2: The order the SN sends the Secondary RAT Data Usage Report message and performs data forwarding with MN is not defined. The SN may send the report when the transmission of the related QoS flow is stopped.

11-15. If applicable, a PDU Session path update procedure is triggered by the MN.

16. Upon reception of the UE Context Release message, the source SN releases radio and C-plane related resources associated to the UE context. Any ongoing data forwarding may continue SN Initiated SN Change The SN initiated SN change procedure is used to transfer a UE context from the source SN to a target SN and to change the SCG configuration in UE from one SN to another. In the context of the present disclosure, the SN initiated SN change procedure is used to transfer a plurality of UE contexts from the source SN to a target SN.

Figure 27:
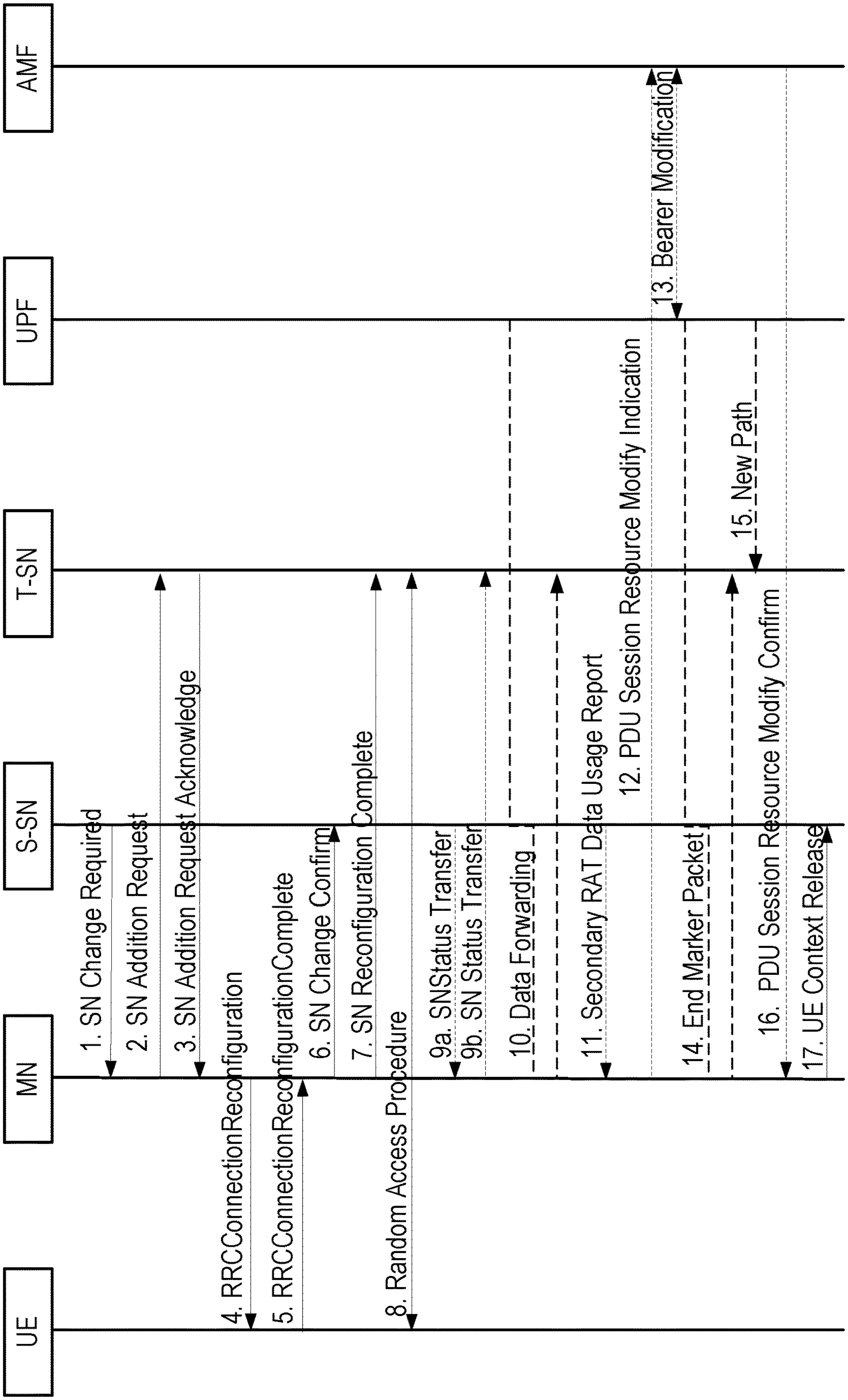

FIG. 27 shows an example signalling flow for the SN Change initiated by the SN:

1. The source SN initiates the SN change procedure by sending the Group SN Change Required message, which contains a candidate target node ID and may include the SCG configuration (to support delta configuration) and measurement results related to the target SN. See, e.g., Table P below, which can be straightforwardly adapted for LTE signalling (see the Appendix).

2/3. The MN requests the target SN to allocate resources for the UE by means of the SN Addition procedure (see above), including the measurement results related to the target SN received from the source SN. If data forwarding is needed, the target SN provides data forwarding addresses to the MN. The target SN includes the indication of the full or delta RRC configuration.

4/5. The MN triggers the UEs to apply the new configuration. The MN indicates the new configuration to the UE in the MN RRC reconfiguration message including the SN RRC reconfiguration message generated by the target SN. The UEs apply the new configuration and send the MN RRC reconfiguration complete message, including the SN RRC response message for the target SN, if needed. In case a UE is unable to comply with (part of) the configuration included in the MN RRC reconfiguration message, it performs the reconfiguration failure procedure.

6. If the allocation of target SN resources was successful, the MN confirms the change of the source SN. If data forwarding is needed the MN provides data forwarding addresses to the source SN. If direct data forwarding is used for SN terminated bearers, the MN provides data forwarding addresses as received from the target SN to source SN. Reception of the Group SN Change Confirm message triggers the source SN to stop providing user data to the UE and, if applicable, to start data forwarding. See, e.g., Table Q below, which can be straightforwardly adapted for LTE signalling (see the Appendix). If the allocation of target SN resources was not successful, the MN may send the Group SN Change Reject message. See Table S below, which can be straightforwardly adapted for LTE signalling (see the Appendix).

7. If the RRC connection reconfiguration procedure was successful, the MN informs the target SN via SN Reconfiguration Complete message with the included SN RRC response message for the target SN, if received from the UE.

8. The UEs synchronize to the target SN.

9. If PDCP termination point is changed for bearers using RLC AM, the source SN sends the SN Status Transfer, which the MN sends then to the target SN, if needed.

10. If applicable, data forwarding from the source SN takes place. It may be initiated as early as the source SN receives the SN Change Confirm message from the MN.

11. The source SN sends the Secondary RAT Data Usage Report message to the MN and includes the data volumes delivered to and received from the UE as described in clause 10.11.2.

NOTE 3: The order the SN sends the Secondary RAT Data Usage Report message and performs data forwarding with MN/target SN is not defined. The SN may send the report when the transmission of the related QoS flow is stopped.

12-16. If applicable, a PDU Session path update procedure is triggered by the MN.

17. Upon reception of the UE Context Release message, the source SN releases radio and C-plane related resources associated to the UE context. Any ongoing data forwarding may continue.

The Group SgNB Change Required message is sent by the en-gNB to the MeNB to request the change of en-gNB for a multitude of UEs/IAB-MTs at the en-gNB.

TABLE P

Group SgNB Change Required message

| IE/Group Name | Presence | Range | IE type and reference | Semantics description | Criticality | Assigned Criticality |
|---|---|---|---|---|---|---|
| Message Type | M | | 9.2.13 | | YES | reject |
| UE context Info List | | 1 | | | YES | reject |
| >UE context Info List Item | | 1 . . . <maxnoofUEs> | | | EACH | reject |
| >>MeNB UE X2AP ID | M | | eNB UE X2AP ID 9.2.24 | Allocated at the MeNB. | YES | reject |
| >>SgNB UE X2AP ID | M | | en-gNB UE X2AP ID 9.2.100 | Allocated at the en-gNB. | YES | reject |
| >>Target SgNB ID Information | M | | 9.2.102 | | YES | reject |
| >>Cause | M | | 9.2.6 | | YES | ignore |
| >>SgNB to MeNB Container | O | | OCTET STRING | Includes the CG-Config message as defined in TS 38.331 [31]. | YES | reject |
| >>MeNB UE X2AP ID Extension | O | | Extended eNB UE X2AP ID 9.2.86 | Allocated at the MeNB. | YES | reject |

The Group SgNB Change Confirm message is sent by the MeNB to inform the en-gNB about the successful change for one of more UEs/IAB-MTs. An optional enhancement to this solution is also to include a list UEs/IAB-MTs where the change failed.

TABLE Q

Group SgNB Change Confirm message

| IE/Group Name | Presence | Range | IE type and reference | Semantics description | Criticality | Assigned Criticality |
|---|---|---|---|---|---|---|
| Message Type | M | | 9.2.13 | | YES | reject |
| UE context Info List | | 1 | | | YES | reject |
| >UE context Info List Item | | 1 . . . <maxnoofUEs> | | | EACH | reject |
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |

TABLE Q-continued

| Group SgNB Change Confirm message | | | | | | |
|---|---|---|---|---|---|---|
| IE/Group Name | Presence | Range | IE type and reference | Semantics description | Criticality | Assigned Criticality |
| >>E-RABs to be Released List | | 0 . . . 1 | | | YES | ignore |
| >>>E-RABs To Be Released Item | | 1 . . . <maxnoofBearers> | | | — | |
| >>>>E-RAB ID | M | | 9.2.23 | | — | |
| >>>>EN-DC Resource Configuration | M | | EN-DC Resource Configuration 9.2.108 | Indicates the PDCP and Lower Layer MCG/SCG configuration. | — | |
| >>>>CHOICE Resource Configuration | M | | | | | |
| >>>>>PDCP present in SN | | | | This choice tag is used if the PDCP at SgNB IE in the EN-DC Resource Configuration IE is set to the value "present". | | |
| >>>>>>UL Forwarding GTP Tunnel Endpoint | O | | GTP Tunnel Endpoint 9.2.1 | Identifies the X2 transport bearer used for forwarding of UL PDUS | — | |
| >>>>>>DL Forwarding GTP Tunnel Endpoint | O | | GTP Tunnel Endpoint 9.2.1 | Identifies the X2 transport bearer used for forwarding of DL PDUs | — | |
| >>>>>PDCP not present in SN | | | | This choice tag is used if the PDCP at SgNB IE in the EN-DC Resource Configuration IE is set to the value "not present". | | |
| >>Criticality Diagnostics | O | | 9.2.7 | | YES | ignore |
| >>MeNB UE X2AP ID Extension | O | | Extended eNB UE X2AP ID 9.2.86 | Allocated at the MeNB | YES | ignore |
| Failed UE context Info List | | 1 | | | YES | reject |
| >UE context Info List Item | | 0 . . . <maxnoofUEs> | | | EACH | reject |
| >>MeNB UE X2AP ID | M | | eNB UE X2AP ID 9.2.24 | Allocated at the MeNB. | YES | ignore |

TABLE Q-continued

| Group SgNB Change Confirm message | | | | | | |
|---|---|---|---|---|---|---|
| IE/Group Name | Presence | Range | IE type and reference | Semantics description | Criticality | Assigned Criticality |
| >>SgNB UE X2AP ID | M | | en-gNB UE X2AP ID 9.2.100 | Allocated at the en-gNB. | YES | ignore |

TABLE R

| Range bound | Explanation |
|---|---|
| maxnoofBearers | Maximum no. of E-RABs. Value is 256 |

The Group SgNB Change Refuse message is sent by the MeNB to inform the en-gNB that the SgNB initiated SgNB Change has failed.

TABLE S

| Group SgNB Change Refuse message | | | | | | |
|---|---|---|---|---|---|---|
| IE/Group Name | Presence | Range | IE type and reference | Semantics description | Criticality | Assigned Criticality |
| Message Type | M | | 9.2.13 | | YES | reject |
| UE context Info List | | 1 | | | YES | reject |
| >UE context Info List Item | | 1 . . . <maxnoofUEs> | | | EACH | reject |
| >>MeNB UE X2AP ID | M | | eNB UE X2AP ID 9.2.24 | Allocated at the MeNB. | YES | ignore |
| >>SgNB UE X2AP ID | M | | en-gNB UE X2AP ID 9.2.100 | Allocated at the en-gNB. | YES | ignore |
| >>Cause | M | | 9.2.6 | | YES | ignore |
| >>Criticality Diagnostics | O | | 9.2.7 | | YES | ignore |
| >>MeNB UE X2AP ID Extension | O | | Extended eNB UE X2AP ID 9.2.86 | Allocated at the MeNB. | YES | reject |

Figure 28:
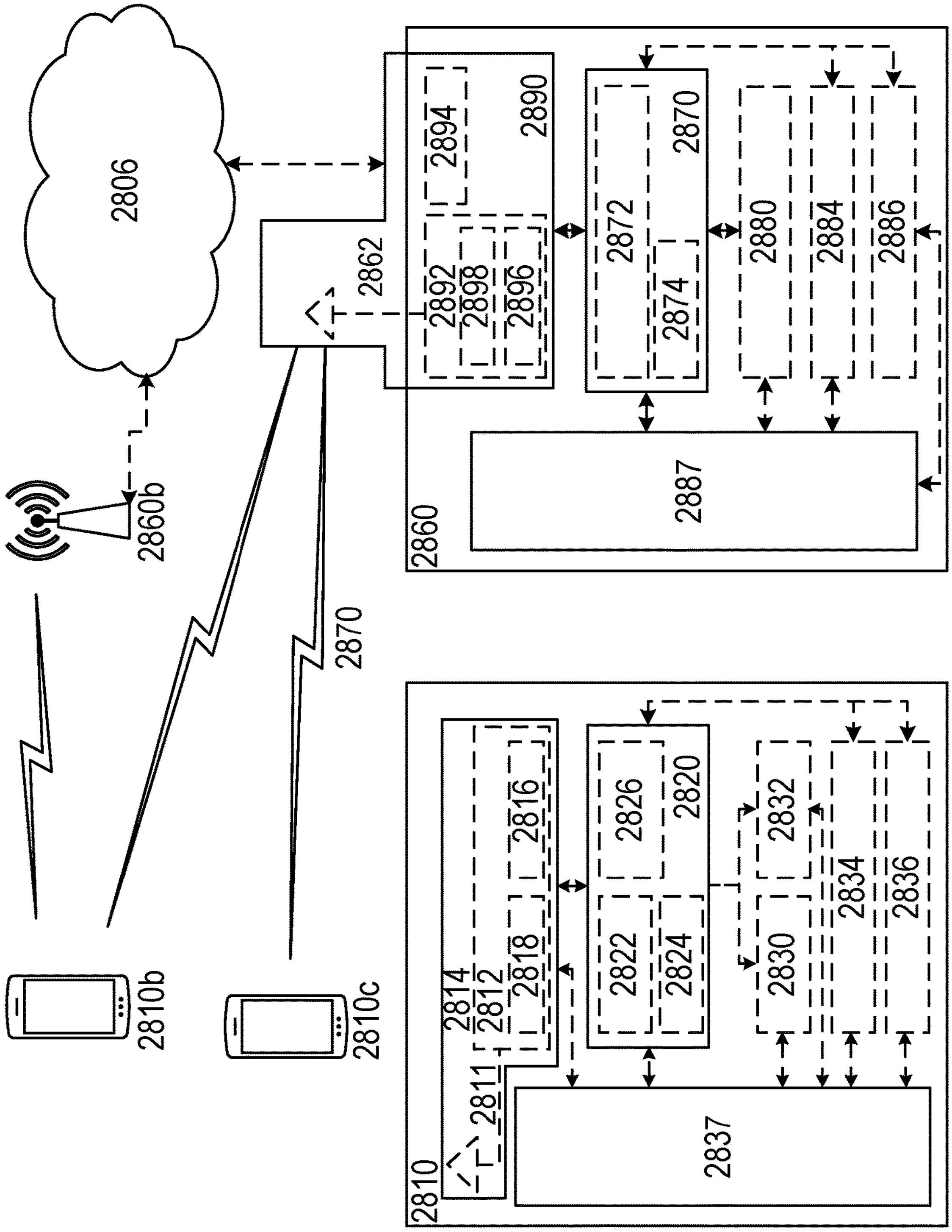
FIG. 28 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 28. For simplicity, the wireless network of FIG. 28 only depicts network 2806, network nodes 2860 and 2860*b*, and WDs 2810, 2810*b*, and 2810*c*. In practice, a wireless network may further include any additional elements suitable to support communication between wireless devices or between a wireless device and another communication device, such as a landline telephone, a service provider, or any other network node or end device. Of the illustrated components, network node 2860 and wireless device (WD) 2810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2860 and WD 2810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 28, network node 2860 includes processing circuitry 2870, device readable medium 2880, interface 2890, auxiliary equipment 2884, power source 2886, power circuitry 2887, and antenna 2862. Although network node 2860 illustrated in the example wireless network of FIG. 28 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2860 are depicted as single boxes located within a larger box, or nested within multiple boxes, in practice, a network node may comprise multiple different physical components that make up a single illustrated component (e.g., device readable medium 2880 may comprise multiple separate hard drives as well as multiple RAM modules).

Similarly, network node 2860 may be composed of multiple physically separate components (e.g., a NodeB component and a RNC component, or a BTS component and a BSC component, etc.), which may each have their own respective components. In certain scenarios in which network node 2860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2860 may be configured to support multiple radio access technologies (RATs). In such embodiments, some components may be duplicated (e.g., separate device readable medium 2880 for the different RATs) and some components may be reused (e.g., the same antenna 2862 may be shared by the RATs). Network node 2860 may also include multiple sets of the various illustrated components for different wireless technologies integrated into network node 2860, such as, for example, GSM, WCDMA, LTE, NR, WiFi, or Bluetooth wireless technologies. These wireless technologies may be integrated into the same or different chip or set of chips and other components within network node 2860.

Processing circuitry 2870 is configured to perform any determining, calculating, or similar operations (e.g., certain obtaining operations) described herein as being provided by a network node. These operations performed by processing circuitry 2870 may include processing information obtained by processing circuitry 2870 by, for example, converting the obtained information into other information, comparing the obtained information or converted information to information stored in the network node, and/or performing one or more operations based on the obtained information or converted information, and as a result of said processing making a determination.

Processing circuitry 2870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2860 components, such as device readable medium 2880, network node 2860 functionality. For example, processing circuitry 2870 may execute instructions stored in device readable medium 2880 or in memory within processing circuitry 2870. Such functionality may include providing any of the various wireless features, functions, or benefits discussed herein. In some embodiments, processing circuitry 2870 may include a system on a chip (SOC).

In some embodiments, processing circuitry 2870 may include one or more of radio frequency (RF) transceiver circuitry 2872 and baseband processing circuitry 2874. In some embodiments, radio frequency (RF) transceiver circuitry 2872 and baseband processing circuitry 2874 may be on separate chips (or sets of chips), boards, or units, such as radio units and digital units. In alternative embodiments, part or all of RF transceiver circuitry 2872 and baseband processing circuitry 2874 may be on the same chip or set of chips, boards, or units In certain embodiments, some or all of the functionality described herein as being provided by a network node, base station, eNB or other such network device may be performed by processing circuitry 2870 executing instructions stored on device readable medium 2880 or memory within processing circuitry 2870. In alternative embodiments, some or all of the functionality may be provided by processing circuitry 2870 without executing instructions stored on a separate or discrete device readable medium, such as in a hard-wired manner. In any of those embodiments, whether executing instructions stored on a device readable storage medium or not, processing circuitry 2870 can be configured to perform the described functionality. The benefits provided by such functionality are not limited to processing circuitry 2870 alone or to other components of network node 2860, but are enjoyed by network node 2860 as a whole, and/or by end users and the wireless network generally.

Device readable medium 2880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2870. Device readable medium 2880 may store any suitable instructions, data or information, including a computer program, software, an application including one or more of logic, rules, code, tables, etc. and/or other instructions capable of being executed by processing circuitry 2870 and, utilized by network node 2860. Device readable medium 2880 may be used to store any calculations made by processing circuitry 2870 and/or any data received via interface 2890. In some embodiments, processing circuitry 2870 and device readable medium 2880 may be considered to be integrated.

Interface 2890 is used in the wired or wireless communication of signalling and/or data between network node 2860, network 2806, and/or WDs 2810. As illustrated, interface 2890 comprises port(s)/terminal(s) 2894 to send and receive data, for example to and from network 2806 over a wired connection. Interface 2890 also includes radio front end circuitry 2892 that may be coupled to, or in certain embodiments a part of, antenna 2862. Radio front end circuitry 2892 comprises filters 2898 and amplifiers 2896. Radio front end circuitry 2892 may be connected to antenna 2862 and processing circuitry 2870. Radio front end circuitry may be configured to condition signals communicated between antenna 2862 and processing circuitry 2870. Radio front end circuitry 2892 may receive digital data that is to be sent out to other network nodes or WDs via a wireless connection. Radio front end circuitry 2892 may convert the digital data into a radio signal having the appropriate channel and bandwidth parameters using a combination of filters 2898 and/or amplifiers 2896. The radio signal may then be transmitted via antenna 2862. Similarly, when receiving data, antenna 2862 may collect radio signals which are then converted into digital data by radio front end circuitry 2892. The digital data may be passed to processing circuitry 2870. In other embodiments, the interface may comprise different components and/or different combinations of components.

In certain alternative embodiments, network node 2860 may not include separate radio front end circuitry 2892, instead, processing circuitry 2870 may comprise radio front end circuitry and may be connected to antenna 2862 without separate radio front end circuitry 2892. Similarly, in some embodiments, all or some of RF transceiver circuitry 2872 may be considered a part of interface 2890. In still other embodiments, interface 2890 may include one or more ports or terminals 2894, radio front end circuitry 2892, and RF transceiver circuitry 2872, as part of a radio unit (not shown), and interface 2890 may communicate with baseband processing circuitry 2874, which is part of a digital unit (not shown).

Antenna 2862 may include one or more antennas, or antenna arrays, configured to send and/or receive wireless signals. Antenna 2862 may be coupled to radio front end circuitry 2890 and may be any type of antenna capable of transmitting and receiving data and/or signals wirelessly. In some embodiments, antenna 2862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2862 may be separate from network node 2860 and may be connectable to network node 2860 through an interface or port.

Antenna 2862, interface 2890, and/or processing circuitry 2870 may be configured to perform any receiving operations and/or certain obtaining operations described herein as being performed by a network node. Any information, data and/or signals may be received from a wireless device, another network node and/or any other network equipment. Similarly, antenna 2862, interface 2890, and/or processing circuitry 2870 may be configured to perform any transmitting operations described herein as being performed by a network node. Any information, data and/or signals may be transmitted to a wireless device, another network node and/or any other network equipment.

Power circuitry 2887 may comprise, or be coupled to, power management circuitry and is configured to supply the components of network node 2860 with power for performing the functionality described herein. Power circuitry 2887 may receive power from power source 2886. Power source 2886 and/or power circuitry 2887 may be configured to provide power to the various components of network node 2860 in a form suitable for the respective components (e.g., at a voltage and current level needed for each respective component). Power source 2886 may either be included in, or external to, power circuitry 2887 and/or network node 2860. For example, network node 2860 may be connectable to an external power source (e.g., an electricity outlet) via an input circuitry or interface such as an electrical cable, whereby the external power source supplies power to power circuitry 2887. As a further example, power source 2886 may comprise a source of power in the form of a battery or battery pack which is connected to, or integrated in, power circuitry 2887. The battery may provide backup power should the external power source fail. Other types of power sources, such as photovoltaic devices, may also be used.

Alternative embodiments of network node 2860 may include additional components beyond those shown in FIG. 28 that may be responsible for providing certain aspects of the network node's functionality, including any of the functionality described herein and/or any functionality necessary to support the subject matter described herein. For example, network node 2860 may include user interface equipment to allow input of information into network node 2860 and to allow output of information from network node 2860. This may allow a user to perform diagnostic, maintenance, repair, and other administrative functions for network node 2860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2810 includes antenna 2811, interface 2814, processing circuitry 2820, device readable medium 2830, user interface equipment 2832, auxiliary equipment 2834, power source 2836 and power circuitry 2837. WD 2810 may include multiple sets of one or more of the illustrated components for different wireless technologies supported by WD 2810, such as, for example, GSM, WCDMA, LTE, NR, WiFi, WiMAX, or Bluetooth wireless technologies, just to mention a few. These wireless technologies may be integrated into the same or different chips or set of chips as other components within WD 2810.

Antenna 2811 may include one or more antennas or antenna arrays, configured to send and/or receive wireless signals, and is connected to interface 2814. In certain alternative embodiments, antenna 2811 may be separate from WD 2810 and be connectable to WD 2810 through an interface or port. Antenna 2811, interface 2814, and/or processing circuitry 2820 may be configured to perform any receiving or transmitting operations described herein as being performed by a WD. Any information, data and/or signals may be received from a network node and/or another WD. In some embodiments, radio front end circuitry and/or antenna 2811 may be considered an interface.

As illustrated, interface 2814 comprises radio front end circuitry 2812 and antenna 2811. Radio front end circuitry 2812 comprise one or more filters 2818 and amplifiers 2816. Radio front end circuitry 2814 is connected to antenna 2811 and processing circuitry 2820, and is configured to condition signals communicated between antenna 2811 and processing circuitry 2820. Radio front end circuitry 2812 may be coupled to or a part of antenna 2811. In some embodiments, WD 2810 may not include separate radio front end circuitry 2812; rather, processing circuitry 2820 may comprise radio front end circuitry and may be connected to antenna 2811. Similarly, in some embodiments, some or all of RF transceiver circuitry 2822 may be considered a part of interface 2814. Radio front end circuitry 2812 may receive digital data that is to be sent out to other network nodes or WDs via a wireless connection. Radio front end circuitry 2812 may convert the digital data into a radio signal having the appropriate channel and bandwidth parameters using a combination of filters 2818 and/or amplifiers 2816. The radio signal may then be transmitted via antenna 2811. Similarly, when receiving data, antenna 2811 may collect radio signals which are then converted into digital data by radio front end circuitry 2812. The digital data may be passed to processing circuitry 2820. In other embodiments, the interface may comprise different components and/or different combinations of components.

Processing circuitry 2820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2810 components, such as device readable medium 2830, WD 2810 functionality. Such functionality may include providing any of the various wireless features or benefits discussed herein. For example, processing circuitry 2820 may execute instructions stored in device readable medium 2830 or in memory within processing circuitry 2820 to provide the functionality disclosed herein.

As illustrated, processing circuitry 2820 includes one or more of RF transceiver circuitry 2822, baseband processing circuitry 2824, and application processing circuitry 2826. In other embodiments, the processing circuitry may comprise different components and/or different combinations of components. In certain embodiments processing circuitry 2820 of WD 2810 may comprise a SOC. In some embodiments, RF transceiver circuitry 2822, baseband processing circuitry 2824, and application processing circuitry 2826 may be on separate chips or sets of chips. In alternative embodiments, part or all of baseband processing circuitry 2824 and application processing circuitry 2826 may be combined into one chip or set of chips, and RF transceiver circuitry 2822 may be on a separate chip or set of chips. In still alternative embodiments, part or all of RF transceiver circuitry 2822 and baseband processing circuitry 2824 may be on the same chip or set of chips, and application processing circuitry 2826 may be on a separate chip or set of chips. In yet other alternative embodiments, part or all of RF transceiver circuitry 2822, baseband processing circuitry 2824, and application processing circuitry 2826 may be combined in the same chip or set of chips. In some embodiments, RF transceiver circuitry 2822 may be a part of interface 2814. RF transceiver circuitry 2822 may condition RF signals for processing circuitry 2820.

In certain embodiments, some or all of the functionality described herein as being performed by a WD may be provided by processing circuitry 2820 executing instructions stored on device readable medium 2830, which in certain embodiments may be a computer-readable storage medium. In alternative embodiments, some or all of the functionality may be provided by processing circuitry 2820 without executing instructions stored on a separate or discrete device readable storage medium, such as in a hard-wired manner. In any of those particular embodiments, whether executing instructions stored on a device readable storage medium or not, processing circuitry 2820 can be configured to perform the described functionality. The benefits provided by such functionality are not limited to processing circuitry 2820 alone or to other components of WD 2810, but are enjoyed by WD 2810 as a whole, and/or by end users and the wireless network generally.

Processing circuitry 2820 may be configured to perform any determining, calculating, or similar operations (e.g., certain obtaining operations) described herein as being performed by a WD. These operations, as performed by processing circuitry 2820, may include processing information obtained by processing circuitry 2820 by, for example, converting the obtained information into other information, comparing the obtained information or converted information to information stored by WD 2810, and/or performing one or more operations based on the obtained information or converted information, and as a result of said processing making a determination.

Device readable medium 2830 may be operable to store a computer program, software, an application including one or more of logic, rules, code, tables, etc. and/or other instructions capable of being executed by processing circuitry 2820. Device readable medium 2830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD), and/or any other volatile or non-volatile, non-transitory device readable and/or computer executable memory devices that store information, data, and/or instructions that may be used by processing circuitry 2820. In some embodiments, processing circuitry 2820 and device readable medium 2830 may be considered to be integrated.

User interface equipment 2832 may provide components that allow for a human user to interact with WD 2810. Such interaction may be of many forms, such as visual, audial, tactile, etc. User interface equipment 2832 may be operable to produce output to the user and to allow the user to provide input to WD 2810. The type of interaction may vary depending on the type of user interface equipment 2832 installed in WD 2810. For example, if WD 2810 is a smart phone, the interaction may be via a touch screen; if WD 2810 is a smart meter, the interaction may be through a screen that provides usage (e.g., the number of gallons used) or a speaker that provides an audible alert (e.g., if smoke is detected). User interface equipment 2832 may include input interfaces, devices and circuits, and output interfaces, devices and circuits. User interface equipment 2832 is configured to allow input of information into WD 2810, and is connected to processing circuitry 2820 to allow processing circuitry 2820 to process the input information. User interface equipment 2832 may include, for example, a microphone, a proximity or other sensor, keys/buttons, a touch display, one or more cameras, a USB port, or other input circuitry. User interface equipment 2832 is also configured to allow output of information from WD 2810, and to allow processing circuitry 2820 to output information from WD 2810. User interface equipment 2832 may include, for example, a speaker, a display, vibrating circuitry, a USB port, a headphone interface, or other output circuitry. Using one or more input and output interfaces, devices, and circuits, of user interface equipment 2832, WD 2810 may communicate with end users and/or the wireless network, and allow them to benefit from the functionality described herein.

Auxiliary equipment 2834 is operable to provide more specific functionality which may not be generally performed by WDs. This may comprise specialized sensors for doing measurements for various purposes, interfaces for additional types of communication such as wired communications etc. The inclusion and type of components of auxiliary equipment 2834 may vary depending on the embodiment and/or scenario.

Power source 2836 may, in some embodiments, be in the form of a battery or battery pack. Other types of power sources, such as an external power source (e.g., an electricity outlet), photovoltaic devices or power cells, may also be used. WD 2810 may further comprise power circuitry 2837 for delivering power from power source 2836 to the various parts of WD 2810 which need power from power source 2836 to carry out any functionality described or indicated herein. Power circuitry 2837 may in certain embodiments comprise power management circuitry. Power circuitry 2837 may additionally or alternatively be operable to receive power from an external power source; in which case WD 2810 may be connectable to the external power source (such as an electricity outlet) via input circuitry or an interface such as an electrical power cable. Power circuitry 2837 may also in certain embodiments be operable to deliver power from an external power source to power source 2836. This may be, for example, for the charging of power source 2836. Power circuitry 2837 may perform any formatting, converting, or other modification to the power from power source 2836 to make the power suitable for the respective components of WD 2810 to which power is supplied.

Figure 29:
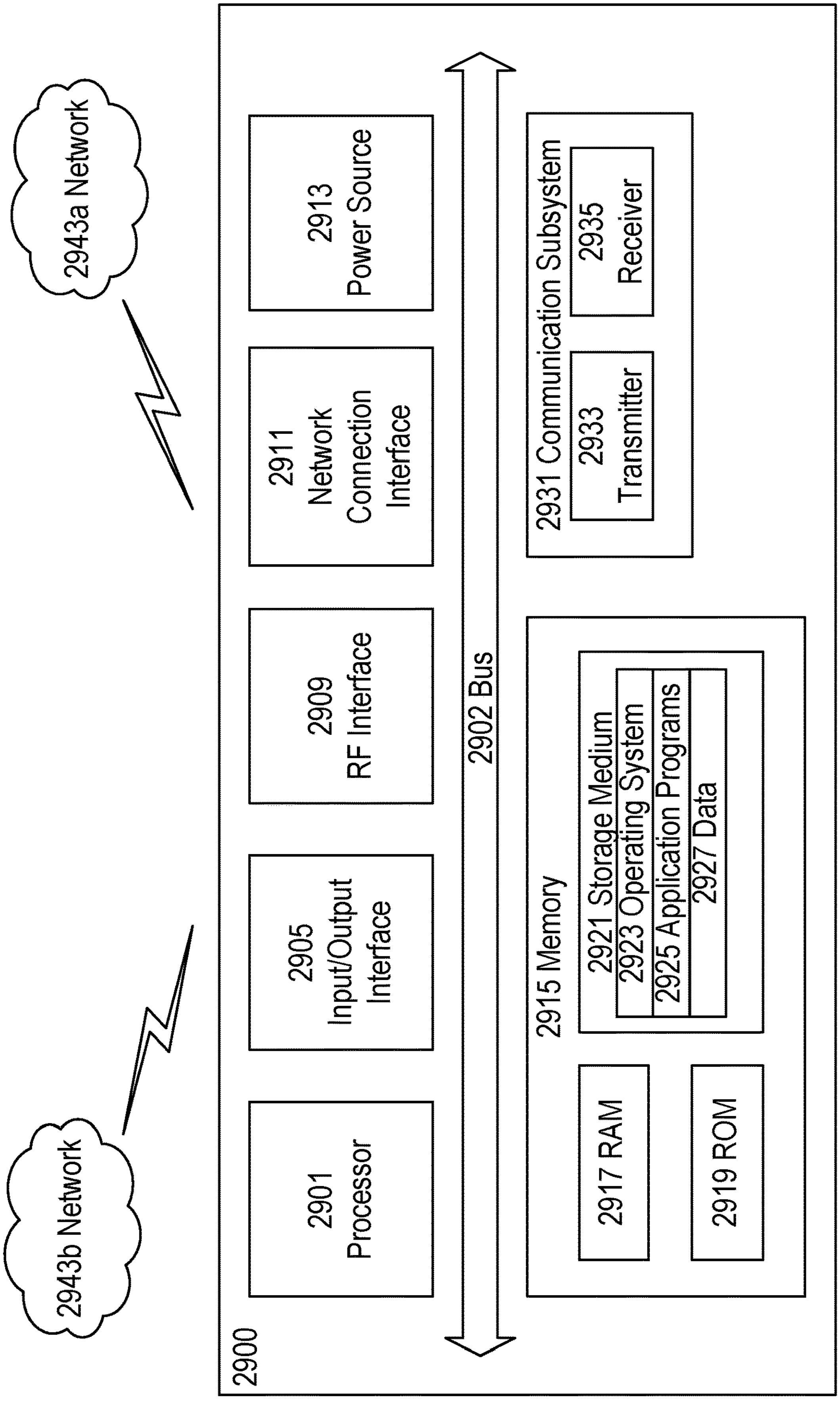
FIG. 29 is a schematic diagram of a User Equipment in accordance with some embodiments.

FIG. 29 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2900 may be any UE identified by the 3$^{rd}$ Generation Partnership Project (3GPP), including a NB-IoT UE, a machine type communication (MTC) UE, and/or an enhanced MTC (eMTC) UE. UE 2900, as illustrated in FIG. 29, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 29 is a UE, the components discussed herein are equally applicable to a WD, and vice-versa.

In FIG. 29, UE 2900 includes processing circuitry 2901 that is operatively coupled to input/output interface 2905, radio frequency (RF) interface 2909, network connection interface 2911, memory 2915 including random access memory (RAM) 2917, read-only memory. (ROM) 2919, and storage medium 2921 or the like, communication subsystem 2931, power source 2933, and/or any other component, or any combination thereof. Storage medium 2921 includes operating system 2923, application program 2925, and data 2927. In other embodiments, storage medium 2921 may include other similar types of information. Certain UEs may utilize all of the components shown in FIG. 29, or only a subset of the components. The level of integration between the components may vary from one UE to another UE. Further, certain UEs may contain multiple instances of a component, such as multiple processors, memories, transceivers, transmitters, receivers, etc.

In FIG. 29, processing circuitry 2901 may be configured to process computer instructions and data. Processing circuitry 2901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2901 may include two central processing units (CPUs). Data may be information in a form suitable for use by a computer.

In the depicted embodiment, input/output interface 2905 may be configured to provide a communication interface to an input device, output device, or input and output device. UE 2900 may be configured to use an output device via input/output interface 2905. An output device may use the same type of interface port as an input device. For example, a USB port may be used to provide input to and output from UE 2900. The output device may be a speaker, a sound card, a video card, a display, a monitor, a printer, an actuator, an emitter, a smartcard, another output device, or any combination thereof. UE 2900 may be configured to use an input device via input/output interface 2905 to allow a user to capture information into UE 2900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 29, RF interface 2909 may be configured to provide a communication interface to RF components such as a transmitter, a receiver, and an antenna. Network connection interface 2911 may be configured to provide a communication interface to network 2943*a*. Network 2943*a* may encompass wired and/or wireless networks such as a local-area network (LAN), a wide-area network (WAN), a computer network, a wireless network, a telecommunications network, another like network or any combination thereof. For example, network 2943*a* may comprise a Wi-Fi network. Network connection interface 2911 may be configured to include a receiver and a transmitter interface used to communicate with one or more other devices over a communication network according to one or more communication protocols, such as Ethernet, TCP/IP, SONET, ATM, or the like. Network connection interface 2911 may implement receiver and transmitter functionality appropriate to the communication network links (e.g., optical, electrical, and the like). The transmitter and receiver functions may share circuit components, software or firmware, or alternatively may be implemented separately.

RAM 2917 may be configured to interface via bus 2902 to processing circuitry 2901 to provide storage or caching of data or computer instructions during the execution of software programs such as the operating system, application programs, and device drivers. ROM 2919 may be configured to provide computer instructions or data to processing circuitry 2901. For example, ROM 2919 may be configured to store invariant low-level system code or data for basic system functions such as basic input and output (I/O), startup, or reception of keystrokes from a keyboard that are stored in a non-volatile memory. Storage medium 2921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2921 may be configured to include operating system 2923, application program 2925 such as a web browser application, a widget or gadget engine or another application, and data file 2927. Storage medium 2921 may store, for use by UE 2900, any of a variety of various operating systems or combinations of operating systems.

Storage medium 2921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2921 may allow UE 2900 to access computer-executable instructions, application programs or the like, stored on transitory or non-transitory memory media, to off-load data, or to upload data. An article of manufacture, such as one utilizing a communication system may be tangibly embodied in storage medium 2921, which may comprise a device readable medium.

In FIG. 29, processing circuitry 2901 may be configured to communicate with network 2943*b* using communication subsystem 2931. Network 2943*a* and network 2943*b* may be the same network or networks or different network or networks. Communication subsystem 2931 may be configured to include one or more transceivers used to communicate with network 2943*b*. For example, communication subsystem 2931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2933 and/or receiver 2935 to implement transmitter or receiver functionality, respectively, appropriate to the RAN links (e.g., frequency allocations and the like). Further, transmitter 2933 and receiver 2935 of each transceiver may share circuit components, software or firmware, or alternatively may be implemented separately.

In the illustrated embodiment, the communication functions of communication subsystem 2931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2931 may include cellular communication, Wi-Fi communication, Bluetooth communication, and GPS communication. Network 2943*b* may encompass wired and/or wireless networks such as a local-area network (LAN), a wide-area network (WAN), a computer network, a wireless network, a telecommunications network, another like network or any combination thereof. For example, network 2943*b* may be a cellular network, a Wi-Fi network, and/or a near-field network. Power source 2913 may be configured to provide alternating current (AC) or direct current (DC) power to components of UE 2900.

The features, benefits and/or functions described herein may be implemented in one of the components of UE 2900 or partitioned across multiple components of UE 2900. Further, the features, benefits, and/or functions described herein may be implemented in any combination of hardware, software or firmware. In one example, communication subsystem 2931 may be configured to include any of the components described herein. Further, processing circuitry 2901 may be configured to communicate with any of such components over bus 2902. In another example, any of such components may be represented by program instructions stored in memory that when executed by processing circuitry 2901 perform the corresponding functions described herein. In another example, the functionality of any of such components may be partitioned between processing circuitry 2901 and communication subsystem 2931. In another example, the non-computationally intensive functions of any of such components may be implemented in software or firmware and the computationally intensive functions may be implemented in hardware.

Figure 30:
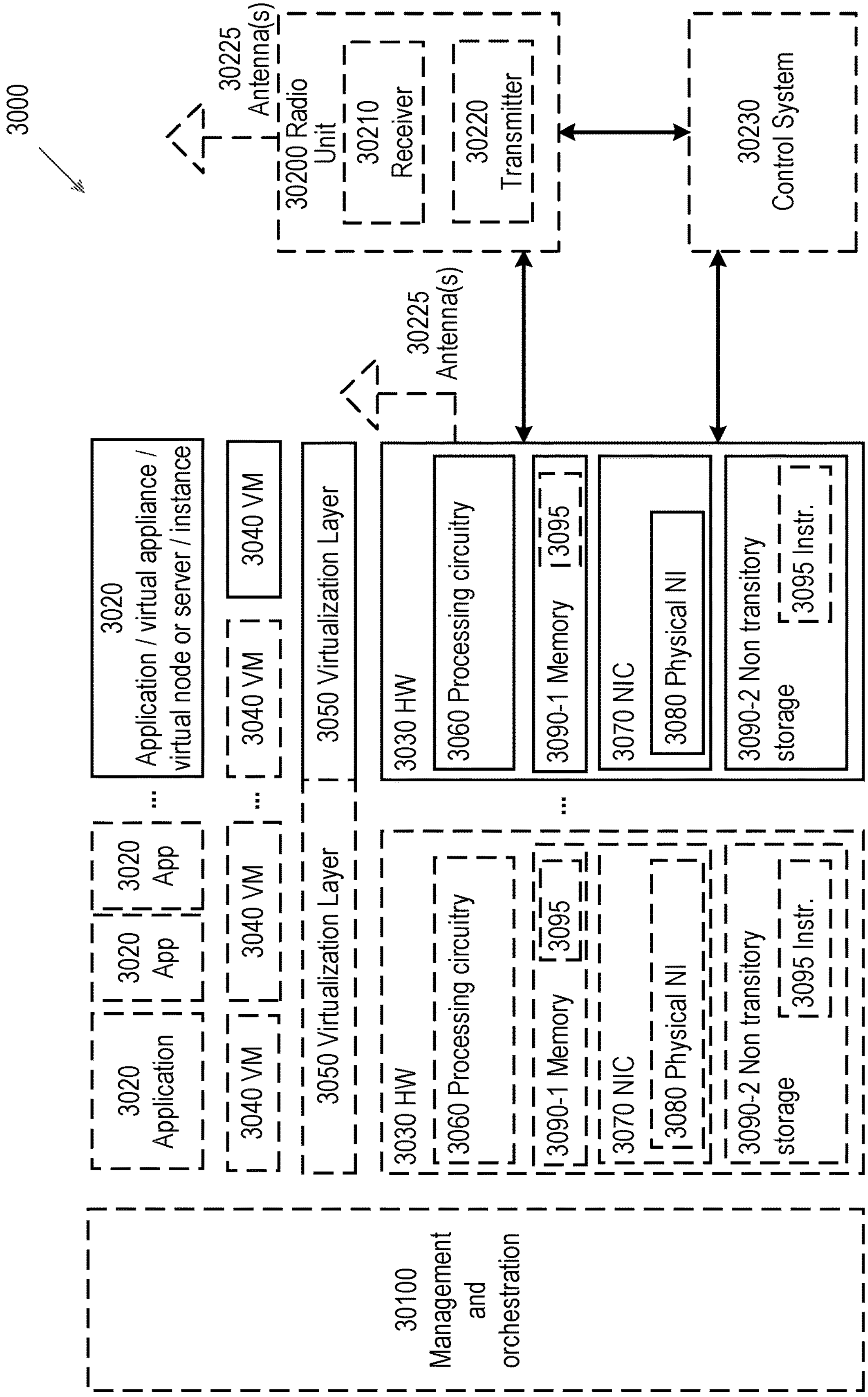
FIG. 30 is a schematic diagram of a virtualization environment in accordance with some embodiments.

FIG. 30 is a schematic block diagram illustrating a virtualization environment 3000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 3000 hosted by one or more of hardware nodes 3030. Further, in embodiments in which the virtual node is not a radio access node or does not require radio connectivity (e.g., a core network node), then the network node may be entirely virtualized.

The functions may be implemented by one or more applications 3020 (which may alternatively be called software instances, virtual appliances, network functions, virtual nodes, virtual network functions, etc.) operative to implement some of the features, functions, and/or benefits of some of the embodiments disclosed herein. Applications 3020 are run in virtualization environment 3000 which provides hardware 3030 comprising processing circuitry 3060 and memory 3090. Memory 3090 contains instructions 3095 executable by processing circuitry 3060 whereby application 3020 is operative to provide one or more of the features, benefits, and/or functions disclosed herein.

Virtualization environment 3000, comprises general-purpose or special-purpose network hardware devices 3030 comprising a set of one or more processors or processing circuitry 3060, which may be commercial off-the-shelf (COTS) processors, dedicated Application Specific Integrated Circuits (ASICs), or any other type of processing circuitry including digital or analog hardware components or special purpose processors. Each hardware device may comprise memory 3090-1 which may be non-persistent memory for temporarily storing instructions 3095 or software executed by processing circuitry 3060. Each hardware device may comprise one or more network interface controllers (NICs) 3070, also known as network interface cards, which include physical network interface 3080. Each hardware device may also include non-transitory, persistent, machine-readable storage media 3090-2 having stored therein software 3095 and/or instructions executable by processing circuitry 3060. Software 3095 may include any type of software including software for instantiating one or more virtualization layers 3050 (also referred to as hypervisors), software to execute virtual machines 3040 as well as software allowing it to execute functions, features and/or benefits described in relation with some embodiments described herein.

Virtual machines 3040, comprise virtual processing, virtual memory, virtual networking or interface and virtual storage, and may be run by a corresponding virtualization layer 3050 or hypervisor. Different embodiments of the instance of virtual appliance 3020 may be implemented on one or more of virtual machines 3040, and the implementations may be made in different ways.

During operation, processing circuitry 3060 executes software 3095 to instantiate the hypervisor or virtualization layer 3050, which may sometimes be referred to as a virtual machine monitor (VMM). Virtualization layer 3050 may present a virtual operating platform that appears like networking hardware to virtual machine 3040.

As shown in FIG. 30, hardware 3030 may be a standalone network node with generic or specific components. Hardware 3030 may comprise antenna 30225 and may implement some functions via virtualization. Alternatively, hardware 3030 may be part of a larger cluster of hardware (e.g. such as in a data center or customer premise equipment (CPE)) where many hardware nodes work together and are managed via management and orchestration (MANO) 30100, which, among others, oversees lifecycle management of applications 3020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 3040 may be a software implementation of a physical machine that runs programs as if they were executing on a physical, non-virtualized machine. Each of virtual machines 3040, and that part of hardware 3030 that executes that virtual machine, be it hardware dedicated to that virtual machine and/or hardware shared by that virtual machine with others of the virtual machines 3040, forms a separate virtual network elements (VNE).

Still in the context of NFV, Virtual Network Function (VNF) is responsible for handling specific network functions that run in one or more virtual machines 3040 on top of hardware networking infrastructure 3030 and corresponds to application 3020 in FIG. 30.

In some embodiments, one or more radio units 30200 that each include one or more transmitters 30220 and one or more receivers 30210 may be coupled to one or more antennas 30225. Radio units 30200 may communicate directly with hardware nodes 3030 via one or more appropriate network interfaces and may be used in combination with the virtual components to provide a virtual node with radio capabilities, such as a radio access node or a base station.

In some embodiments, some signalling can be effected with the use of control system 30230 which may alternatively be used for communication between the hardware nodes 3030 and radio units 30200.

Figure 31:
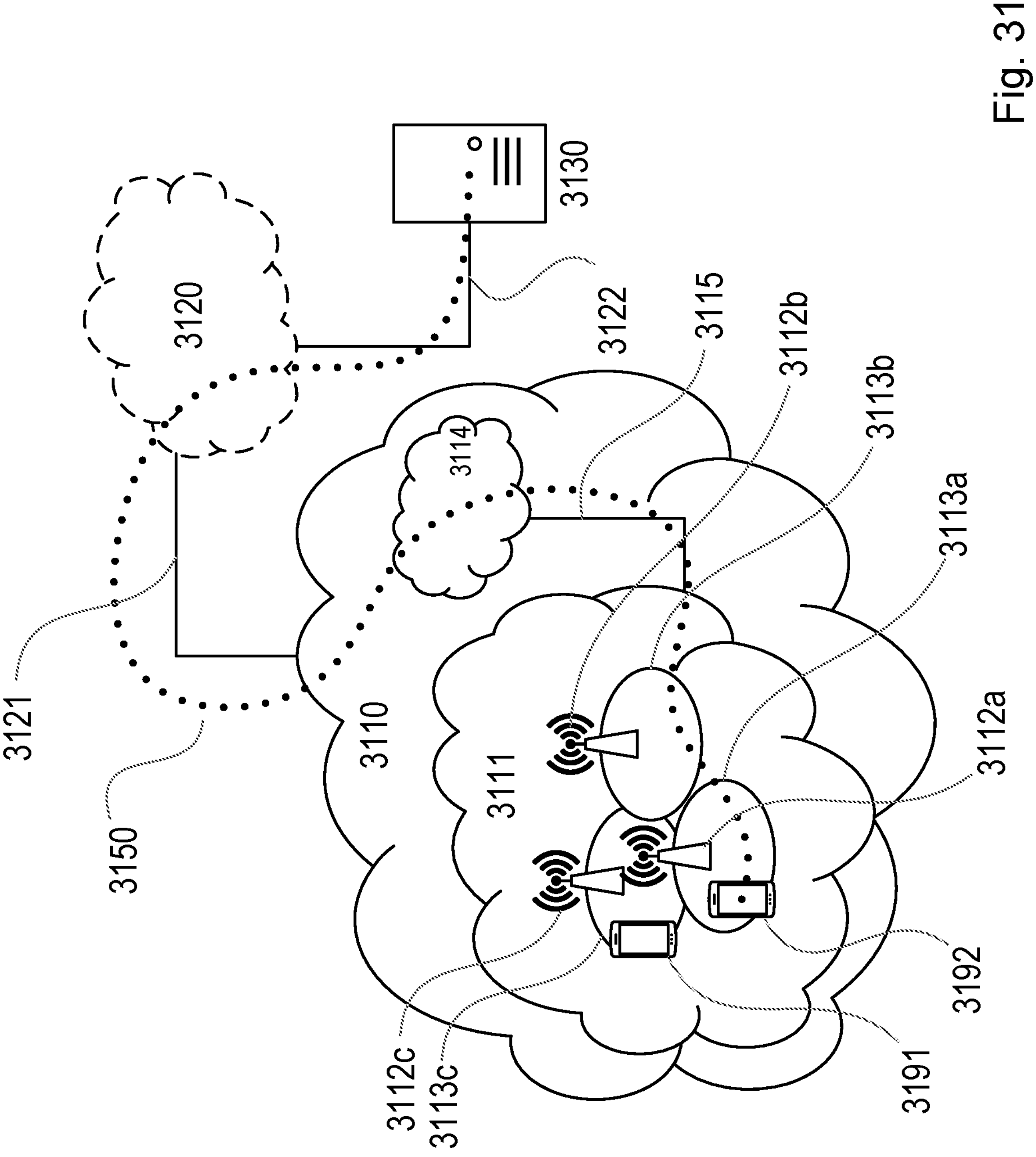
FIG. 31 schematically illustrates a telecommunication network connected via an intermediate network to a host computer in accordance with some embodiments.

With reference to FIG. 31, in accordance with an embodiment, a communication system includes telecommunication network 3110, such as a 3GPP-type cellular network, which comprises access network 3111, such as a radio access network, and core network 3114. Access network 3111 comprises a plurality of base stations 3112*a*, 3112*b*, 3112*c*, such as NBs, eNBs, gNBs or other types of wireless access points, each defining a corresponding coverage area 3113*a*, 3113*b*, 3113*c*. Each base station 3112*a*, 3112*b*, 3112*c* is connectable to core network 3114 over a wired or wireless connection 3115. A first UE 3191 located in coverage area 3113*c* is configured to wirelessly connect to, or be paged by, the corresponding base station 3112*c*. A second UE 3192 in coverage area 3113*a* is wirelessly connectable to the corresponding base station 3112*a*. While a plurality of UEs 3191, 3192 are illustrated in this example, the disclosed embodiments are equally applicable to a situation where a sole UE is in the coverage area or where a sole UE is connecting to the corresponding base station 3112.

Telecommunication network 3110 is itself connected to host computer 3130, which may be embodied in the hardware and/or software of a standalone server, a cloud-implemented server, a distributed server or as processing resources in a server farm. Host computer 3130 may be under the ownership or control of a service provider, or may be operated by the service provider or on behalf of the service provider. Connections 3121 and 3122 between telecommunication network 3110 and host computer 3130 may extend directly from core network 3114 to host computer 3130 or may go via an optional intermediate network 3120. Intermediate network 3120 may be one of, or a combination of more than one of, a public, private or hosted network; intermediate network 3120, if any, may be a backbone network or the Internet; in particular, intermediate network 3120 may comprise two or more sub-networks (not shown).

The communication system of FIG. 31 as a whole enables connectivity between the connected UEs 3191, 3192 and host computer 3130. The connectivity may be described as an over-the-top (OTT) connection 3150. Host computer 3130 and the connected UEs 3191, 3192 are configured to communicate data and/or signaling via OTT connection 3150, using access network 3111, core network 3114, any intermediate network 3120 and possible further infrastructure (not shown) as intermediaries. OTT connection 3150 may be transparent in the sense that the participating communication devices through which OTT connection 3150 passes are unaware of routing of uplink and downlink communications. For example, base station 3112 may not or need not be informed about the past routing of an incoming downlink communication with data originating from host computer 3130 to be forwarded (e.g., handed over) to a connected UE 3191. Similarly, base station 3112 need not be aware of the future routing of an outgoing uplink communication originating from the UE 3191 towards the host computer 3130.

Example implementations, in accordance with an embodiment, of the UE, base station and host computer discussed in the preceding paragraphs will now be described with reference to FIG. 32. In communication system 3200, host computer 3210 comprises hardware 3215 including communication interface 3216 configured to set up and maintain a wired or wireless connection with an interface of a different communication device of communication system 3200. Host computer 3210 further comprises processing circuitry 3218, which may have storage and/or processing capabilities. In particular, processing circuitry 3218 may comprise one or more programmable processors, application-specific integrated circuits, field programmable gate arrays or combinations of these (not shown) adapted to execute instructions. Host computer 3210 further comprises software 3211, which is stored in or accessible by host computer 3210 and executable by processing circuitry 3218. Software 3211 includes host application 3212. Host application 3212 may be operable to provide a service to a remote user, such as UE 3230 connecting via OTT connection 3250 terminating at UE 3230 and host computer 3210. In providing the service to the remote user, host application 3212 may provide user data which is transmitted using OTT connection 3250.

Communication system 3200 further includes base station 3220 provided in a telecommunication system and comprising hardware 3225 enabling it to communicate with host computer 3210 and with UE 3230. Hardware 3225 may include communication interface 3226 for setting up and maintaining a wired or wireless connection with an interface of a different communication device of communication system 3200, as well as radio interface 3227 for setting up and maintaining at least wireless connection 3270 with UE 3230 located in a coverage area (not shown in FIG. 32) served by base station 3220. Communication interface 3226 may be configured to facilitate connection 3260 to host computer 3210. Connection 3260 may be direct or it may pass through a core network (not shown in FIG. 32) of the telecommunication system and/or through one or more intermediate networks outside the telecommunication system. In the embodiment shown, hardware 3225 of base station 3220 further includes processing circuitry 3228, which may comprise one or more programmable processors, application-specific integrated circuits, field programmable gate arrays or combinations of these (not shown) adapted to execute instructions. Base station 3220 further has software 3221 stored internally or accessible via an external connection.

Communication system 3200 further includes UE 3230 already referred to. Its hardware 3235 may include radio interface 3237 configured to set up and maintain wireless connection 3270 with a base station serving a coverage area in which UE 3230 is currently located. Hardware 3235 of UE 3230 further includes processing circuitry 3238, which may comprise one or more programmable processors, application-specific integrated circuits, field programmable gate arrays or combinations of these (not shown) adapted to execute instructions. UE 3230 further comprises software 3231, which is stored in or accessible by UE 3230 and executable by processing circuitry 3238. Software 3231 includes client application 3232. Client application 3232 may be operable to provide a service to a human or non-human user via UE 3230, with the support of host computer 3210. In host computer 3210, an executing host application 3212 may communicate with the executing client application 3232 via OTT connection 3250 terminating at UE 3230 and host computer 3210. In providing the service to the user, client application 3232 may receive request data from host application 3212 and provide user data in response to the request data. OTT connection 3250 may transfer both the request data and the user data. Client application 3232 may interact with the user to generate the user data that it provides.

Figure 32:
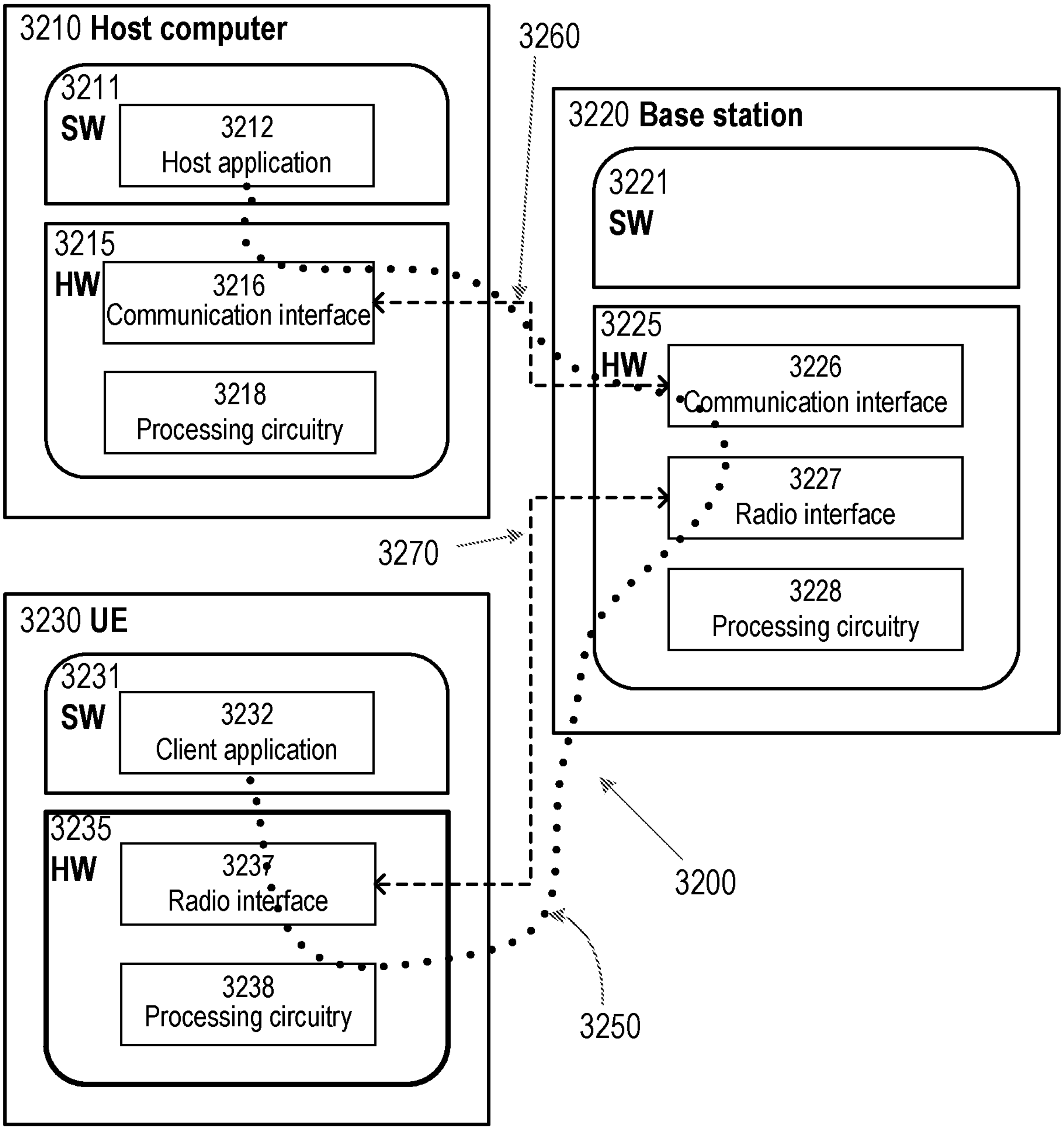
FIG. 32 is a generalized block diagram of a host computer communicating via a base station with a user equipment over a partially wireless connection in accordance with some embodiments.

It is noted that host computer 3210, base station 3220 and UE 3230 illustrated in FIG. 32 may be similar or identical to host computer 3130, one of base stations 3112*a*, 3112*b*, 3112*c* and one of UEs 3191, 3192 of FIG. 31, respectively. This is to say, the inner workings of these entities may be as shown in FIG. 32 and independently, the surrounding network topology may be that of FIG. 31.

In FIG. 32, OTT connection 3250 has been drawn abstractly to illustrate the communication between host computer 3210 and UE 3230 via base station 3220, without explicit reference to any intermediary devices and the precise routing of messages via these devices. Network infrastructure may determine the routing, which it may be configured to hide from UE 3230 or from the service provider operating host computer 3210, or both. While OTT connection 3250 is active, the network infrastructure may further take decisions by which it dynamically changes the routing (e.g., on the basis of load balancing consideration or reconfiguration of the network).

Wireless connection 3270 between UE 3230 and base station 3220 is in accordance with the teachings of the embodiments described throughout this disclosure. One or more of the various embodiments improve the performance of OTT services provided to UE 3230 using OTT connection 3250, in which wireless connection 3270 forms the last segment. More precisely, the teachings of these embodiments may improve the data rate by ensuring more robust dual connectivity, and thereby provide benefits such as reduced user waiting time and better video streaming.

A measurement procedure may be provided for the purpose of monitoring data rate, latency and other factors on which the one or more embodiments improve. There may further be an optional network functionality for reconfiguring OTT connection 3250 between host computer 3210 and UE 3230, in response to variations in the measurement results. The measurement procedure and/or the network functionality for reconfiguring OTT connection 3250 may be implemented in software 3211 and hardware 3215 of host computer 3210 or in software 3231 and hardware 3235 of UE 3230, or both. In embodiments, sensors (not shown) may be deployed in or in association with communication devices through which OTT connection 3250 passes; the sensors may participate in the measurement procedure by supplying values of the monitored quantities exemplified above, or supplying values of other physical quantities from which software 3211, 3231 may compute or estimate the monitored quantities. The reconfiguring of OTT connection 3250 may include message format, retransmission settings, preferred routing etc.; the reconfiguring need not affect base station 3220, and it may be unknown or imperceptible to base station 3220. Such procedures and functionalities may be known and practiced in the art. In certain embodiments, measurements may involve proprietary UE signaling facilitating host computer 3210's measurements of throughput, propagation times, latency and the like. The measurements may be implemented in that software 3211 and 3231 causes messages to be transmitted, in particular empty or 'dummy' messages, using OTT connection 3250 while it monitors propagation times, errors etc.

Figure 33:
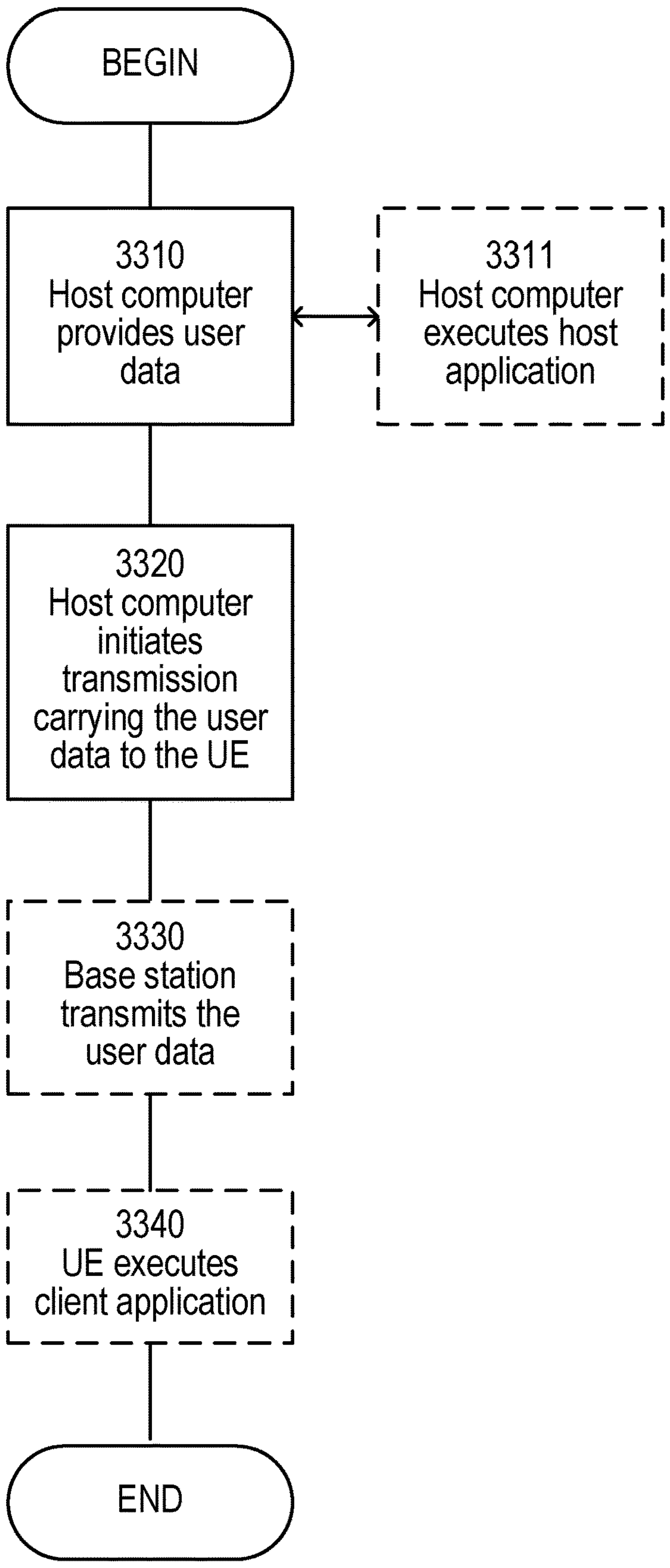
FIGS. 33-36 are flowcharts illustrating methods implemented in a communication system including a host computer, a base station and a user equipment in accordance with some embodiments.

FIG. 33 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 33 will be included in this section. In step 3310, the host computer provides user data. In substep 3311 (which may be optional) of step 3310, the host computer provides the user data by executing a host application. In step 3320, the host computer initiates a transmission carrying the user data to the UE. In step 3330 (which may be optional), the base station transmits to the UE the user data which was carried in the transmission that the host computer initiated, in accordance with the teachings of the embodiments described throughout this disclosure. In step 3340 (which may also be optional), the UE executes a client application associated with the host application executed by the host computer.

Figure 34:
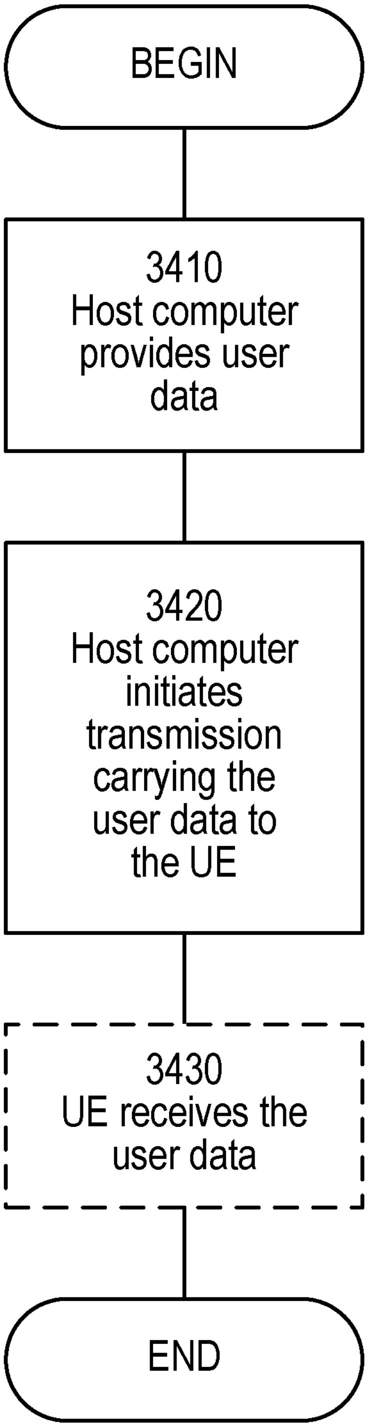

FIG. 34 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 34 will be included in this section. In step 3410 of the method, the host computer provides user data. In an optional substep (not shown) the host computer provides the user data by executing a host application. In step 3420, the host computer initiates a transmission carrying the user data to the UE. The transmission may pass via the base station, in accordance with the teachings of the embodiments described throughout this disclosure. In step 3430 (which may be optional), the UE receives the user data carried in the transmission.

Figure 35:
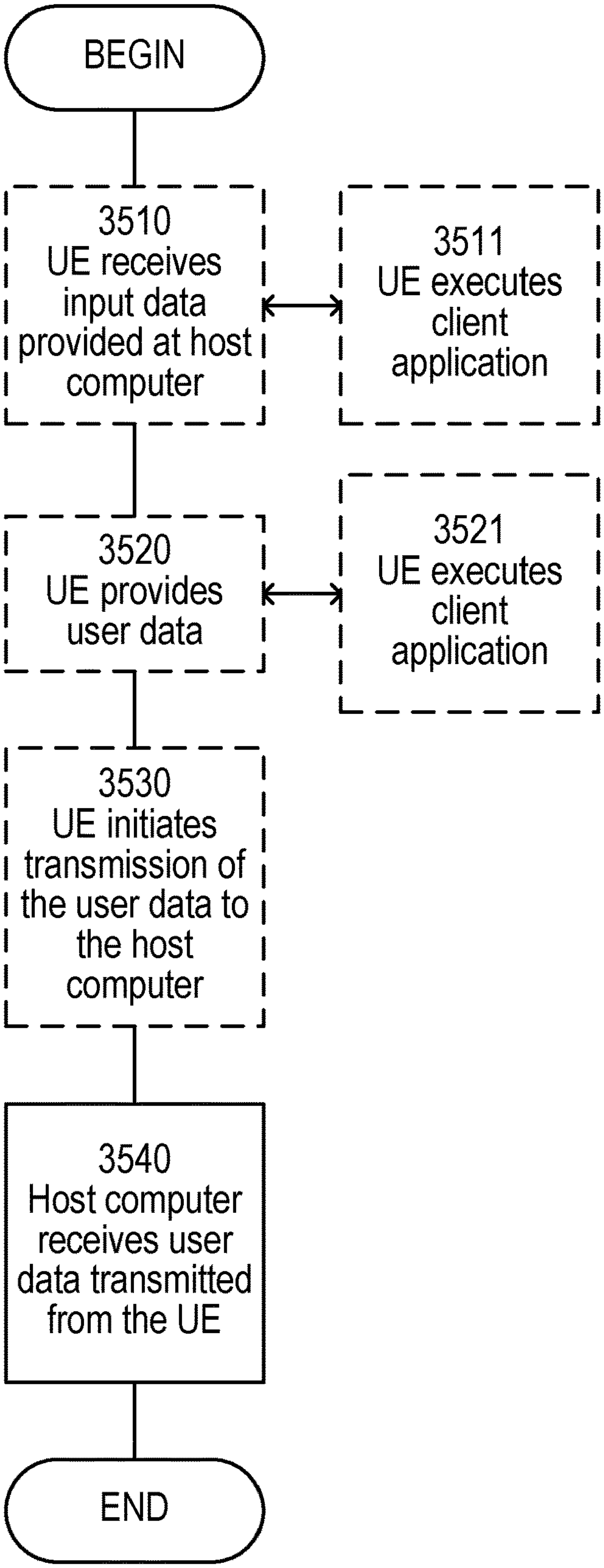

FIG. 35 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 35 will be included in this section. In step 3510 (which may be optional), the UE receives input data provided by the host computer. Additionally or alternatively, in step 3520, the UE provides user data. In substep 3521 (which may be optional) of step 3520, the UE provides the user data by executing a client application. In substep 3511 (which may be optional) of step 3510, the UE executes a client application which provides the user data in reaction to the received input data provided by the host computer. In providing the user data, the executed client application may further consider user input received from the user. Regardless of the specific manner in which the user data was provided, the UE initiates, in substep 3530 (which may be optional), transmission of the user data to the host computer. In step 3540 of the method, the host computer receives the user data transmitted from the UE, in accordance with the teachings of the embodiments described throughout this disclosure.

Figure 36:
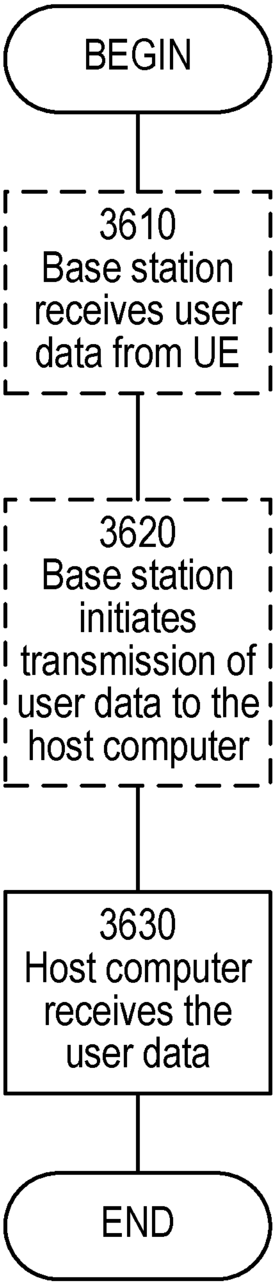

FIG. 36 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 36 will be included in this section. In step 3610 (which may be optional), in accordance with the teachings of the embodiments described throughout this disclosure, the base station receives user data from the UE. In step 3620 (which may be optional), the base station initiates transmission of the received user data to the host computer. In step 3630 (which may be optional), the host computer receives the user data carried in the transmission initiated by the base station.

Figure 37:
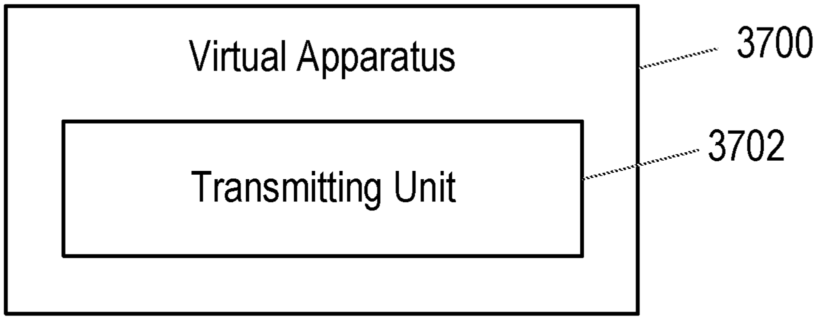
FIGS. 37 and 38 are schematic diagrams showing virtualization apparatus in accordance with some embodiments.

FIG. 37 illustrates a schematic block diagram of an apparatus 3700 in a wireless network (for example, the wireless network shown in FIG. 28). The apparatus may be implemented in a wireless device or network node (e.g., wireless device 2810 or network node 2860 shown in FIG. 28). Apparatus 3700 is operable to carry out the example method described with reference to FIG. 16 and possibly any other processes or methods disclosed herein. It is also to be understood that the method of FIG. 16 is not necessarily carried out solely by apparatus 3700. At least some operations of the method can be performed by one or more other entities.

Virtual Apparatus 3700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 3702, and any other suitable units of apparatus 3700 to perform corresponding functions according one or more embodiments of the present disclosure.

Apparatus 3700 may be implemented in or comprise a first base station. The first base station is configured as one of a plurality of base stations providing services to a plurality of devices in a wireless communication network according to a multi-connectivity configuration for the plurality of devices. As illustrated in FIG. 37, apparatus 3700 includes transmitting unit 3702. Transmitting unit 3702 is configured to transmit a request message to a second base station of the plurality of base stations. The request message requests an alteration to the multi-connectivity configuration for the plurality of devices.

Figure 38:
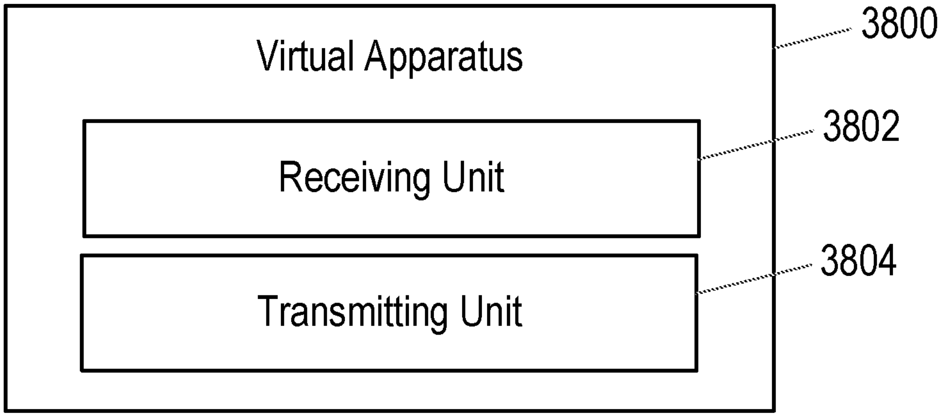

FIG. 38 illustrates a schematic block diagram of an apparatus 3800 in a wireless network (for example, the wireless network shown in FIG. 28). The apparatus may be implemented in a wireless device or network node (e.g., wireless device 2810 or network node 2860 shown in FIG. 28). Apparatus 3800 is operable to carry out the example method described with reference to FIG. 17 and possibly any other processes or methods disclosed herein. It is also to be understood that the method of FIG. 17 is not necessarily carried out solely by apparatus 3800. At least some operations of the method can be performed by one or more other entities.

Virtual Apparatus 3800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 3802 and transmitting unit 3804, and any other suitable units of apparatus 3800 to perform corresponding functions according one or more embodiments of the present disclosure.

Apparatus 3800 may be implemented in or comprise a second base station. The second base station is configured as one of a plurality of base stations providing services to a plurality of devices in a wireless communication network according to a multi-connectivity configuration for the plurality of devices. As illustrated in FIG. 38, apparatus 3800 includes receiving unit 3802 and transmitting unit 3804. Receiving unit 3802 is configured to receive one or more request messages from a first base station of the plurality of base stations. The one or more request messages request an alteration to the multi-connectivity configuration for the plurality of devices. Transmitting unit 3804 is configured to transmit a response message to the first base station. The response message comprises an indication of whether the alteration to the multi-connectivity configuration for the plurality of devices was successful or unsuccessful.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following statements set out embodiments of the disclosure.

1. A method performed by a first base station, the first base station being configured as one of a plurality of base stations providing services to a plurality of devices in a wireless communication network according to a multi-connectivity configuration for the plurality of devices, the method comprising:
   transmitting a request message to a second base station of the plurality of base stations, the request message requesting an alteration to the multi-connectivity configuration for the plurality of devices.
2. The method according to embodiment 1, wherein the alteration to the multi-connectivity configuration comprises addition of resources at the second base station for the plurality of devices.
3. The method according to embodiment 1, wherein the alteration to the multi-connectivity configuration comprises a change of second base station for the multi-connectivity configuration for the plurality of devices.
4. The method according to embodiment 1, wherein the alteration to the multi-connectivity configuration comprises release of resources at the second base station for the plurality of devices.
5. The method according to any one of the preceding embodiments, wherein the request message comprises an indication of identities for the plurality of devices.
6. The method according to any one of the preceding embodiments, wherein the plurality of devices comprise a group of devices, and wherein the request message comprises an indication of an identity of the group of devices.

7. The method according to any one of the preceding embodiments, wherein the request message comprises indications of contexts for wireless connections between the plurality of devices and the wireless communication network.
8. The method according to embodiment 7, wherein each context comprises a plurality of information elements, and wherein the request message comprises single instances of one or more first information elements of the plurality of information elements whose values are common to a plurality of the contexts, and respective instances of one or more second information elements of the plurality of information elements.
9. The method according to any one of the preceding embodiments, further comprising receiving a response message from the second base station.
10. The method according to embodiment 9, wherein the response message comprises an indication of whether the alteration to the multi-connectivity configuration for the plurality of devices was successful or unsuccessful.
11. The method of any preceding embodiment, wherein the plurality of devices comprises one or more of: one or more wireless devices; and one or more IAB nodes.
12. The method according to any one of the preceding embodiments, wherein the first base station is a master base station for the plurality of devices, and the second base station is a secondary base station for the plurality of devices.
13. The method according to any one of embodiments 1 to 11, wherein the first base station is a secondary base station for the plurality of devices, and the second base station is a master base station for the plurality of devices.
14. A method performed by a second base station, the second base station being configured as one of a plurality of base stations providing services to a plurality of devices in a wireless communication network according to a multi-connectivity configuration for the plurality of devices, the method comprising:
receiving one or more request messages from a first base station of the plurality of base stations, the one or more request messages requesting an alteration to the multi-connectivity configuration for the plurality of devices; and
transmitting a response message to the first base station, the response message comprising an indication of whether the alteration to the multi-connectivity configuration for the plurality of devices was successful or unsuccessful.
15. The method of embodiment 14, comprising receiving a single request message from the first base station requesting the alteration to the multi-connectivity configuration for the plurality of devices.
16. The method embodiment 14 or 15, wherein the alteration to the multi-connectivity configuration comprises addition of resources at the second base station for the plurality of devices.
17. The method according to embodiment 14 or 15, wherein the alteration to the multi-connectivity configuration comprises a change of second base station for the multi-connectivity configuration for the plurality of devices.
18. The method according to embodiment 14 or 15, wherein the alteration to the multi-connectivity configuration comprises release of resources at the second base station for the plurality of devices.
19. The method according to any one of embodiments 14 to 18, wherein the response message comprises identities of one or more devices for which the alteration to the multi-connectivity configuration was unsuccessful.
20. The method according to any one of embodiments 14 to 18, wherein the response message comprises an indication that alteration to the multi-connectivity configuration was unsuccessful for all of the plurality of the devices.
21. The method according to any one of embodiments 14 to 18, wherein the response message comprises an indication that alteration to the multi-connectivity configuration was successful for all of the plurality of the devices.
22. The method according to any one of embodiments 14 to 18, wherein the response message comprises identities of one or more devices for which the alteration to the multi-connectivity configuration was successful.
23. The method according to any one of embodiments 14 to 18, wherein the response message is transmitted responsive to successful alteration to the multi-connectivity configuration for the plurality of devices.
24. The method according to any one of embodiments 14 to 23, wherein the request message comprises an indication of identities for the plurality of devices.
25. The method according to any one of embodiments 14 to 24, wherein the plurality of devices comprise a group of devices, and wherein the request message comprises an indication of an identity of the group of devices.
26. The method according to any one of embodiments 14 to 25, wherein the request message comprises indications of contexts for wireless connections between the plurality of devices and the wireless communication network.
27. The method according to embodiment 26, wherein each context comprises a plurality of information elements, and wherein the request message comprises single instances of one or more first information elements of the plurality of information elements whose values are common to a plurality of the contexts, and respective instances of one or more second information elements of the plurality of information elements.
28. The method according to any one of embodiments 14 to 27, wherein the plurality of devices comprises one or more of: one or more wireless devices; and one or more IAB nodes.
29. The method according to any one of embodiments 14 to 28, wherein the first base station is a master base station for the plurality of devices, and the second base station is a secondary base station for the plurality of devices.
30. The method according to any one of embodiments 14 to 28, wherein the first base station is a secondary base station for the plurality of devices, and the second base station is a master base station for the plurality of devices.
31. The method of any of the previous embodiments, further comprising:
obtaining user data; and
forwarding the user data to a host computer or a wireless device.

Group C Embodiments

32. A base station, the base station comprising:
 processing circuitry configured to cause the base station to perform any of the steps of any of the Group B embodiments;
 power supply circuitry configured to supply power to the base station.
33. A communication system including a host computer comprising:
 processing circuitry configured to provide user data; and
 a communication interface configured to forward the user data to a cellular network for transmission to a user equipment (UE),
 wherein the cellular network comprises a base station having a radio interface and processing circuitry, the base station's processing circuitry configured to perform any of the steps of any of the Group B embodiments.
34. The communication system of the previous embodiment further including the base station.
35. The communication system of the previous 2 embodiments, further including the UE, wherein the UE is configured to communicate with the base station.
36. The communication system of the previous 3 embodiments, wherein:
 the processing circuitry of the host computer is configured to execute a host application, thereby providing the user data; and
 the UE comprises processing circuitry configured to execute a client application associated with the host application.
37. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station performs any of the steps of any of the Group B embodiments.
38. The method of the previous embodiment, further comprising, at the base station, transmitting the user data.
39. The method of the previous 2 embodiments, wherein the user data is provided at the host computer by executing a host application, the method further comprising, at the UE, executing a client application associated with the host application.
40. A user equipment (UE) configured to communicate with a base station, the UE comprising a radio interface and processing circuitry configured to perform the method according to any of the previous 3 embodiments.
41. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
42. The communication system of the previous embodiment further including the base station.
43. The communication system of the previous 2 embodiments, further including the UE, wherein the UE is configured to communicate with the base station.
44. The communication system of the previous 3 embodiments, wherein:
 the processing circuitry of the host computer is configured to execute a host application;
 the UE is configured to execute a client application associated with the host application, thereby providing the user data to be received by the host computer.
45. A method implemented in a communication system including a host computer, a base station and a user equipment (UE), the method comprising:
 at the host computer, receiving, from the base station, user data originating from a transmission which the base station has received from the UE, wherein the UE performs any of the steps of any of the Group A embodiments.
46. The method of the previous embodiment, further comprising at the base station, receiving the user data from the UE.
47. The method of the previous 2 embodiments, further comprising at the base station, initiating a transmission of the received user data to the host computer.

APPENDIX

Xn Messages

Group S-Node Addition Request

This message is sent by the M-NG-RAN node to the S-NG-RAN node to request the preparation of resources for dual connectivity operation for a multitude of UEs/IAB-MTs.

TABLE T

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>UE Security Capabilities | M | | 9.2.3.49 | | YES | reject |

TABLE T-continued

| IE/Group Name | Presence | Range | IE type and reference | Semantics description | Criticality | Assigned Criticality |
|---|---|---|---|---|---|---|
| >>S-NG-RAN node Security Key | M | | 9.2.3.51 | | YES | reject |
| >>S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. | YES | reject |
| >>Selected PLMN | O | | PLMN Identity 9.2.2.4 | The selected PLMN of the SCG in the S-NG-RAN node. | YES | ignore |
| >>Mobility Restriction List | O | | 9.2.3.53 | | YES | ignore |
| >>Index to RAT/Frequency Selection Priority | O | | 9.2.3.23 | | YES | reject |
| >>PDU Session Resources To Be Added List | | 1 | | | YES | reject |
| >>>PDU Session Resources To Be Added Item | | 1 . . . <maxnoofPDUSessions> | | NOTE: If neither the PDU Session Resource Setup Info - SN terminated IE nor the PDU Session Resource Setup Info - MN terminated IE is present in a PDU Session Resources To Be Added Item IE, abnormal conditions as specified in clause 8.3.1.4 apply. | — | |
| >>>>PDU Session ID | M | | 9.2.3.18 | | — | |
| >>>>S-NSSAI | M | | 9.2.3.21 | | — | |
| >>>>S-NG-RAN node PDU Session Aggregate Maximum Bit Rate | O | | PDU Session Aggregate Maximum Bit Rate 9.2.3.69 | | — | |
| >>>>PDU Session Resource Setup Info - SN terminated | O | | 9.2.1.5 | | — | |

TABLE T-continued

| IE/Group Name | Presence | Range | IE type and reference | Semantics description | Criticality | Assigned Criticality |
|---|---|---|---|---|---|---|
| >>>>PDU Session Resource Setup Info - MN terminated | O | | 9.2.1.7 | | — | |
| >>M-NG-RAN node to S-NG-RAN node Container | M | | OCTET STRING | Includes the CG-ConfigInfo message as defined in subclause 11.2.2 of TS 38.331 [10] | YES | reject |
| >>S-NG-RAN node UE XnAP ID | O | | NG-RAN node UE XnAP ID 9.2.3.16 | Allocated at the S-NG-RAN node | YES | reject |
| >>Expected UE Behaviour | O | | 9.2.3.81 | | YES | ignore |
| >>Requested Split SRBs | O | | ENUMERATED (srb1, srb2, srb1&2, . . . ) | Indicates that resources for Split SRBs are requested. | YES | reject |
| >>PCell ID | O | | Global NG-RAN Cell Identity 9.2.2.27 | | YES | reject |
| >>Desired Activity Notification Level | O | | 9.2.3.77 | | YES | ignore |
| >>Available DRB IDs | C-ifSNterminated | | DRB List 9.2.1.29 | Indicates the list of DRB IDs that the S-NG-RAN node may use for SN-terminated bearers. | YES | reject |
| >>S-NG-RAN node Maximum Integrity Protected Data Rate Uplink | O | | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN terminated PDU sessions. If the S-NG-RAN node Maximum Integrity Protected Data Rate Downlink IE is not present, this IE applies to both UL and DL. | YES | reject |
| >>S-NG-RAN node Maximum Integrity Protected Data Rate Downlink | O | | Bit Rate 9.2.3.4 | The S-NG-RAN node Maximum Integrity Protected Data Rate Downlink is a portion of the UE's Maximum | YES | reject |

TABLE T-continued

| IE/Group Name | Presence | Range | IE type and reference | Semantics description | Criticality | Assigned Criticality |
|---|---|---|---|---|---|---|
| | | | | Integrity Protected Data Rate in the Downlink, which is enforced by the S-NG-RAN node for the UE's SN terminated PDU sessions. | | |
| >>Location Information at S-NODE reporting | O | | ENUME RATED (pscell, . . . ) | Indicates that the user's Location Information at S-NODE is to be provided. | YES | ignore |
| >>MR-DC Resource Coordination Information | O | | 9.2.2.33 | Information used to coordinate resource utilisation between M-NG-RAN node and S-NG-RAN node. | YES | ignore |
| >>Masked IMEISV | O | | 9.2.3.32 | | YES | ignore |
| >>NE-DC TDM Pattern | O | | 9.2.2.38 | | YES | ignore |
| >>SN Addition Trigger Indication | O | | ENUMERATED (SN change, inter-MN HO, intra-MN HO, . . . ) | This IE indicates the trigger for S-NG-RAN node Addition Preparation procedure | YES | reject |
| >>Trace Activation | O | | 9.2.3.55 | | YES | ignore |
| >>Requested Fast MCG recovery via SRB3 | O | | ENUMERATED (true, . . . ) | Indicates that the resources for fast MCG recovery via SRB3 are requested. | YES | ignore |

TABLE U

| Range bound | Explanation |
|---|---|
| maxnoofPDUSessions | Maximum no. of PDU sessions. Value is 256 |
| maxnoofUEs | Maximum no. of UEs/IAB-MTs that can be involved in a group S-Node addition. Value is FFS |

TABLE V

| Condition | Explanation |
|---|---|
| ifSNterminated | This IE shall be present if there is at least one PDU Session Resource Setup Info - SN |

TABLE V-continued

| Condition | Explanation |
|---|---|
| | terminated in the PDU Session Resources To Be Added List IE. |

Group S-Node Addition Request Acknowledge

This message is sent by the S-NG-RAN node to confirm the M-NG-RAN node about a group S-NG-RAN node addition preparation.

TABLE W

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |

TABLE W-continued

| IE/Group Name | Presence | Range | IE type and reference | Semantics description | Criticality | Assigned Criticality |
|---|---|---|---|---|---|---|
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >S-NG-RAN node UE XnAP ID | M | | NG-RAN node UE XnAP ID 9.2.3.16 | Allocated at the S-NG-RAN node | YES | reject |
| >>PDU Session Resources Admitted To Be Added List | | 1 | | | YES | ignore |
| >>>PDU Session Resources Admitted To Be Added Item | | 1 . . . <maxnoofPDUSessions> | | NOTE: If neither the PDU Session Resource Setup Response Info - SN terminated IE nor the PDU Session Resource Setup Response Info - MN terminated IE is present in a PDU Session Resources Admitted to be Added Item IE, abnormal conditions as specified in clause 8.3.1.4 apply. | — | |
| >>>>PDU Session ID | M | | 9.2.3.18 | | — | |
| >>>>PDU Session Resource Setup Response Info - SN terminated | O | | 9.2.1.6 | | — | |
| >>>>PDU Session Resource Setup Response Info - MN terminated | O | | 9.2.1.8 | | — | |
| >>PDU Session Resources Not Admitted List | O | | | | YES | ignore |
| >>>PDU Session Resources Not | O | | PDU Session Resources Not Admitted List | | — | |

TABLE W-continued

| IE/Group Name | Presence | Range | IE type and reference | Semantics description | Criticality | Assigned Criticality |
|---|---|---|---|---|---|---|
| Admitted List - SN terminated | | | 9.2.1.3 | | | |
| >>>PDU Session Resources Not Admitted List - MN terminated | O | | PDU Session Resources Not Admitted List 9.2.1.3 | | — | |
| >>S-NG-RAN node to M-NG-RAN node Container | M | | OCTET STRING | Includes the CG-Config message as defined in subclause 11.2.2 of TS 38.331 [10]. | YES | reject |
| >>Admitted Split SRBs | O | | ENUMERATED (srb1, srb2, srb1&2, . . . ) | Indicates admitted SRBs | YES | reject |
| >>RRC Config Indication | O | | 9.2.3.72 | | YES | reject |
| >>Location Information at S-NODE | O | | Target Cell Global ID 9.2.3.25 | Contains information to support localisation of the UE | YES | ignore |
| >>MR-DC Resource Coordination Information | O | | 9.2.2.33 | Information used to coordinate resource utilisation between M-NG-RAN node and S-NG-RAN node. | YES | ignore |
| >>Admitted fast MCG recovery via SRB3 | O | | ENUMERATED (true, . . . ) | Indicates the admitted fast MCG recovery via SRB3. | YES | Ignore |
| Criticality Diagnostics | O | | 9.2.3.3 | | YES | ignore |

TABLE X

| Range bound | Explanation |
|---|---|
| maxnoofPDUSessions | Maximum no. of PDU sessions. Value is 256 |
| maxnoofUEs | Maximum no. of UEs/IAB-MTs that can be involved in a group S-Node addition. Value is FFS |

Group S-Node Addition Request Reject

This message is sent by the S-NG-RAN node to inform the M-NG-RAN node that the GROUP S-NG-RAN node Addition Preparation has failed.

TABLE Y

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |

TABLE Y-continued

| IE/Group Name | Presence | Range | IE type and reference | Semantics description | Criticality | Assigned Criticality |
|---|---|---|---|---|---|---|
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | ignore |
| Criticality Diagnostics | O | | 9.2.3.3 | | YES | ignore |

Group S-Node Release Request

This message is sent by the M-NG-RAN node to the S-NG-RAN node to request the release of resources corresponding to a multitude of UEs/IAB-MTs.

TABLE Z

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | O | | NG-RAN node UE XnAP ID 9.2.3.16 | Allocated at the S-NG-RAN node | YES | reject |
| >>PDU Session Resources To Be Released List | O | | PDU session List with Cause 9.2.1.26 | | YES | ignore |
| >>UE Context Kept Indicator | O | | 9.2.3.68 | | YES | ignore |
| >>M-NG-RAN node to S-NG-RAN node Container | O | | OCTET STRING | Includes the CG-ConfigInfo message as defined in subclause 11.2.2 of TS 38.331 [10]. | YES | ignore |
| >>DRBs transferred to MN | O | | DRB List 9.2.1.29 | Indicates that the target M-NG-RAN node reconfigured the listed DRBs as MN-terminated bearers. | YES | Ignore |
| Cause | M | | 9.2.3.2 | | YES | ignore |

TABLE AA

| Range bound | Explanation |
|---|---|
| maxnoofPDUSessions | Maximum no. of PDU sessions. Value is 256 |

Group S-Node Release Request Acknowledge

This message is sent by the S-NG-RAN node to the M-NG-RAN node to confirm the request to release S-NG-RAN node resources for a multitude of UEs/IAB-MTs.

TABLE BB

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | O | | NG-RAN node UE XnAP ID 9.2.3.16 | Allocated at the S-NG-RAN node | YES | reject |
| >>PDU sessions To Be Released List | | 0 . . . 1 | | | YES | ignore |
| >>>PDU Session Resources To Be Released List - SN terminated | O | | PDU Session List with data forwarding request info 9.2.1.24 | | — | |
| Criticality Diagnostics | O | | 9.2.3.3 | | YES | ignore |

Group S-Node Release Reject

This message is sent by the S-NG-RAN node to the M-NG-RAN node to reject the request to release S-NG-RAN node resources for a multitude of UEs/IAB-MTs.

TABLE CC

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | O | | NG-RAN node UE XnAP ID 9.2.3.16 | Allocated at the S-NG-RAN node | YES | reject |
| Cause | M | | 9.2.3.2 | | YES | ignore |
| Criticality Diagnostics | O | | 9.2.3.3 | | YES | ignore |

Group S-Node Release Required

This message is sent by the S-NG-RAN node to request the release of all resources for a multitude of UEs/IAB-MTs at the S-NG-RAN node.

TABLE DD

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | M | | NG-RAN node UE XnAP ID 9.2.3.16 | Allocated at the S-NG-RAN node | YES | reject |
| >>PDU sessions To Be Released | | 0 . . . 1 | | | YES | ignore |
| >>>PDU Session Resources to be released List - SN terminated | O | | PDU session List with data forwarding request info 9.2.1.24 | | — | |
| >>S-NG-RAN node to M-NG-RAN node Container | O | | OCTET STRING | Includes the CG-Config message as defined in TS 38.331 [10]. | YES | Ignore |
| Cause | M | | 9.2.3.2 | | YES | ignore |

Group S-Node Release Confirm

This message is sent by the M-NG-RAN node to confirm the release of all resources for a multitude of UEs/IAB-MTs at the S-NG-RAN node.

TABLE EE

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | ignore |
| >>S-NG-RAN node UE XnAP ID | M | | NG-RAN node UE XnAP ID 9.2.3.16 | Allocated at the S-NG-RAN node | YES | ignore |
| >>PDU Session Resources Released | | 0 . . . 1 | | | YES | ignore |
| >>>PDU sessions released List - SN terminated | O | | PDU Session List with data forwarding info from the target node 9.2.1.25 | | — | |

TABLE EE-continued

| IE/Group Name | Presence | Range | IE type and reference | Semantics description | Criticality | Assigned Criticality |
|---|---|---|---|---|---|---|
| Criticality Diagnostics | C | | 9.2.3.3 | | YES | ignore |

TABLE FF

| Range bound | Explanation |
|---|---|
| maxnoofPDUSessions | Maximum no. of PDU sessions. Value is 256 |

Group S-Node Change Required

This message is sent by the S-NG-RAN node to the M-NG-RAN node to trigger the change of the S-NG-RAN node for multiple UEs/IAB MTs.

TABLE GG

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | reject |
| >>S-NG-RAN node UE XnAP ID | M | | NG-RAN node UE XnAP ID 9.2.3.16 | Allocated at the S-NG-RAN node | YES | reject |
| >>Target S-NG-RAN node ID | M | | Global NG-RAN Node ID 9.2.2.3 | | YES | reject |
| >>Cause | M | | 9.2.3.2 | | YES | ignore |
| >> PDU Session SN Change Required List | | 0 . . . 1 | | | YES | ignore |
| >>PDU Session SN Change Required Item | | 1 . . . <maxnoofPDUsessions> | | NOTE: If the PDU Session Resource Change Required Info - SN terminated IE is not present in a PDU Session SN Change Required Item IE, abnormal conditions as specified in clause 8.3.5.4 apply. | — | |
| >>>PDU Session ID | M | | 9.2.3.18 | | — | |
| >>>PDU Session Resource | O | | 9.2.1.18 | | — | |

TABLE GG-continued

| IE/Group Name | Presence | Range | IE type and reference | Semantics description | Criticality | Assigned Criticality |
|---|---|---|---|---|---|---|
| Change Required Info - SN terminated | | | | | | |
| >>S-NG-RAN node to M-NG-RAN node Container | M | | OCTET STRING | Includes the CG-Config message as defined in subclause 11.2.2 of TS 38.331 [10]. | YES | reject |

TABLE HH

| Range bound | Explanation |
|---|---|
| maxnoofPDUsessions | Maximum no. of PDU sessions. Value is 256 |

Group S-Node Change Confirm

This message is sent by the M-NG-RAN node to inform the S-NG-RAN node that the preparation of the S-NG-RAN node initiated S-NG-RAN node change for one or more UEs/IAB-MTs was successful. Optionally the M-NG-RAN node can indicate which UEs/IAB-MTS that the preparation was unsuccessful.

TABLE II

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | ignore |
| >>S-NG-RAN node UE XnAP ID | M | | NG-RAN node UE XnAP ID 9.2.3.16 | Allocated at the S-NG-RAN node | YES | ignore |
| >>PDU Session SN Change Confirm List | | 0 . . . 1 | | | YES | ignore |
| >>>PDU Session SN Change Confirm Item | | 1 . . . <maxnoofPDUsessions> | | NOTE: If the PDU Session Resource Change Confirm Info - SN terminated IE is not present in a PDU Session SN Change Confirm Item IE, abnormal conditions as specified in clause 8.3.5.4 apply. | — | |

TABLE II-continued

| IE/Group Name | Presence | Range | IE type and reference | Semantics description | Criticality | Assigned Criticality |
|---|---|---|---|---|---|---|
| >>>>PDU Session ID | M | | 9.2.3.18 | | — | |
| >>>>PDU Session Resource Change Confirm Info - SN terminated | O | | 9.2.1.19 | | — | |
| >>Criticality Diagnostics | O | | 9.2.3.3 | | YES | ignore |
| Unsuccessful UE context Info List | | 1 | | | YES | reject |
| >UE context Info List Item | | 0 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | ignore |
| >>S-NG-RAN node UE XnAP ID | M | | NG-RAN node UE XnAP ID 9.2.3.16 | Allocated at the S-NG-RAN node | YES | ignore |

TABLE JJ

| Range bound | Explanation |
|---|---|
| maxnoofPDUsessions | Maximum no. of PDU sessions. Value is 256 |

Group S-Node Change Refuse

This message is sent by the M-NG-RAN node to inform the S-NG-RAN node that the preparation of the S-NG-RAN node initiated S-NG-RAN node change has failed for multiple UEs/IAB-MTs.

TABLE KK

| IE/Group Name | Presence | Range | IE type and reference | Semantics description | Criticality | Assigned Criticality |
|---|---|---|---|---|---|---|
| Message Type | M | | 9.2.3.1 | | YES | reject |
| UE context Info List | | 1 | | | YES | reject |
| >UE context Info List Item | | 1 . . . <maxnoofUEs> | | | EACH | reject |
| >>M-NG-RAN node UE XnAP ID | M | | NG-RAN node UE XnAP ID 9.2.3.16 | Allocated at the M-NG-RAN node | YES | ignore |
| >>S-NG-RAN node UE XnAP ID | M | | NG-RAN node UE XnAP ID 9.2.3.16 | Allocated at the S-NG-RAN node | YES | ignore |
| >>Cause | M | | 9.2.3.2 | | YES | ignore |
| >>Criticality Diagnostics | O | | 9.2.3.3 | | YES | ignore |

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a first base station in a wireless communication network, for altering a multi-connectivity configuration used for a plurality of devices comprising one or more integrated access and backhaul (IAB) nodes and one or more user equipments (UEs), the method comprising:
- determining an alteration to the multi-connectivity configuration;
- associating a respective group identifier with device identifiers for each group of one or more groups of devices among the plurality of devices, where each group of devices is associated with a same parent IAB node; and
- initiating the alteration by transmitting a request message to a second base station involved in the alteration, the request message requesting the alteration and identifying the one or more groups to the second base station by including the respective group identifiers.

2. The method according to claim 1, wherein the alteration to the multi-connectivity configuration comprises:

addition of resources at the second base station for the plurality of devices; or a change of second base station for the multi-connectivity configuration for the plurality of devices.

3. The method according to claim 1, wherein the alteration to the multi-connectivity configuration comprises release of resources at the second base station for the plurality of devices.

4. The method according to claim 1, wherein the request message includes device identifiers for the plurality of devices.

5. The method according to claim 4, wherein the request message comprises:

a group context information list including a respective group context information list item for each of the one or more groups of devices, each group context information list item including the respective group identifier and one or more information elements common to all devices in the respective group; and for each group, a device context information list including a respective device context information list item for each device in the group, each device context information list item including a respective one of the device identifiers.

6. The method according to claim 1, wherein the request message comprises indications of contexts for wireless connections between the plurality of devices and the wireless communication network.

7. The method according to claim 6, wherein each context comprises a plurality of information elements, and wherein the request message comprises single instances of one or more first information elements of the plurality of information elements whose values are common to a plurality of the contexts, and respective instances of one or more second information elements of the plurality of information elements.

8. The method according to claim 1, further comprising receiving a response message from the second base station.

9. The method according to claim 8, wherein the response message comprises an indication of whether the alteration to the multi-connectivity configuration for the plurality of devices was successful or unsuccessful.

10. The method according to claim 1, wherein the alteration to the multi-connectivity configuration comprises migration of one or more parent IAB nodes from a source central unit to a target central unit, the one or more parent IAB nodes being associated with respective groups of the one or more groups of devices.

11. A first base station configured for operation in a wireless communication network, wherein the first base station comprises:

processing circuitry configured to:

determine an alteration to a multi-connectivity configuration used by the wireless communication network for a plurality of devices, including one or more integrated access and backhaul (IAB) nodes and one or more user equipments (UEs);

associate a respective group identifier with device identifiers for each group of one or more groups of devices among the plurality of devices, where each group of devices is associated with a same parent IAB node; and initiate the alteration by causing the base station to transmit a request message to a second base station involved in the alteration, the request message requesting the alteration and identifying the one or more groups to the second base station by including the respective group identifiers; and power supply circuitry configured to supply power to the first base station.

12. A method performed by a second base station in a wireless communication network, the method comprising:

receiving a request message from a first base station in the wireless communication network, the first base station coordinating a multi-connectivity configuration used for a plurality of devices including one or more integrated access and backhaul (IAB) nodes and one or more user equipments (UEs);

determining a requested alteration of the multi-connectivity configuration from the request message, and identifying one or more affected groups of devices, based on the request message including one or more group identifiers, each group identifier identifying a respective group of devices among the plurality of devices that is associated with a same parent IAB node; and transmitting a response message to the first base station, the response message comprising an indication of whether the alteration to the multi-connectivity configuration for the plurality of devices was successful or unsuccessful.

13. The method according to claim 12, wherein the alteration to the multi-connectivity configuration comprises:

addition of resources at the second base station for the plurality of devices;

a change of second base station for the multi-connectivity configuration for the plurality of devices; or release of resources at the second base station for the plurality of devices.

14. The method according to claim 12, wherein the response message comprises identities of one or more devices for which the alteration to the multi-connectivity configuration was unsuccessful or comprises identities of one or more devices for which the alteration to the multi-connectivity configuration was successful.

15. The method according to claim 12, wherein the response message is transmitted responsive to successful alteration to the multi-connectivity configuration for the plurality of devices.

16. The method according to claim 12, wherein the request message comprises an indication of identities for the plurality of devices.

17. The method according to claim 12, wherein the request message comprises:

a group context information list including a respective group context information list item for each of the one or more affected groups of devices, each group context information list item including a respective group identifier and one or more information elements common to all devices in the respective group; and for each group, a device context information list including a respective device context information list item for each device in the group, each device context information list item including a respective one of the device identifiers.

18. The method according to claim 12, wherein the request message comprises indications of contexts for wireless connections between the plurality of devices and the wireless communication network.

19. The method according to claim 18, wherein each context comprises a plurality of information elements, and wherein the request message comprises single instances of one or more first information elements of the plurality of information elements whose values are common to a plurality of the contexts, and respective instances of one or more second information elements of the plurality of information elements.

20. A second base station configured for operation in a wireless communication network, wherein the second base station comprises:

processing circuitry configured to cause the base station to:

receive a request message from a first base station in the wireless communication network, the first base station coordinating a multi-connectivity configuration used for a plurality of devices including one or more integrated access and backhaul (IAB) nodes and one or more user equipments (UEs);

determine a requested alteration of the multi-connectivity configuration from the request message, and identify one or more affected groups of devices, based on the request message including one or more group identifiers, each group identifier identifying a respective group of devices among the plurality of devices that is associated with a same parent IAB node; and transmit a response message to the first base station, the response message comprising an indication of whether the alteration to the multi-connectivity configuration for the plurality of devices was successful or unsuccessful; and power supply circuitry configured to supply power to the second base station.

* * * * *